Jan. 3, 1939.  F. L. FULLER ET AL  2,142,352
COMBINED RECORD SORTING AND ACCOUNTING MACHINE
Filed Sept. 7, 1934   27 Sheets-Sheet 2

INVENTOR
Frederick L. Fuller
Samuel Brand
BY
ATTORNEY

Jan. 3, 1939.    F. L. FULLER ET AL    2,142,352
COMBINED RECORD SORTING AND ACCOUNTING MACHINE
Filed Sept. 7, 1934    27 Sheets-Sheet 3

Jan. 3, 1939.  F. L. FULLER ET AL  2,142,352
COMBINED RECORD SORTING AND ACCOUNTING MACHINE
Filed Sept. 7, 1934  27 Sheets-Sheet 4

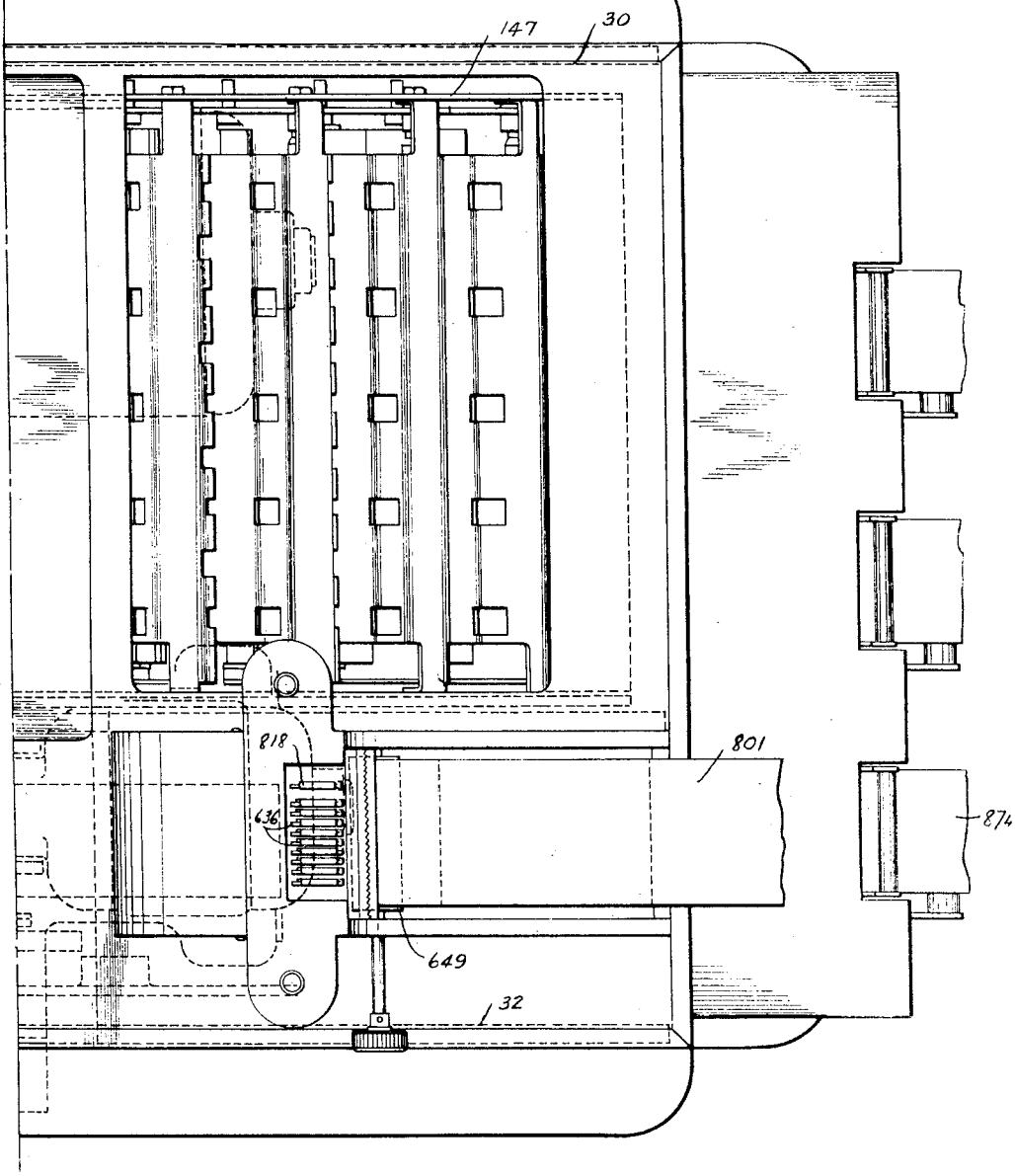

Jan. 3, 1939. F. L. FULLER ET AL 2,142,352
COMBINED RECORD SORTING AND ACCOUNTING MACHINE
Filed Sept. 7, 1934 27 Sheets-Sheet 6

Jan. 3, 1939. F. L. FULLER ET AL 2,142,352
COMBINED RECORD SORTING AND ACCOUNTING MACHINE
Filed Sept. 7, 1934 27 Sheets-Sheet 7
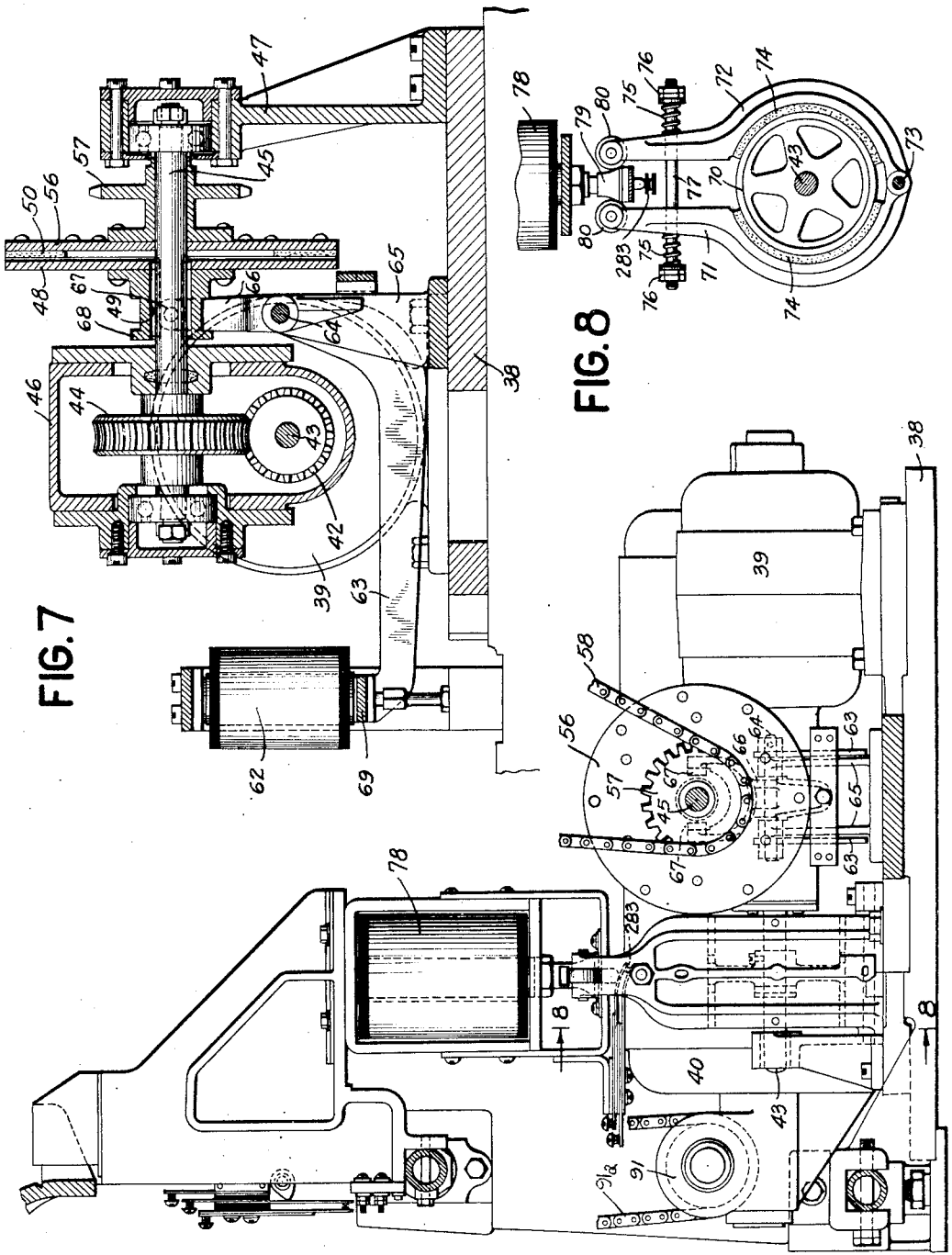

Jan. 3, 1939.  F. L. FULLER ET AL  2,142,352
COMBINED RECORD SORTING AND ACCOUNTING MACHINE
Filed Sept. 7, 1934    27 Sheets-Sheet 8
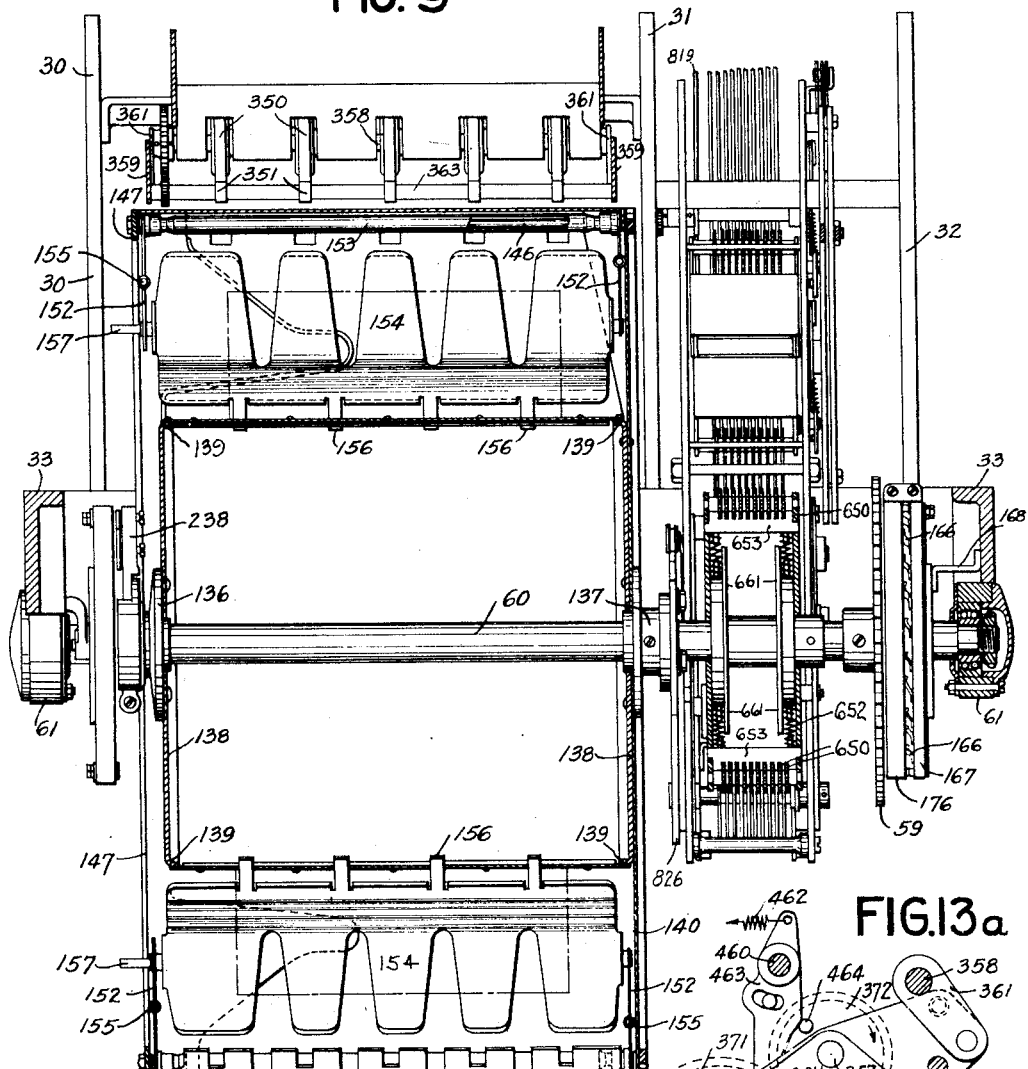
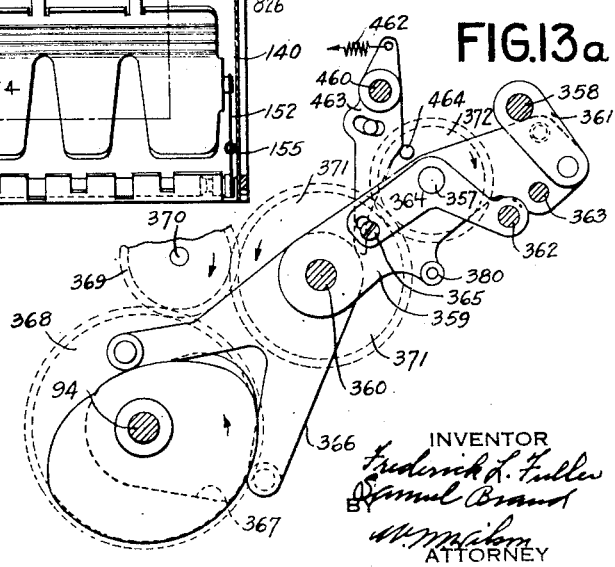
INVENTOR
Frederick L. Fuller
Samuel Brand
BY
ATTORNEY Jan. 3, 1939. F. L. FULLER ET AL 2,142,352
COMBINED RECORD SORTING AND ACCOUNTING MACHINE
Filed Sept. 7, 1934 27 Sheets-Sheet 9
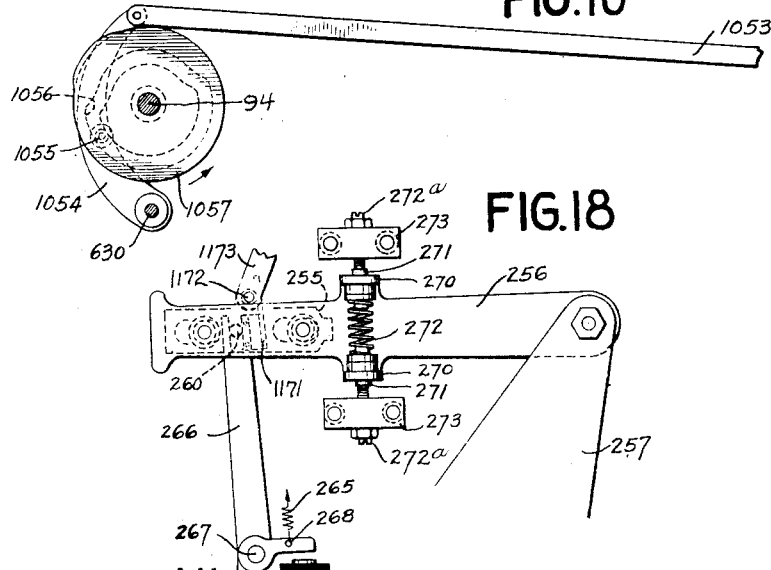

Jan. 3, 1939.　　F. L. FULLER ET AL　　2,142,352
COMBINED RECORD SORTING AND ACCOUNTING MACHINE
Filed Sept. 7, 1934　　27 Sheets-Sheet 10

Jan. 3, 1939.  F. L. FULLER ET AL  2,142,352
COMBINED RECORD SORTING AND ACCOUNTING MACHINE
Filed Sept. 7, 1934  27 Sheets-Sheet 11

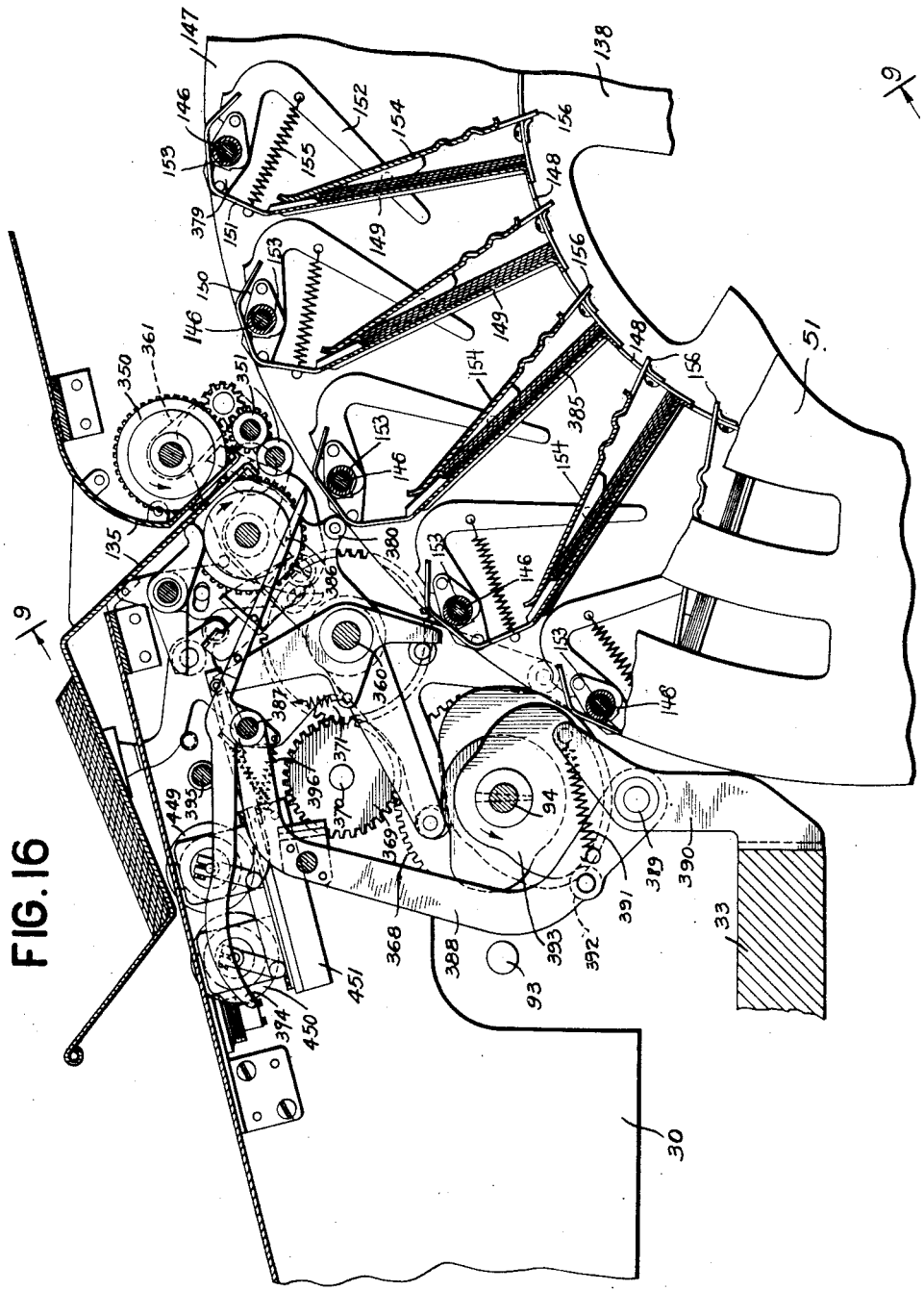

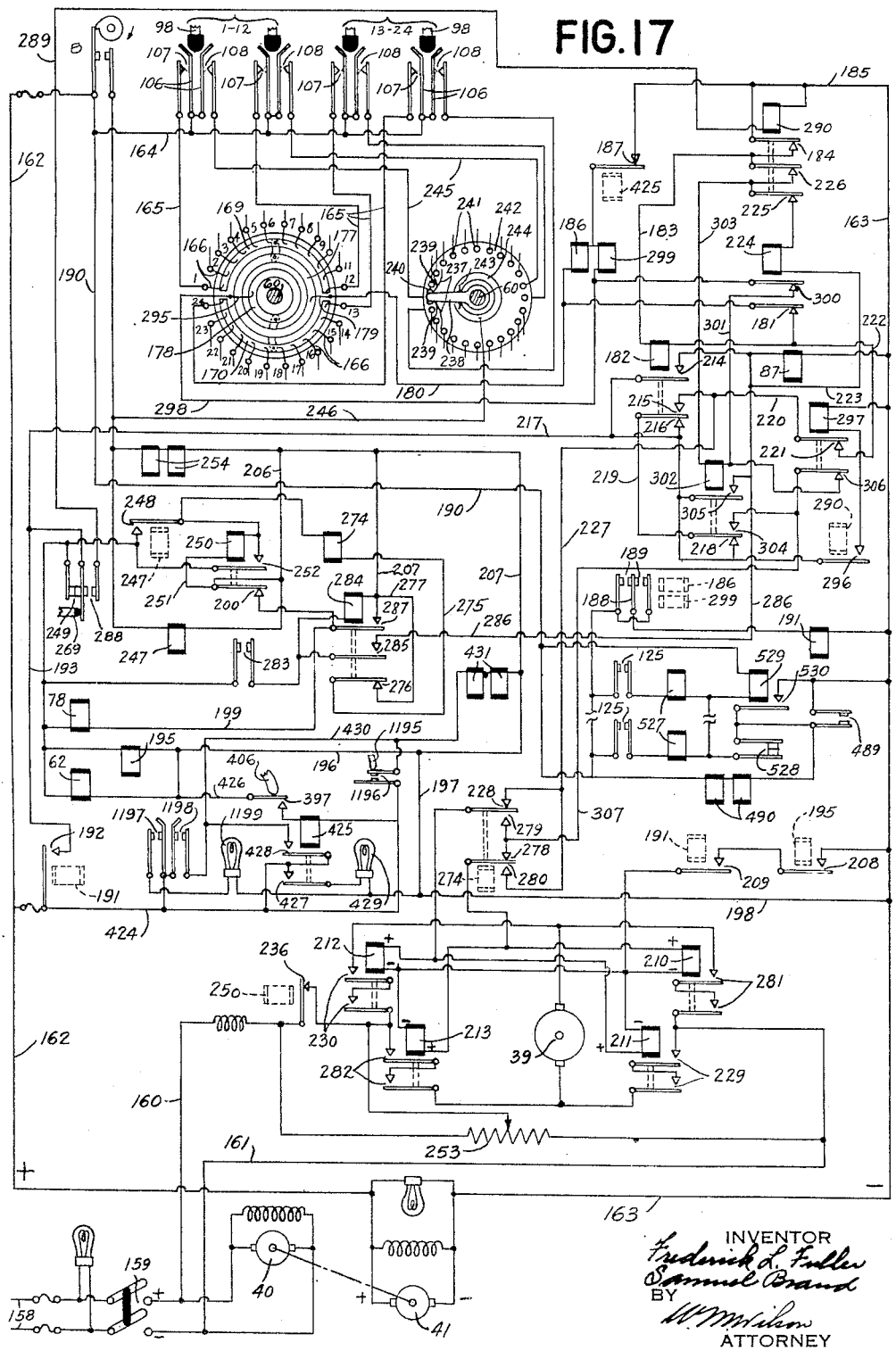

Jan. 3, 1939.  F. L. FULLER ET AL  2,142,352
COMBINED RECORD SORTING AND ACCOUNTING MACHINE
Filed Sept. 7, 1934  27 Sheets-Sheet 14
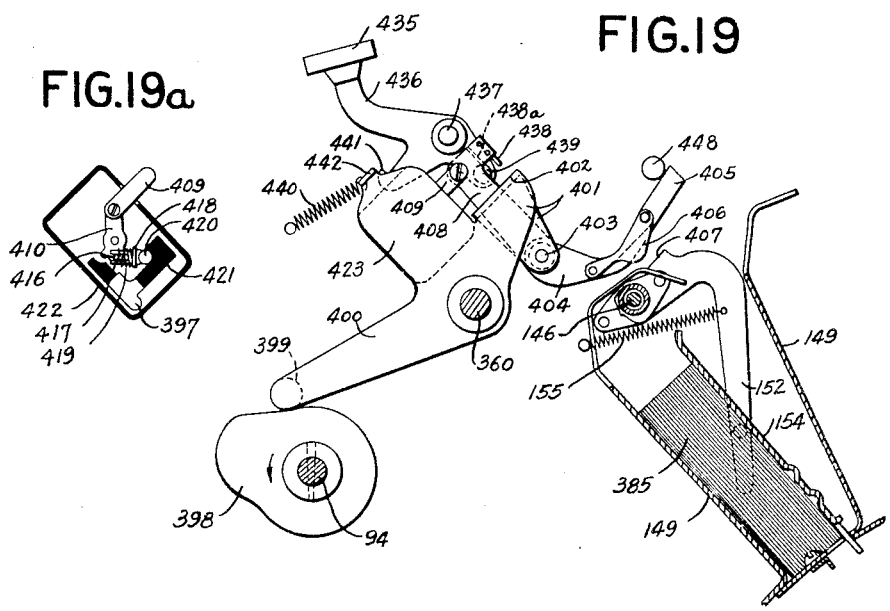
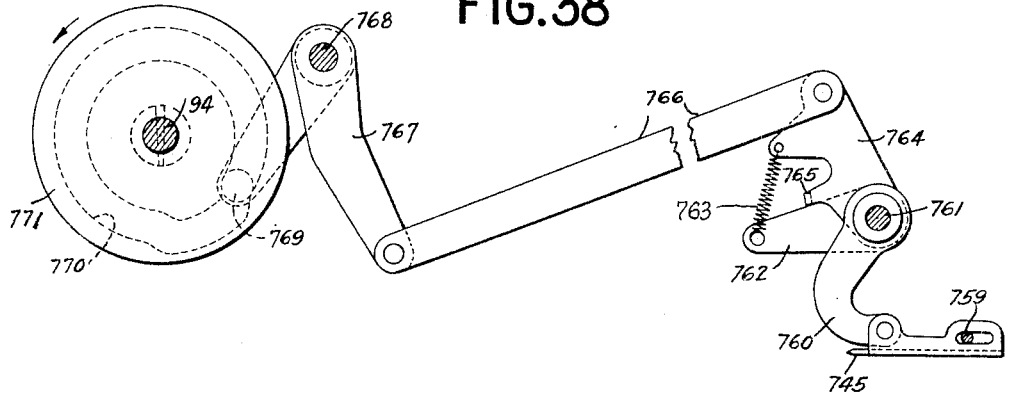

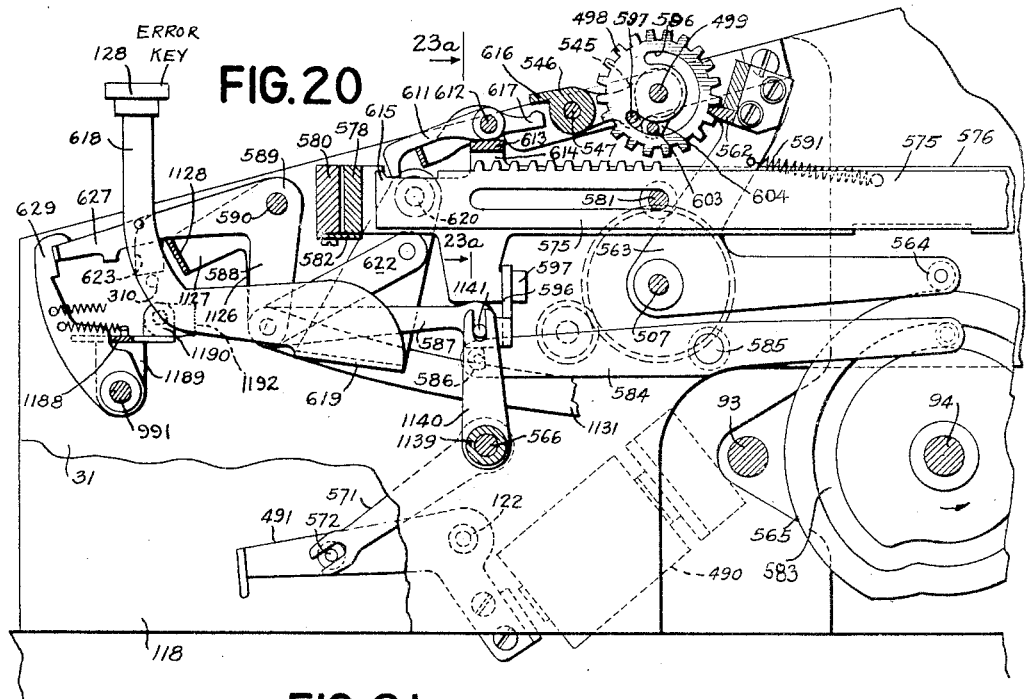
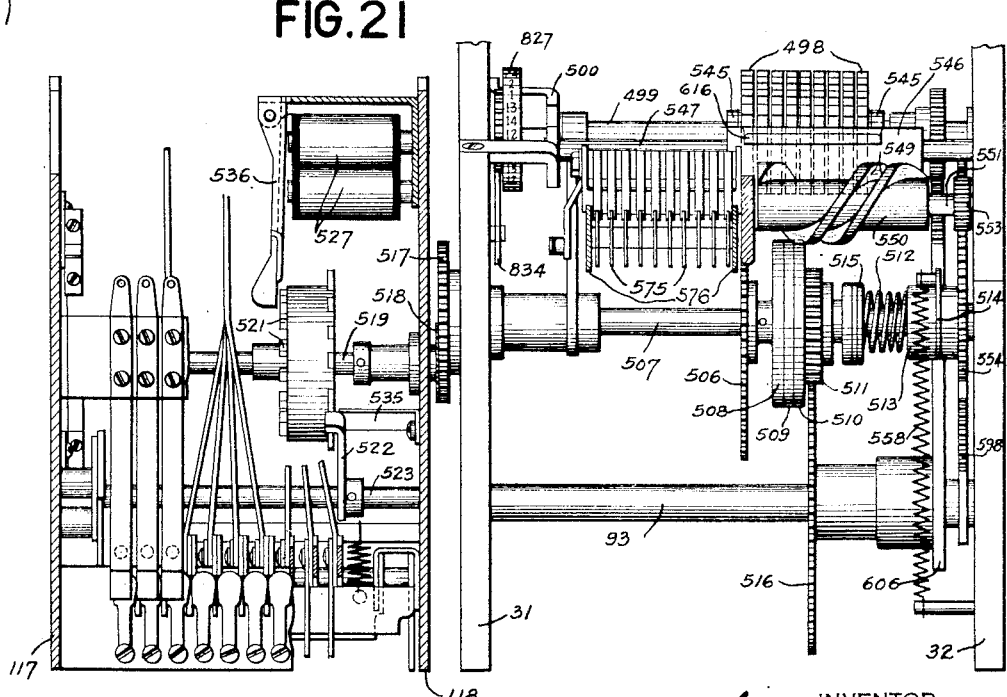

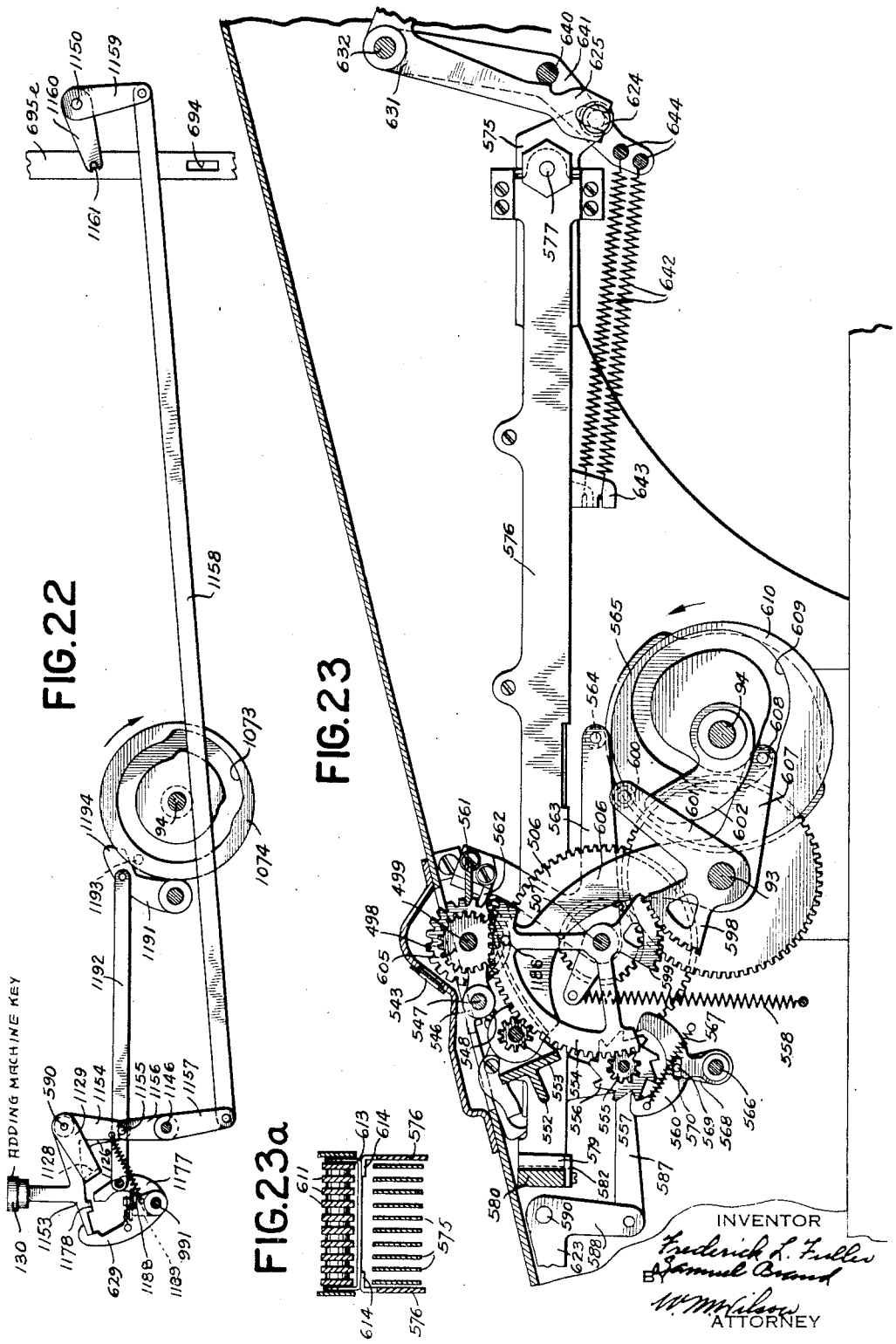

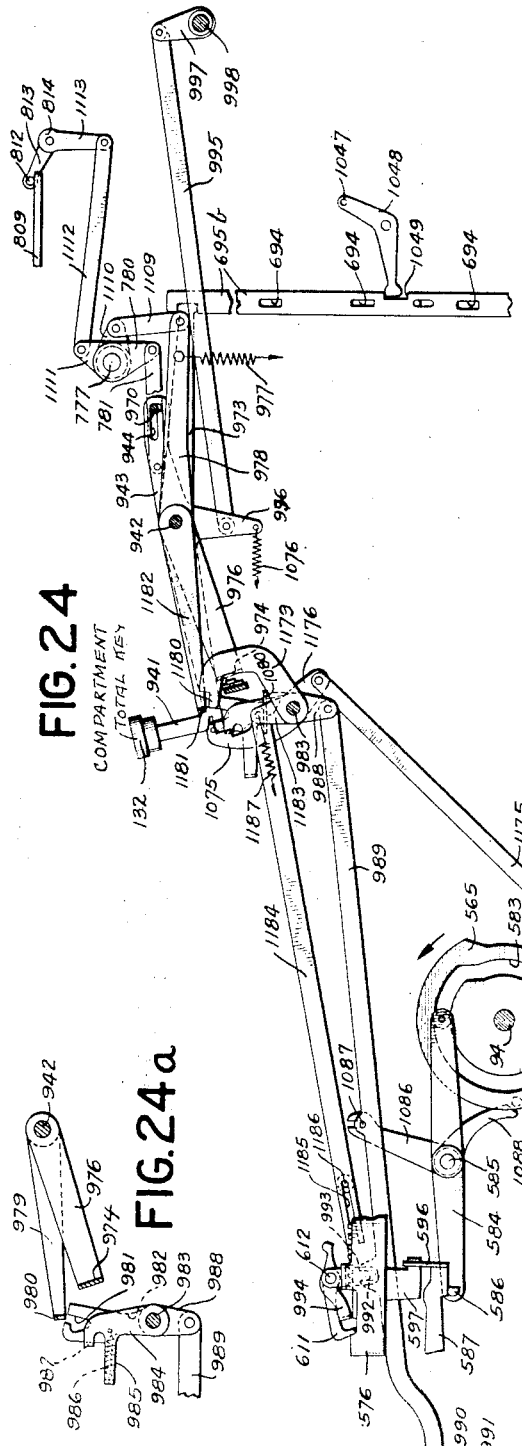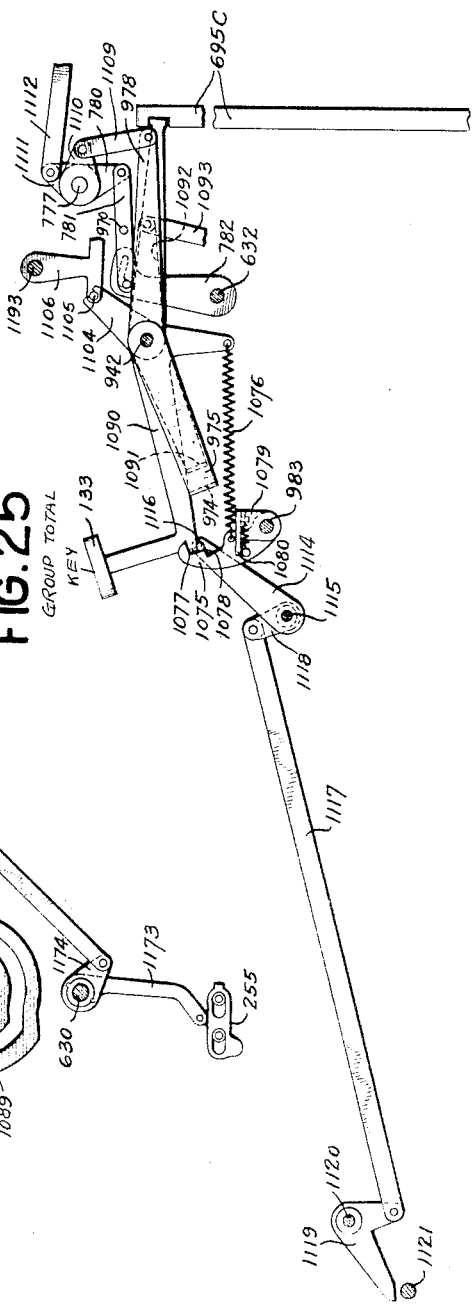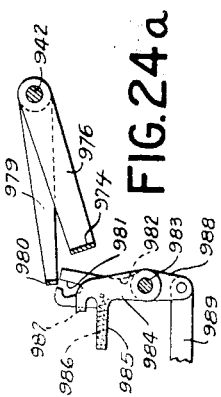

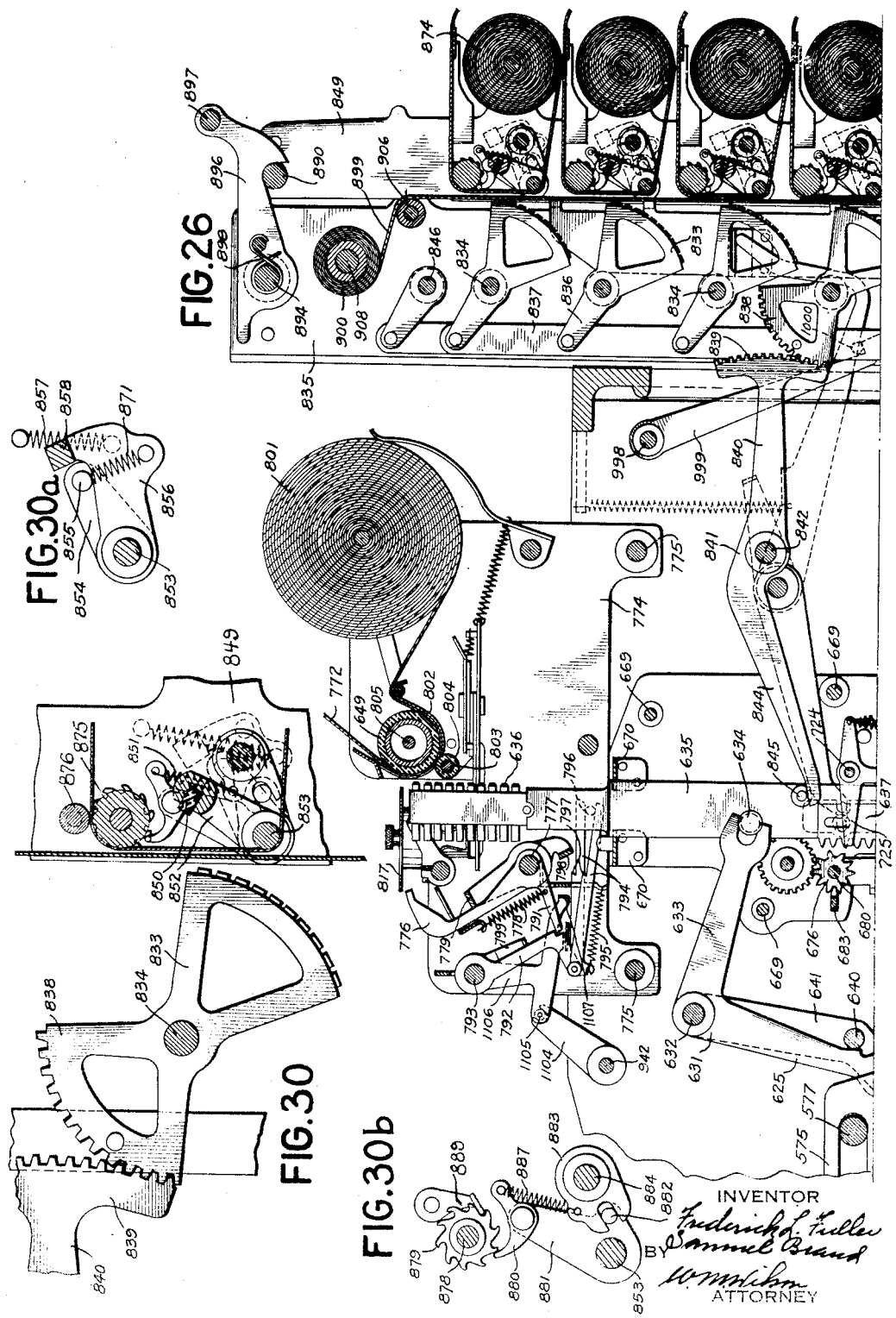

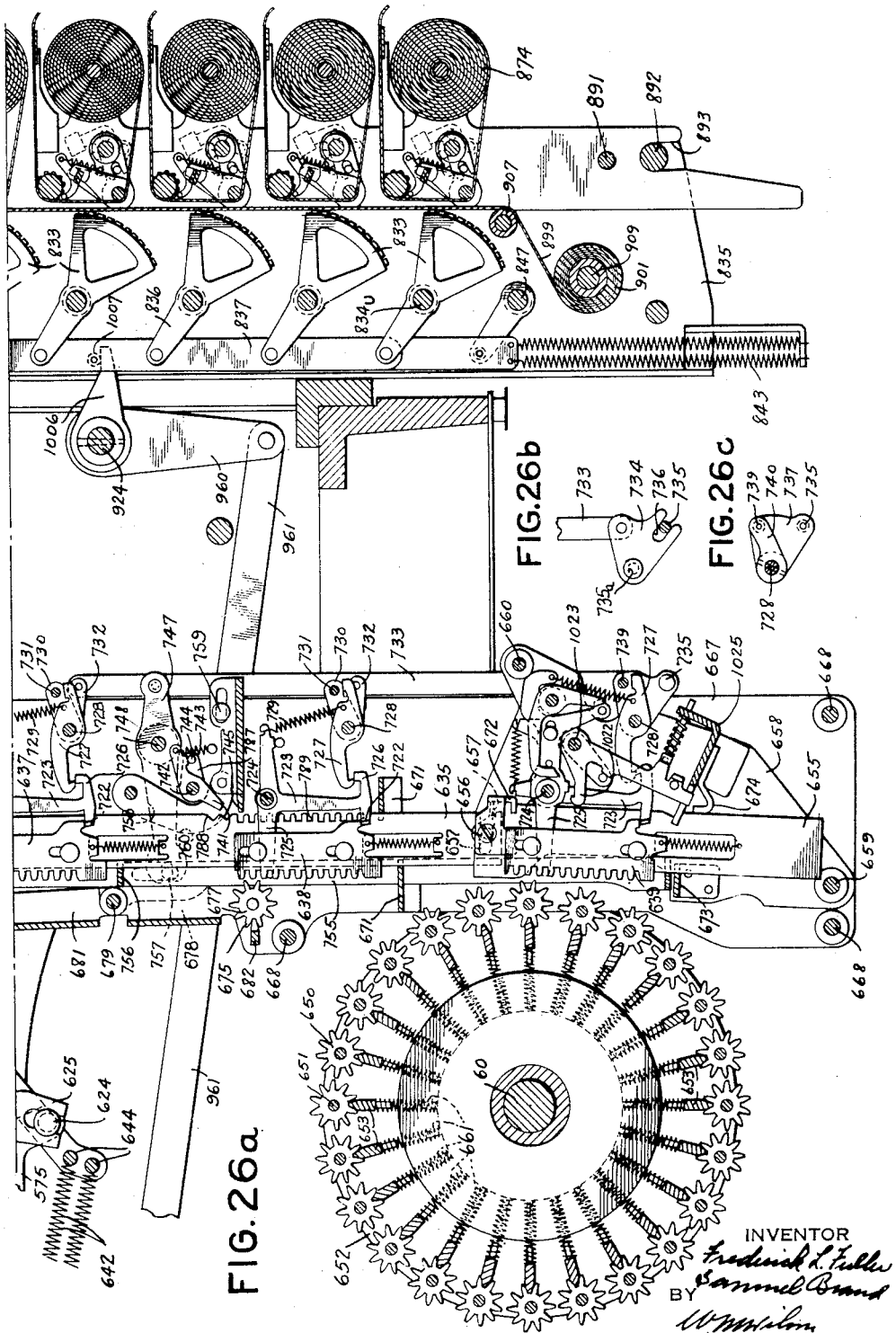

Jan. 3, 1939.   F. L. FULLER ET AL   2,142,352
COMBINED RECORD SORTING AND ACCOUNTING MACHINE
Filed Sept. 7, 1934   27 Sheets-Sheet 20

Jan. 3, 1939. F. L. FULLER ET AL 2,142,352
COMBINED RECORD SORTING AND ACCOUNTING MACHINE
Filed Sept. 7, 1934 27 Sheets-Sheet 21

INVENTOR
Frederick L. Fuller
Samuel Brand
BY
ATTORNEY

Jan. 3, 1939.  F. L. FULLER ET AL  2,142,352
COMBINED RECORD SORTING AND ACCOUNTING MACHINE
Filed Sept. 7, 1934  27 Sheets-Sheet 22

INVENTOR
Frederick L. Fuller
Samuel Brand
BY
ATTORNEY

Jan. 3, 1939.　　F. L. FULLER ET AL　　2,142,352
COMBINED RECORD SORTING AND ACCOUNTING MACHINE
Filed Sept. 7, 1934　　27 Sheets-Sheet 23

Jan. 3, 1939.   F. L. FULLER ET AL   2,142,352
COMBINED RECORD SORTING AND ACCOUNTING MACHINE
Filed Sept. 7, 1934    27 Sheets-Sheet 24

Jan. 3, 1939.  F. L. FULLER ET AL  2,142,352
COMBINED RECORD SORTING AND ACCOUNTING MACHINE
Filed Sept. 7, 1934  27 Sheets-Sheet 25

Jan. 3, 1939.  F. L. FULLER ET AL  2,142,352
COMBINED RECORD SORTING AND ACCOUNTING MACHINE
Filed Sept. 7, 1934  27 Sheets-Sheet 26

INVENTOR.
Frederick L. Fuller
Samuel Brand
BY
W. M. Wilson
ATTORNEY

Jan. 3, 1939.  F. L. FULLER ET AL  2,142,352
COMBINED RECORD SORTING AND ACCOUNTING MACHINE
Filed Sept. 7, 1934   27 Sheets-Sheet 27
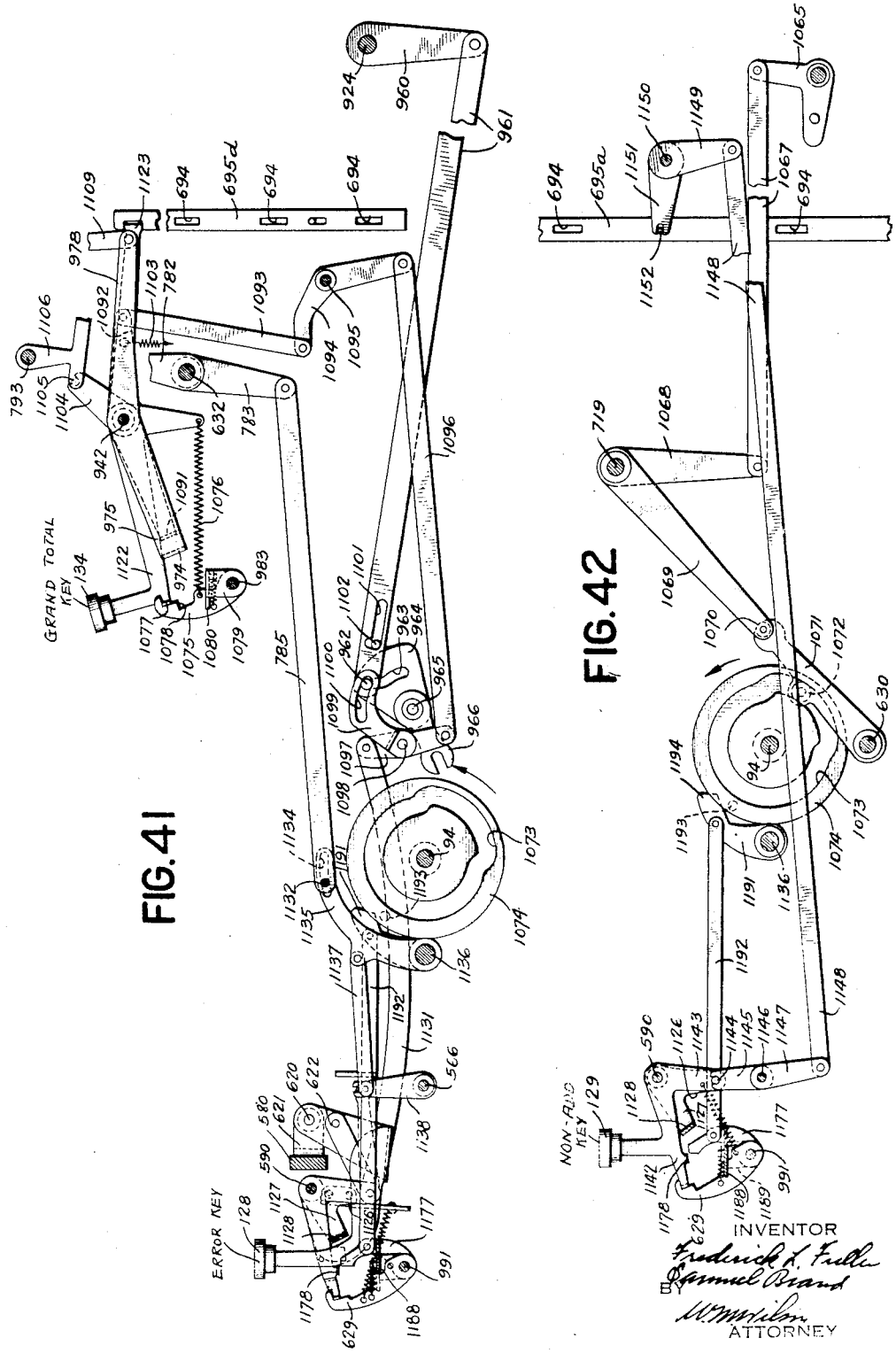

UNITED STATES PATENT OFFICE 2,142,352

COMBINED RECORD SORTING AND ACCOUNTING MACHINE

Frederick L. Fuller, West Orange, N. J., and Samuel Brand, Binghamton, N. Y., assignors to International Business Machines Corporation, New York, N. Y., a corporation of New York Application September 7, 1934, Serial No. 743,044

24 Claims. (Cl. 235—58)

This invention relates to improvements in accounting machines and the like and more particularly relates to combined sorting and accounting machines.

The herein disclosed machine is adapted to sort papers of different classifications such, for example, as checks, and for accumulating the amounts represented by the assorted papers as checks. In addition to accumulating the amounts of the checks on individual totalizers according to their classification, the amounts are accumulated on a grand totalizer and on a group totalizer.

As the amounts are entered into the individual totalizers they are printed on corresponding individual tapes and also on another tape hereinafter known as the control tape. The totals of the amounts accumulated on the individual totalizers may be cleared and printed on the corresponding tapes. The group and grand totals are printed on the control tape only.

One object of the invention is to provide a novel electrically controlled differential escapement for setting up amounts to be entered in the machine.

Another object is to provide a novel device for clearing a path for the papers as they are fed into the several compartments.

Another object is to provide a novel check feeding mechanism.

Still another object is to provide novel means for determining when a compartment is filled to capacity and for locking up the machine until the checks are removed from the compartment.

Another object of the invention is the provision of means for controlling the direction of rotation of the sorting drum whereby the drum rotates from the last previous position by the shorter of two directions to the selected position.

A further object is to provide novel means to arrest the movement of the sorting drum by momentarily reversing the direction of current through the electric driving motor.

Another object of the invention is to provide novel means to prevent engagement of the differential racks with the set up wheels.

Still another object is to provide means for engaging a series of adding racks with a selected one of a plurality of totalizers.

A further object is to provide novel transfer or carry mechanism.

Another object is to provide means to control the transfer mechanism to effect zero suppression.

Another object is to provide means to sense transfer pawls and means operated under the control of the sensing means to effect zero suppression.

Still a further object is to provide a novel totalizer engaging means.

Another object is to provide novel totalizer engaging selecting means.

Another object is to provide novel means for selecting a particular printing mechanism for operation from a plurality of groups of such printing mechanisms.

Other objects and advantages will appear from the following specification and drawings in which drawings:

Fig. 3 is a top plan view of the set-up device operated under the control of the amount keys.

Fig. 3a is a detail view of the device for shifting the set up wheels when an amount is being set thereon.

Figure 4:
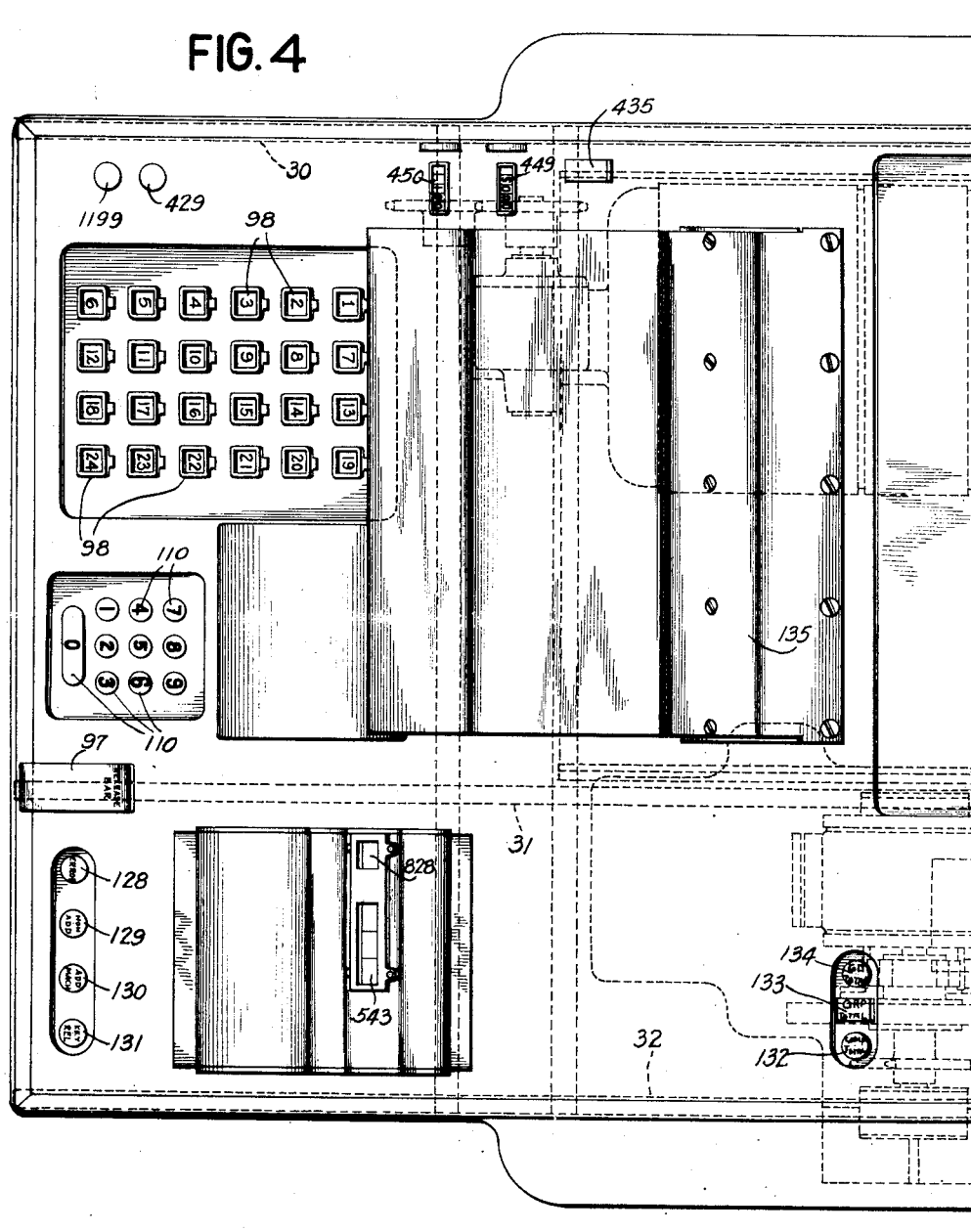

Figs. 4 and 4a taken together show a top plan view of the machine.

Figure 5:
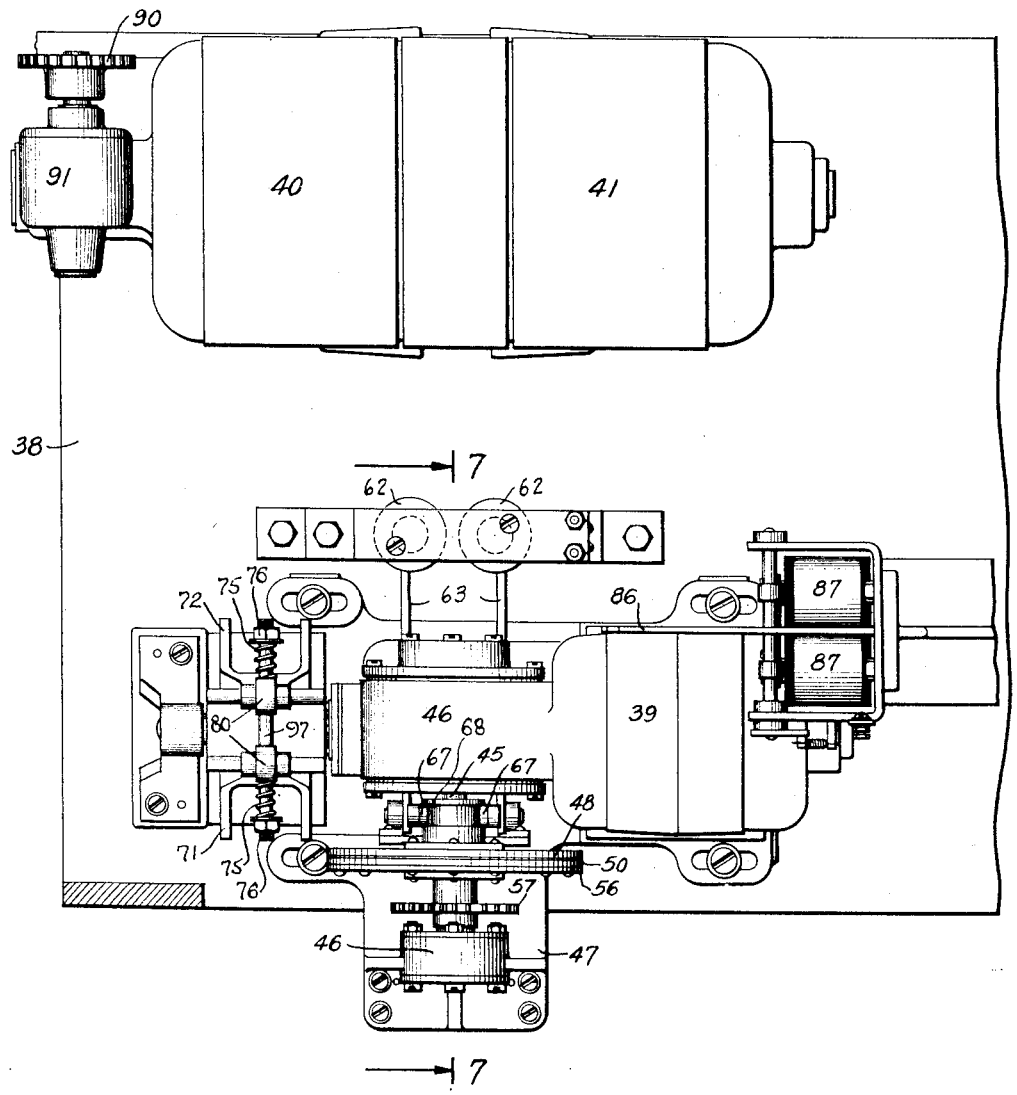

Fig. 5 is a top plan view of the driving mechanism.

Fig. 6 is an enlarged view in elevation of the drive mechanism.

Fig. 7 is a sectional view taken on line 7—7, Fig. 5.

Fig. 8 is an enlarged detail sectional view taken on line 8—8 (Fig. 6) showing the brake for the sorting drum.

Fig. 9 is a sectional view taken on the line 9—9 of Fig. 16 vertically through the sorting drum and pocket totalizer reel.

Fig. 10 is a detail view of the zero elimination operating mechanism.

Fig. 11 illustrates the one revolution clutch and its control by the release bar.

Fig. 11a is a perspective view showing in detail the release bar control device.

Figure 12:
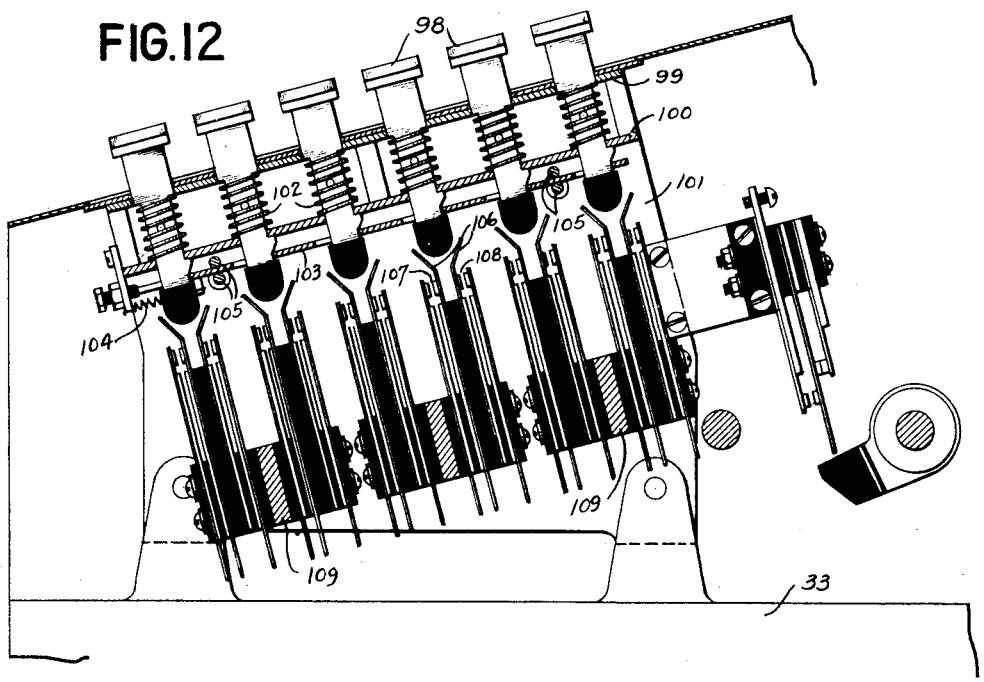

Fig. 12 is a sectional view showing in elevation a bank of pocket selector keys.

Figure 13:
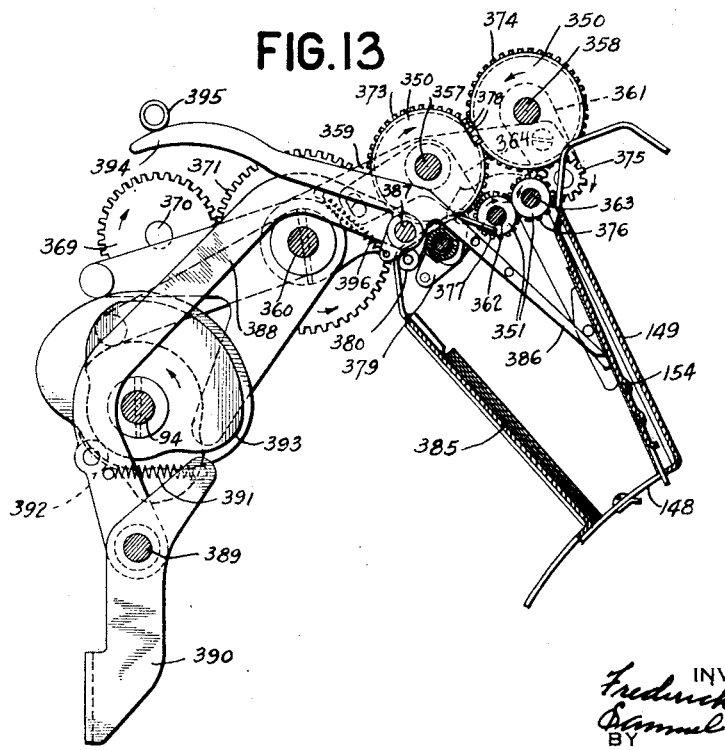

Fig. 13 is a detail view of the device for entering the checks into the selected pockets.

Fig. 13a shows the construction of the feed roller frame.

Figure 14:
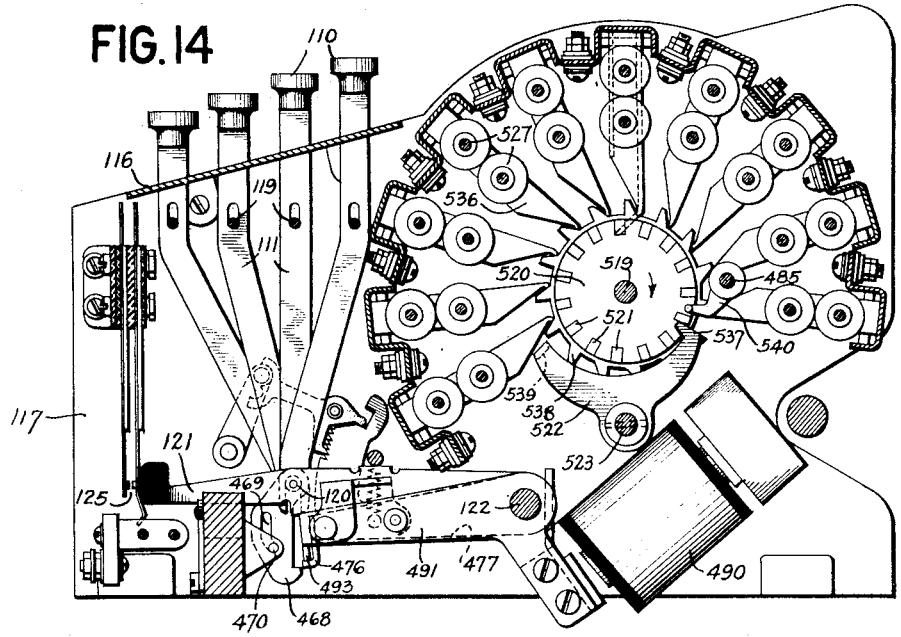

Fig. 14 is a sectional view of the amount set up mechanism.

Figure 15:
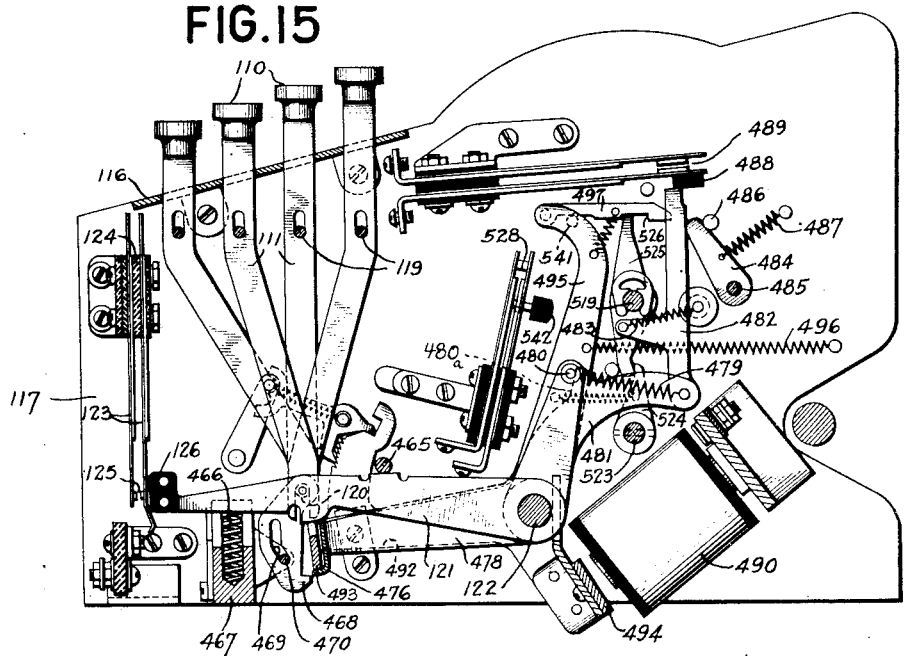

Fig. 15 is a sectional view showing the set-up control.

Fig. 16 is a detail sectional view of a section of the sorting drum together with the check feeding mechanism.

Figure 16A:
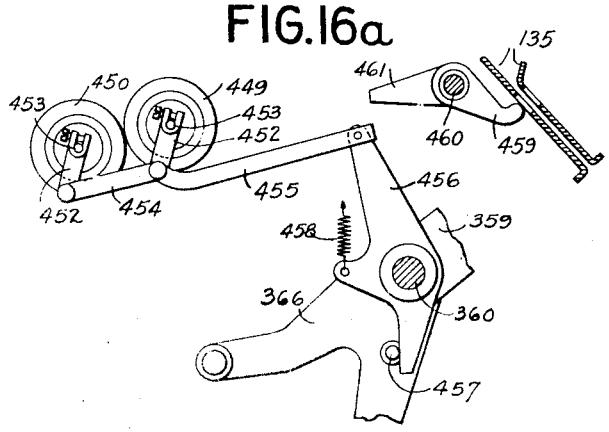

Fig. 16a is a detail view of the check counter operating mechanism.

Fig. 17 illustrates the circuit diagram of the machine.

Fig. 18 is a detail view of the locking bolt for the drum.

Fig. 19 is a detail view of the full compartment signal and locking device.

Fig. 19a is a detail view of the full pocket switch.

Fig. 20 is a detail view of the racks, set-up wheels and certain controlling mechanism associated therewith.

Fig. 21 is a view in front elevation showing a part of the ten-key set up mechanism and the means for driving the master set-up wheel.

Fig. 22 is a detail view of the adding machine key and associated mechanism.

Fig. 23 is a detail view of the set-up mechanism and the means for restoring the set up wheels to home or normal positions.

Fig. 23a is a sectional view taken on line 23a—23a, Fig. 20.

Fig. 24 is a detail view of the compartment total key and the devices set thereby.

Fig. 24a is a detail view of a part of the mechanism operated by the total keys.

Fig. 25 is a detail view of the group total key and the mechanisms set thereby.

Figs. 26 and 26a taken together show in detail the accumulating and printing mechanisms.

Figs. 26b and 26c are detail views of mechanism shown in Fig. 26a.

Figure 27:
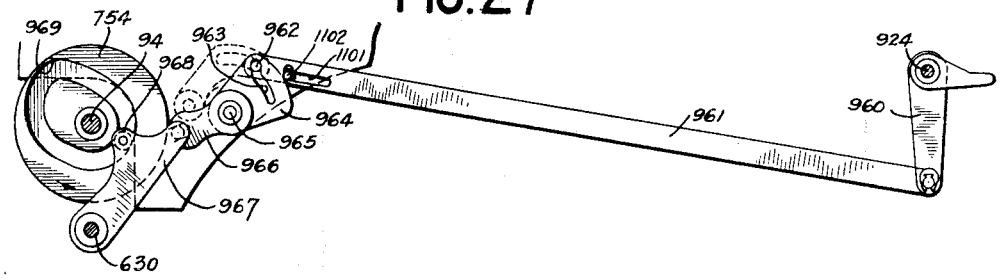

Fig. 27 is a detail view of the means for restoring the compartment symbol carriers after they have been set on total taking operations.

Figure 28:
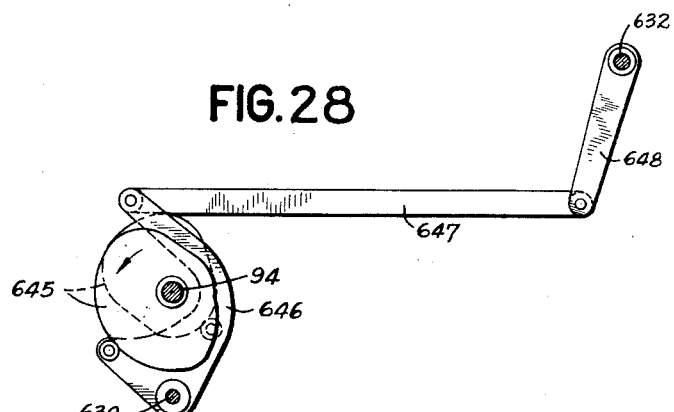

Fig. 28 is a detail view of the means for operating the rack adjusting means.

Figure 29:
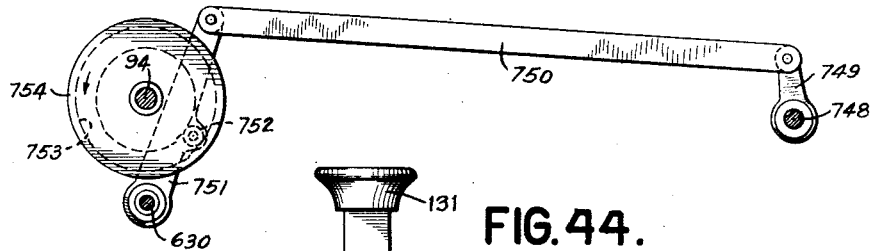

Fig. 29 is a detail view of the transfer restoring cam.

Fig. 30 is an enlarged detail view of one of the compartment tape printers showing particularly the means for setting the type elements and the printing hammer.

Fig. 30a is a detail view of a part of the mechanism shown in Fig. 30.

Fig. 30b is a detail view of a part of the mechanism shown in Fig. 30.

Figures 31, 32:
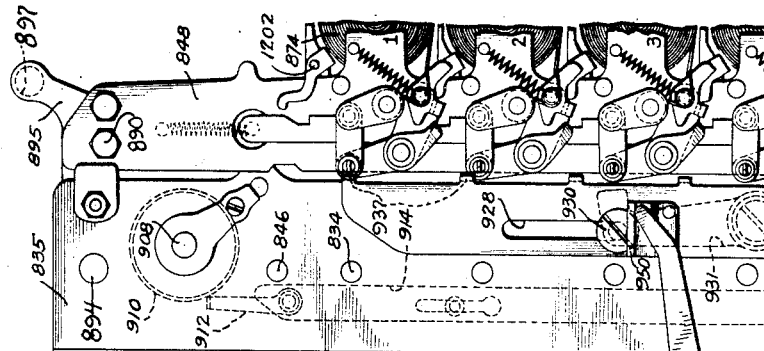

Fig. 31 is an enlarged detail view of one of the compartment printers showing the hammers selecting and retracting mechanism.

Figure 32A:
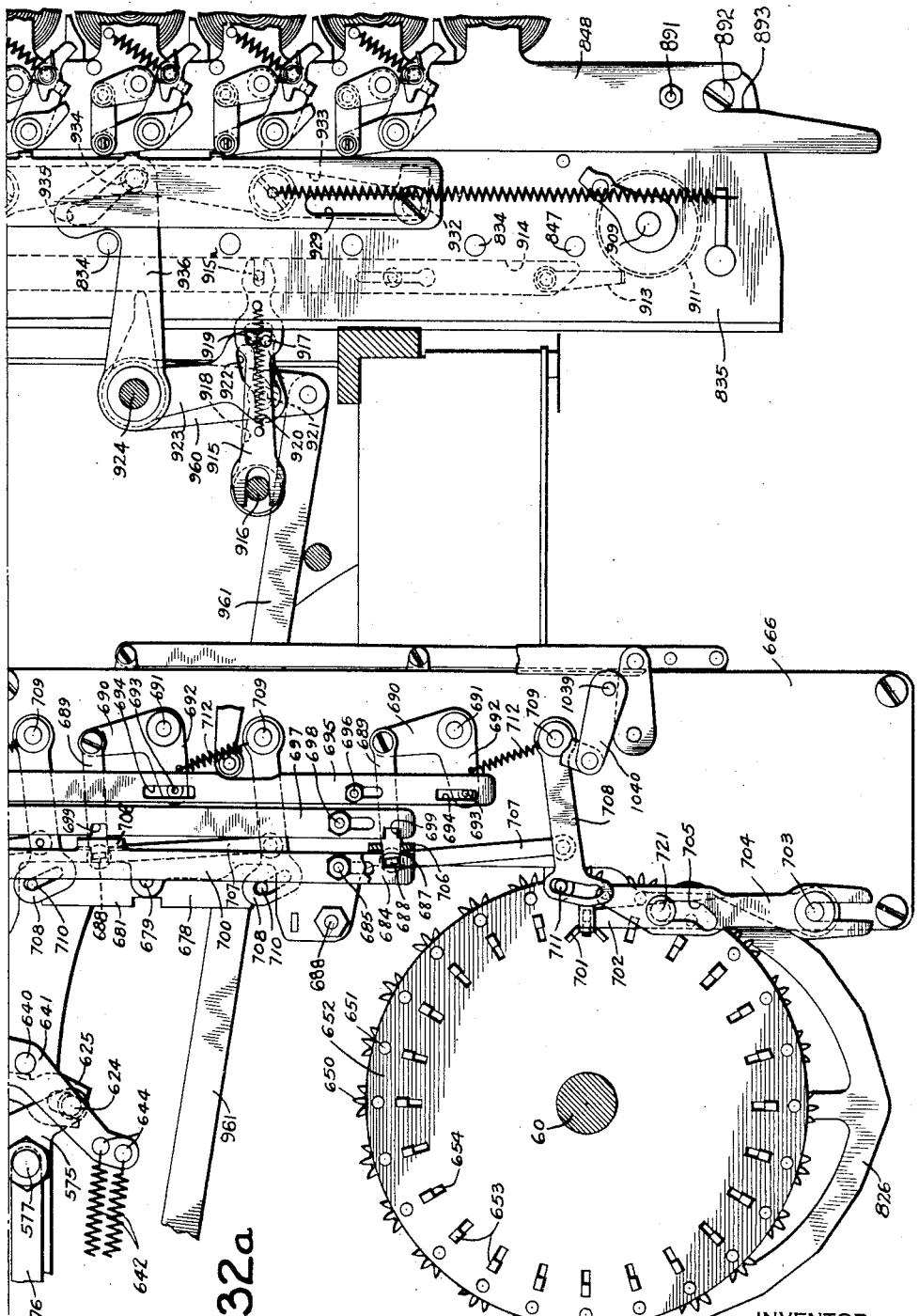

Figs. 32 and 32a taken together illustrate the totalizer engaging and the disengaging control mechanisms.

Figure 33:
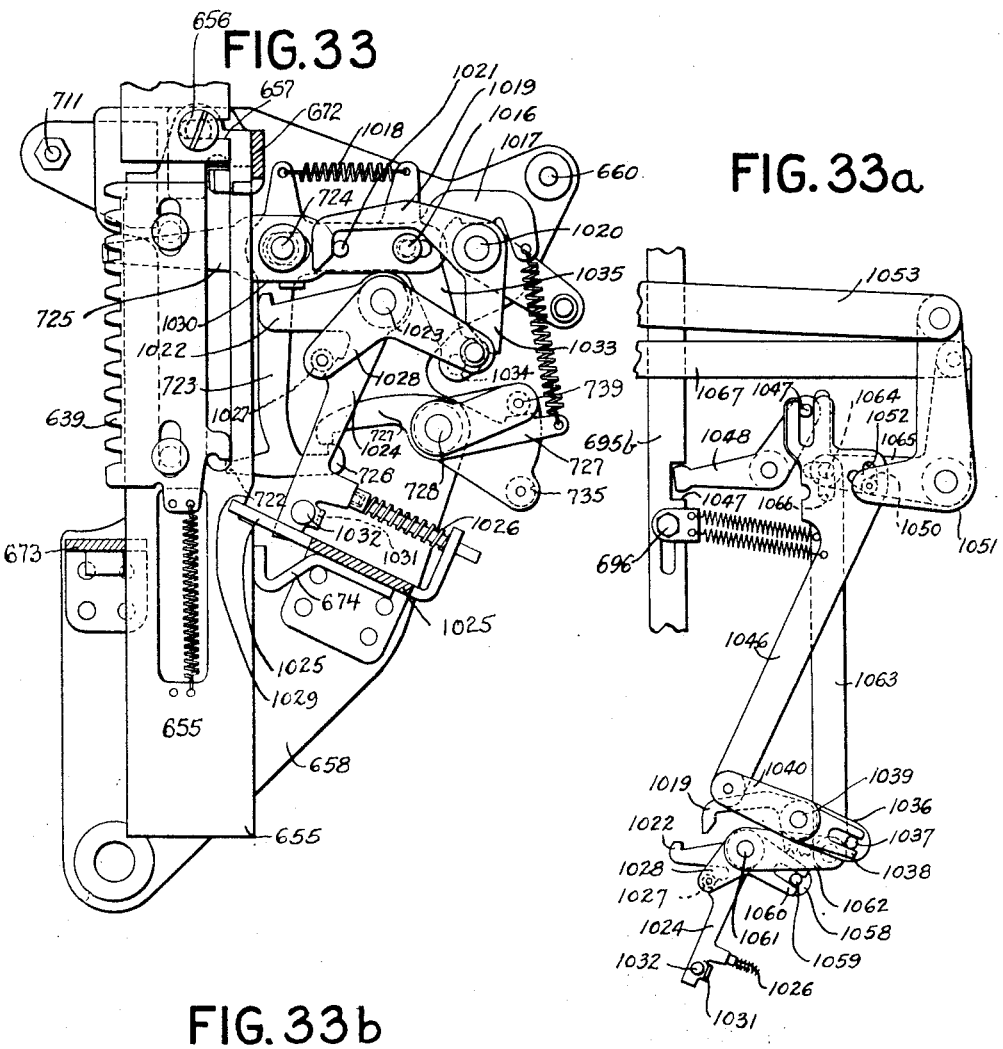

Fig. 33 is an enlarged detail view of the actuator racks, zero elimination mechanism and transfer or carry mechanism for the compartment totalizers.

Fig. 33a is a detail view of the mechanism for controlling the zero elimination when total printing from the compartment totalizers.

Figure 33B:
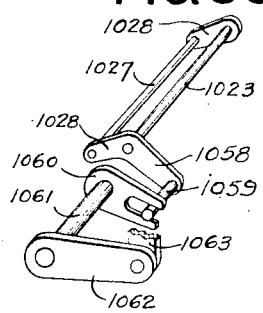
Figure 33C:
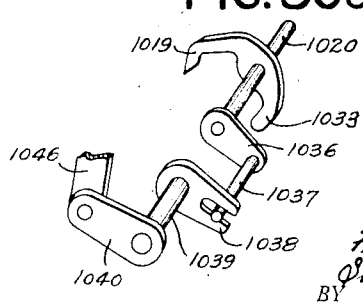

Figs. 33b and 33c are fragmentary perspective views of portions of the structure shown in Figs. 33 and 33a.

Figure 34:
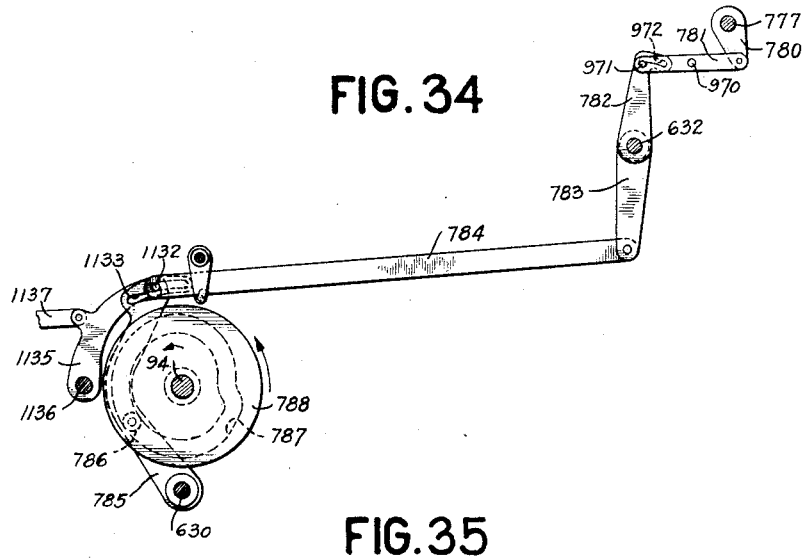

Fig. 34 is a detail view of the control printers operating mechanism.

Figure 35:
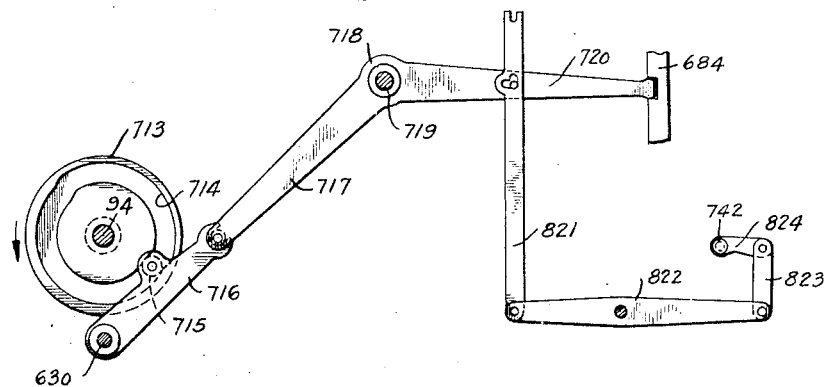

Fig. 35 illustrates the mechanism for operating the totalizer adding engaging slide.

Figure 36:
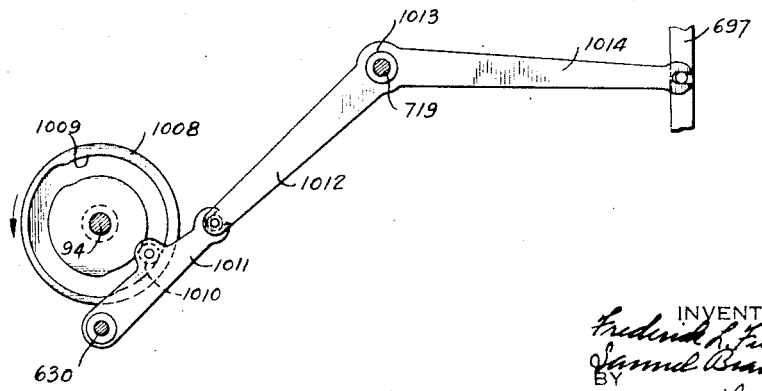

Fig. 36 is a detail view of the operating mechanism for engaging the totalizers on total taking operations.

Figure 37:
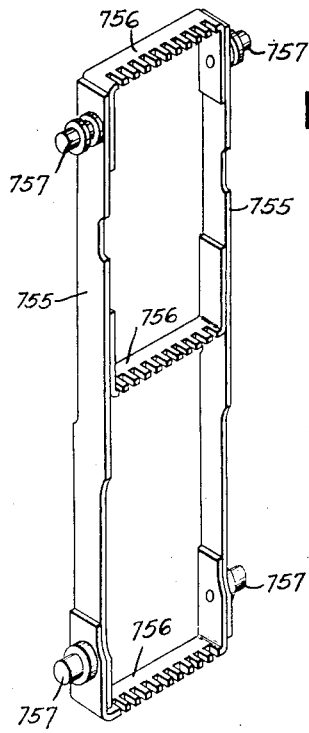

Fig. 37 is a perspective view of the adding rack restoring frame.

Fig. 38 is a detail view of the mechanism for operating the aliner for the vertical differential slides.

Figure 39:
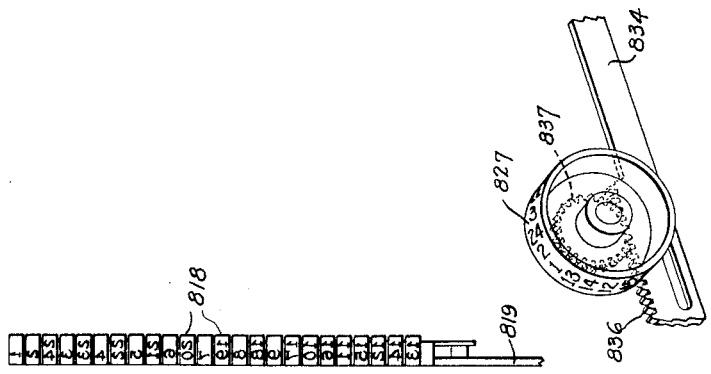

Fig. 39 is an enlarged detail view of the types carried by the compartment printing slide.

Figure 40:
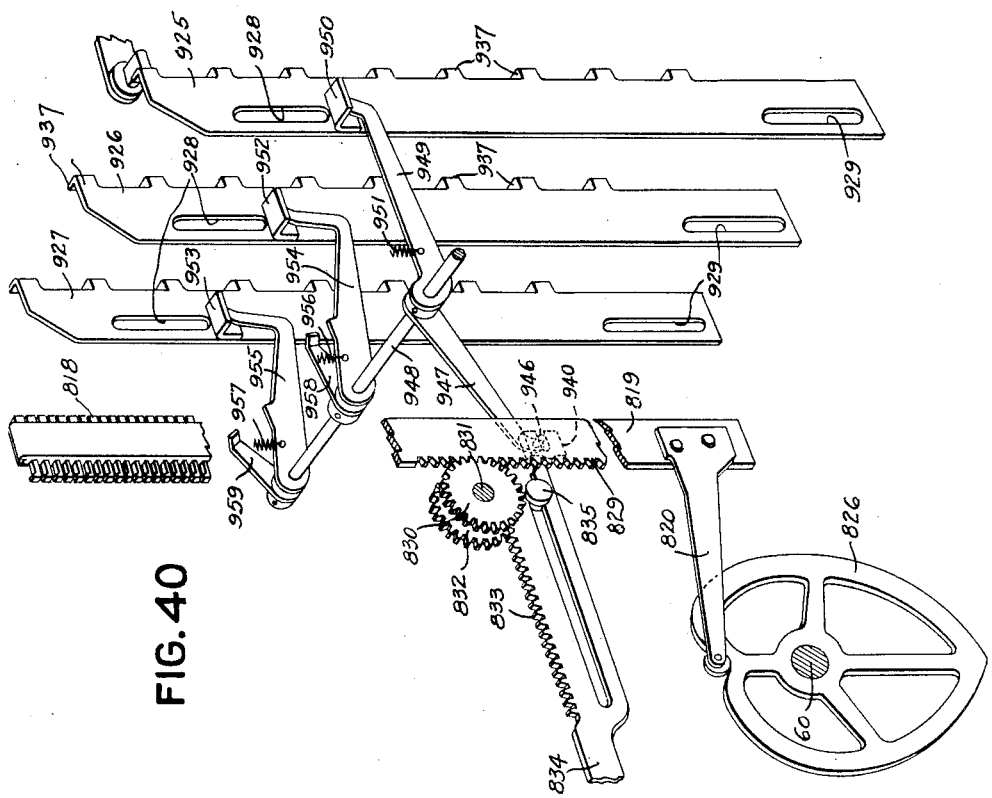

Fig. 40 is a perspective view of the compartment indicating, compartment printer selecting and compartment indicator printing mechanisms.

Fig. 41 is a detail view showing the error key mechanism and the grand total key mechanism.

Fig. 42 is a detail view showing the non-add key mechanism.

Figure 43:
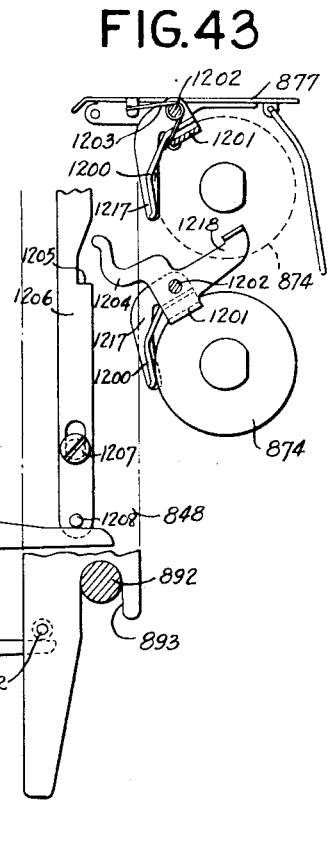

Fig. 43 is a detail view of the mechanism for locking the release bar when a compartment tape roll is exhausted.

Figure 44:
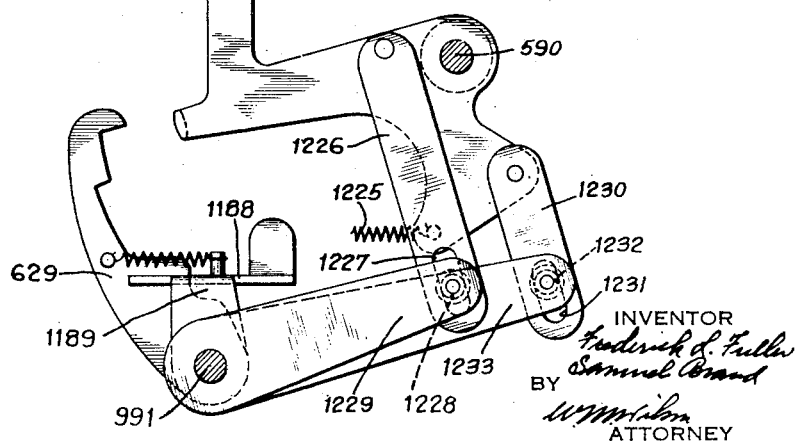

Fig. 44 is a detail view of the release key mechanism.

*General description*

The herein disclosed machine is designed simultaneously to list and sort a group of promiscuously arranged checks. The amounts of the checks are listed on a ten-key keyboard and the checks are then dropped into an aperture which communicates with a sorting drum provided with a plurality of compartments arranged annularly about the drum. The drum is rotated under the control of the keys of a second keyboard to bring the selected compartment into registration with the aperture.

A plurality of totalizers is provided there being a totalizer associated with each sorting compartment on the drum. The amount of each check sorted into a particular compartment is entered into the totalizers identified with the compartment. In addition to the above accumulators, which are hereinafter referred to as the "compartment totalizers", there are provided a group totalizer and a grand totalizer. Each amount entered into a compartment totalizer is also entered into the group totalizer and the grand totalizer.

A total may be taken from a selected compartment totalizer, the group totalizer or the grand totalizer by operation of the proper keys provided for that purpose.

As the items are entered they are printed on a record material hereinafter referred to as the "control tape" and on a selected compartment tape there being provided a tape for each compartment on the sorting drum. When a total is taken from a compartment totalizer the total is printed on the corresponding tape. The group totals and grand totals are printed only on the control tape. In this manner each check is listed on the control tape in the order in which it is sorted, and a separate list of checks assorted into each compartment and the total thereof is printed on the compartment tape.

The keyboard of the machine comprises a selector keyboard, an amount keyboard, and various special control and total keys. Depression of one of the selector keys determines the point at which the sorting drum is to be stopped, the drum always rotating from the point at which it was last stopped the shorter distance to bring the selected compartment to the check receiving aperture. The item entering or amount keys are ten in number. These keys are operated after the manner of the usual ten-key keyboard to control the setting on suitable set-up mechanism amounts equal in value to the keys struck. The set-up mechanism is then operated to adjust the totalizer actuators and the printing mechanisms in order that the amount may be entered into the grand totalizers, the group totalizers and the selected compartment totalizer, and that the amount may be printed on the control tape and on the selected compartment tape.

A number of special keys are provided the purposes of which are indicated by their designation. These special keys are: the error key, the non-add key, adding machine key and the release key. Operation of the error key controls the machine to erase an amount erroneously set up before said amount is entered into the totalizers and printed. The non-add key permits the listing of items on the control tape but disables the totalizers and compartment tape printers. The adding machine key disables the compartment printers and all but one totalizer thus making possible the listing and accumulation of items and printing the total thereof. The release key may be depressed in order to release any of the total keys or the special keys except the error key erroneously depressed.

There are twenty-four compartment totalizers provided corresponding in number to the number of compartments in the sorter drum. The compartment totalizers are mounted on a reel which is made to rotate in unison with the sorter drum for the purpose of selection. Common actuators and carry mechanism are provided for the compartment totalizers. The group and grand totalizers are mounted separately and are provided with individual operating mechanisms. The selected compartment totalizers, the group totalizers and the grand totalizers are operated at each item entering operation but are individually controlled on total taking operations. In addition to the control of the totalizers by their corresponding total keys, the non-add key disables all the totalizers engaging mechanism and the adding machine key controls the engaging mechanism to engage but one totalizer.

The control tape printer is located at the top of the machine where the printing is visible to the operator. All items entered into the machine and group totals and grand totals are printed by this printer. The totals cleared from the compartment totalizers, however, are not printed on the control tape. The control tape printer is disabled by operation of the error key.

There are 24 compartment printers, one for each sorting compartment. These printers are arranged in three groups and are located at the back of the machine. The compartment printers are selected under control of the selector keys and they may all be disabled by the error key, the non-add key and the adding machine key. The compartment tape bearing the printed items and the totals of the checks sorted into the corresponding compartment may be detached to accompany the group of checks when removed from the compartment.

The main framework of the machine includes three longitudinal frames 30, 31 and 32 (Figs. 2, 3, 4 and 4a) mounted on a sub base 33 (Fig. 2) which in turn is supported on legs 34. The frames 30, 31 and 32 are joined by a back frame 35. The front legs 34 are joined by a rod 36 and the back legs are joined in a similar manner by a rod 37. These rods support a base or platform 38 (Figs. 2, 5, 6 and 7) upon which which is mounted the drum mechanism.

Drive mechanism

Separate electric motors are provided to drive the machine. One of these motors 39 (Figs. 2, 5, and 6) drives the sorting drum and the compartment totalizers. The other motor 40 drives the selecting, printing and computing mechanisms.

The motor 40 (Fig. 5) also drives a generator 41 directly connected thereto for the purpose of supplying low voltage current to operate the several relays and other electrically operated devices with which the machine is provided and which will be described in detail later in the specification.

The motor 39 is reversible in order to drive the sorting drum from the position in which it was left at the last operation through the shorter distance to a selected position.

The sorting drum indicated generally at 51 (Fig. 2) is driven by the motor 39 through a gear 42 (Fig. 7) secured on the armature shaft 43. This gear drives a gear 44 fast on a shaft 45 suitably mounted in a gear housing 46 forming a part of the motor frame, and in a bracket 47. The motor 39 and the bracket 47 are mounted on the base 38 (see also Fig. 5). A clutch disc 48 mounted to slide longitudinally on the shaft 45 but rotatably with shaft 45 through the medium of keys or splines 49, is adapted to be brought into contact with a clutch facing 50 mounted on a clutch disc 56 loosely mounted on the shaft 45. The clutch disc 56 is secured to a sprocket gear 57 also loosely mounted on the shaft 45, and, through a chain 58, drives a larger sprocket gear 59 secured to a drum shaft 60 (see Figs. 2 and 9) mounted in suitable bearings supported in brackets 61 extending downwardly from the sub-base 33.

The clutch disc 48 is normally out of contact with the facing 50 and is adapted to be brought into physical contact therewith by the energization of a clutch magnet 62 (Fig. 7). This magnet operates a pair of arms 63 fast on a shaft 64 journaled in a bracket 65. Also secured to the shaft 64 is a yoke 66 (Figs. 6 and 7) the ends of which yoke carry rollers 67 projecting into an annular groove in the hub 68 of the clutch disc 48.

Obviously, when the magnet 62 (Fig. 7) is energized it attracts its armature 69 which is secured to the arms 63 rocking these arms, the shaft 64 and the yoke 66 slightly clockwise (as viewed in Fig. 7), shifting the disc 48 into close contact with the facing 50 so that the rotation of shaft 45 is transmitted to the sprockets 57 to frictionally drive the sorting drum.

As will be fully explained later in connection with the description of the circuit diagram, the motor 39 may operate in either direction under the control of the selector keys in order to rotate the sorting drum the shorter distance to the selected position.

A brake mechanism is provided for the purpose of decreasing the speed of the drum as it nears the selected position. This brake mechanism includes a brake drum 70 secured on the armature shaft 43 of the drive motor 39, (see Figs. 5 and 8). A pair of brake shoes 71 and 72 pivoted on a common rod 73 and embracing the drum 70 are provided with suitable linings 74. The brake shoes 71 and 72 normally press their linings against the drum 70 under the influence of springs 75 compressed between retaining nuts 76 on the ends of a rod 77 and the upward extending ends of said shoes 71 and 72. When at the proper time, as will be described later, the brake magnet 78 is energized it attracts its armature drawing a truncated cone 79 mounted on the lower end thereof, upwardly between rollers 80, there being a roller 80 mounted in the bifurcated upper end of each of the brake shoes 71 and 72, thus spreading the brake shoes and releasing the drum 70 for rotation. At approximately the time the selected pocket is at the desired position the magnet 78 is deenergized which releases the brake shoes for action of their springs 75. This immediately brings the brake lining into effective contact with the drum 70 to stop the rotation of the sorting drum.

In addition to the application of the brake to drum 70, other means is provided to act as an effective brake for the purpose of stopping the drum. This means includes momentary reversal of the current through the field windings of the motor 39. The manner in which this reversal is accomplished will be fully brought out in connection with the description of the circuit diagram. It may also be stated that following the momentary reversal of the current through the motor a resistance is automatically placed in the motor circuit which has the effect of causing the motor to run at reduced speed until the sorting drum is accurately positioned. When this occurs, that is, when the drum 51 is brought to rest in its selected position a locking finger 86 (Fig. 2), which was withdrawn at the beginning of the operation by the energization of magnets 87, is released and its spring 88 rocks said finger into engagement with one of a plurality of spaced alining notches 89 located about the periphery of a ring 85 secured to the drum 51.

The motor 40 (Figs. 2, 5 and 6), as stated above, drives the generator 41 and in addition drives a sprocket gear 90 (Fig. 5) through reduction gears enclosed in a housing 91. The sprocket gear 90, by means of a chain 91a, rotates a sprocket gear 92 secured to a main drive shaft 93 mounted in the frames 30, 31 and 32. The drive shaft 93 rotates continually while the machine is in operation and drives a main cam shaft 94 by means of a gear 95 (Fig. 11) fast on the drive shaft 93 meshing with a larger gear 96 rotatably mounted on the cam shaft 94. A one revolution clutch is provided and is rendered effective, under the control of a release bar 97, to couple the cam shaft 94 to the gear 96 whereby the shaft 94 receives one complete counterclockwise (Fig. 11) rotation at each adding cycle. This clutch and release bar will be described later.

*Keyboard*

Figure 1:
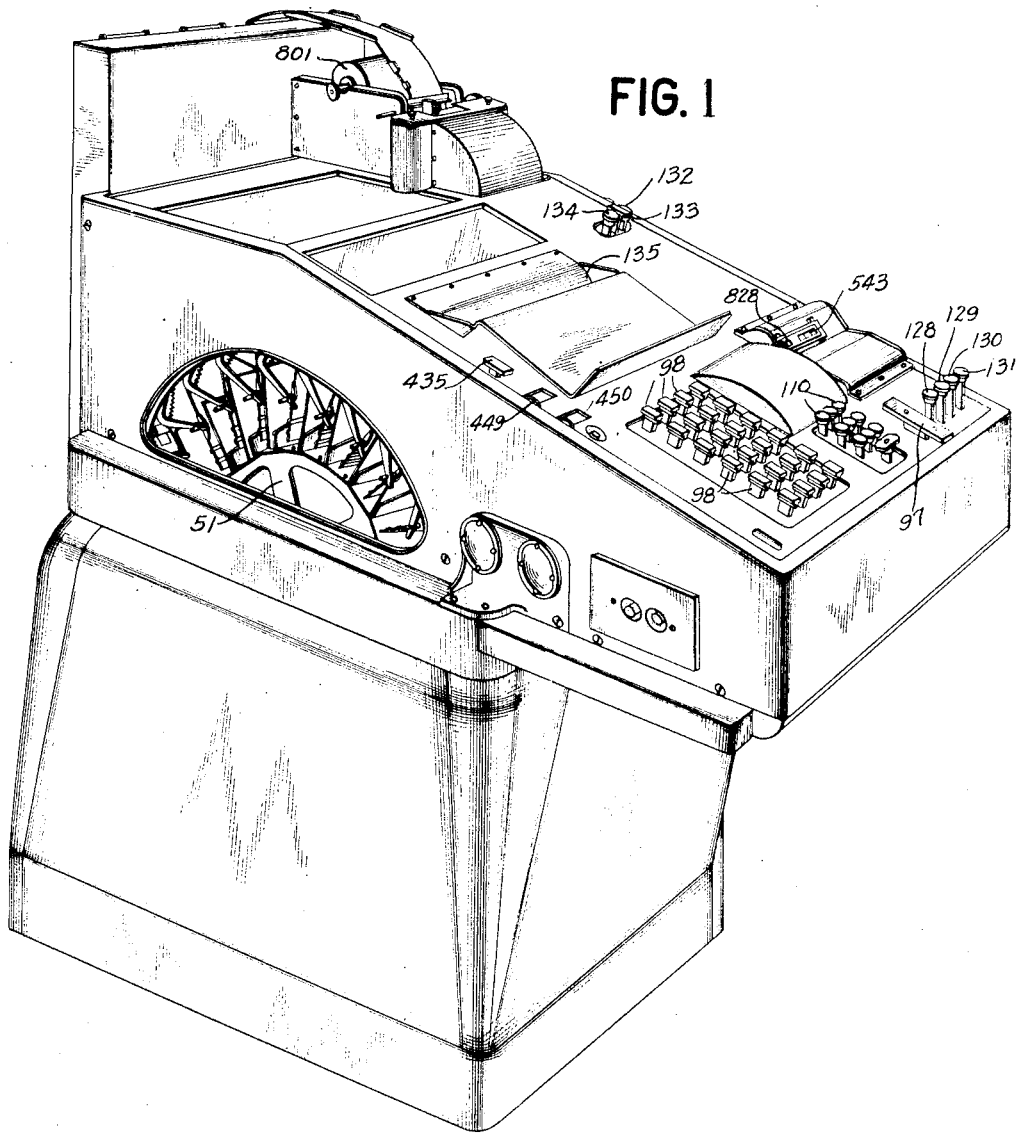
Fig. 1 is a perspective view of the machine.

Referring to Figs. 1 and 4 a brief description will now be given of the various manipulative devices provided for controlling the machine. It was stated previously that the sorting drum, indicated generally at 51 (Figs. 1 and 2), has 24 compartments into which checks may be sorted. In order to select the particular compartment into which the check is deposited and to control the rotation of the drum to bring the selected compartment into position to receive the check a plurality of selector keys 98 (Figs. 1, 4 and 12) arranged in four banks of six keys each is provided. These keys are slidably supported in plates 99 and 100 carried between frames 101 (only one of which is shown) mounted on projections on the sub-base 33. Springs 102 compressed between the plate 100 and the shoulders on the key stems normally hold the keys 98 in the upward position.

The key caps carry suitable indications (as seen in Fig. 4) to designate the compartments according to the classification numbers, letters, etc. of the checks or vouchers to be sorted. For illustrative purposes, however, the keys 98 have been given numbers from 1 to 24 to correspond with the numbers of the compartments on the drum 51.

Upon depression of a key 98 a projection on the stem thereof cams a detent 103 toward the right (Fig. 12) until the shoulder of said projection passes below the detent whereupon a spring 104 restores the detent to latch the key in depressed position. The detent 103 is in the form of a large single flat apertured plate and is supported between pairs of rods 105 extending between the frames 101. The depressed key is held by the detent 103 until another key is depressed which shifts the detent releasing previously depressed key. The keys 98 may not otherwise be released.

Each of the keys 98 carries at its lower end a rounded block of insulation which, upon depression of a key, is thrust between contact blades 106 to close two pair of contacts 107 and 108, there being a set of contacts 107 and 108 provided for each key 98. The blades upon which the contacts 107 and 108 are carried are suitably mounted on bars 109 supported between the frames 101. The contacts 107 and 108 are connected by suitable wires to the sorting drum control device which will be described later.

Just to the right of the selector keys 98 (Fig. 1) is a group of keys 110 comprising a conventional ten key amount keyboard. These keys are for the purpose of setting up the amounts represented by the checks which amounts are to be entered into the totalizers and printed on the control tape and on the selected compartment tape. The stems 111 of the keys 110 are slidably mounted in a plate 116 supported between frames 117 and 118 (see also Figs. 3, 14 and 15), and on rods 119. The lower ends of the key stems are bifurcated to straddle studs 120 projecting from individual arms 121 pivoted on a common shaft 122 mounted in the frames 117 and 118, there being an arm 121 for each of the keys 110. Located to the left of the keys 110 (Figs. 14 and 15) is a series of switch-blades 123 mounted on an insulating bar 124 carried between the frames 117 and 118. The blades 123 carry contacts 125 and upon depression of a key 110 the corresponding arm 121 is rocked slightly counterclockwise carrying an insulating block 126 mounted on the free end of said arm into contact with the angular end of the right blade 123 thereby closing the corresponding contacts 125 which controls mechanism to set up the corresponding digit or amount on suitable set-up wheels, as will be more fully described later.

To the right of the amount keys (Fig. 1) is located the release bar 97 the purpose of which is to cause the operation of the accounting machine to enter an amount or to take a total or sub-total. Adjacent the release bar 97 is a group of special keys 128, 129, 130 and 131 (see also Fig. 4) which are best described according to their several functions. The key 128 is known herein as the "error" key and is used to clear out an erroneous amount set up on the set-up wheels. The key 129 effects the disabling of the compartment tape printers and all the totalizers and is known as the "non-add" key. The key 130 is the "adding machine" key. This key disables the compartment tape printers and all except one totalizer thus making possible the listing of items on the control tape and the accumulation of said items on this single totalizer, from which the total may be printed on the control tape. The "key release" key 131, when depressed releases any of the special keys depressed, excepting the error key 128.

Referring again to Figs. 1 and 4 it will be noted that there are three additional keys 132, 133 and 134 located near the right hand edge of the machine opposite the check aperture 135. These keys are; the compartment total key 132; the group total key 133; and the grand total key 134.

The sorting drum

It was described above how the shaft 60 (Figs. 2 and 9) is mounted in the frame 33 and how this shaft is rotated by the motor 39 by means of the chain 58. The shaft 60 supports and rotates the sorting drum in the following described manner:

Secured to the shaft 60 are two flanged hubs 136 and 137 (Fig. 9) to the flanges of which hubs are secured discs 138 having flanged rims 139. A larger disc 140 is secured to the right hand disc 138 (Fig. 9) and carries near its outer edge a series of lateral projecting rods 146 (see Fig. 16). At their opposite ends the rods 146 are secured to and spaced apart by a ring 147 (Figs. 9 and 16). To form the individual compartments into which the checks are to be sorted light metal plates are secured to the flanges 139 and extend a suitable distance around the circumference of said flanges to form the bottoms as at 148, each of the parts 148 overlapping its neighbor. The plates are then bent outwardly to form radial separators 149 for the compartments. Near their outward extremity the plates are bent toward their respective rods 146, then, passing over these rods, said plates are bent slightly inward, these bent portions 150—151 forming apertures through which the checks are fed into the compartments. Ears are bent outwardly from the separator plates 149, one near the plate 147 and one near the disc 140 and holes therein receive the rods 146 to maintain the separators 149 properly spaced.

Near each end of the rods 146 are pivoted angular arms 152 which arms are joined by sleeves 153 surrounding the rods. Between them each pair of arms 152 pivotally carries a check retainer or clamping plate 154 each pressed against the separator 149 at its left by springs 155 attached to the arms 152. Projections 156 on the lower edges of the plates 154 extend through slots in the bottom of the compartments to limit the movement of the inner edges of said plates 154. The arms 152 are adapted to be swung counterclockwise (Fig. 16) to bring the outer edges of the plates 154 against the right hand separators 149 to permit ingress of the checks. The means for rocking the arms 152 will be described later.

Pins 157 project from the left hand arms 152 (Fig. 9) to provide a convenient means for manually rocking the retaining plates 154 in order to remove the checks from the compartments.

Compartment selection

It was previously stated that the selection of the check compartments in the sorting drum 51 is controlled by depression of the selector key 98 corresponding to the compartment it is desired to bring into position to receive the check. The control of the sorting drum is electrical and will be described in connection with the circuit diagram shown in Fig. 17. Depression of a key 98 completes a circuit which causes the sorting drum to rotate and determines which direction said drum will rotate.

Figure 2:
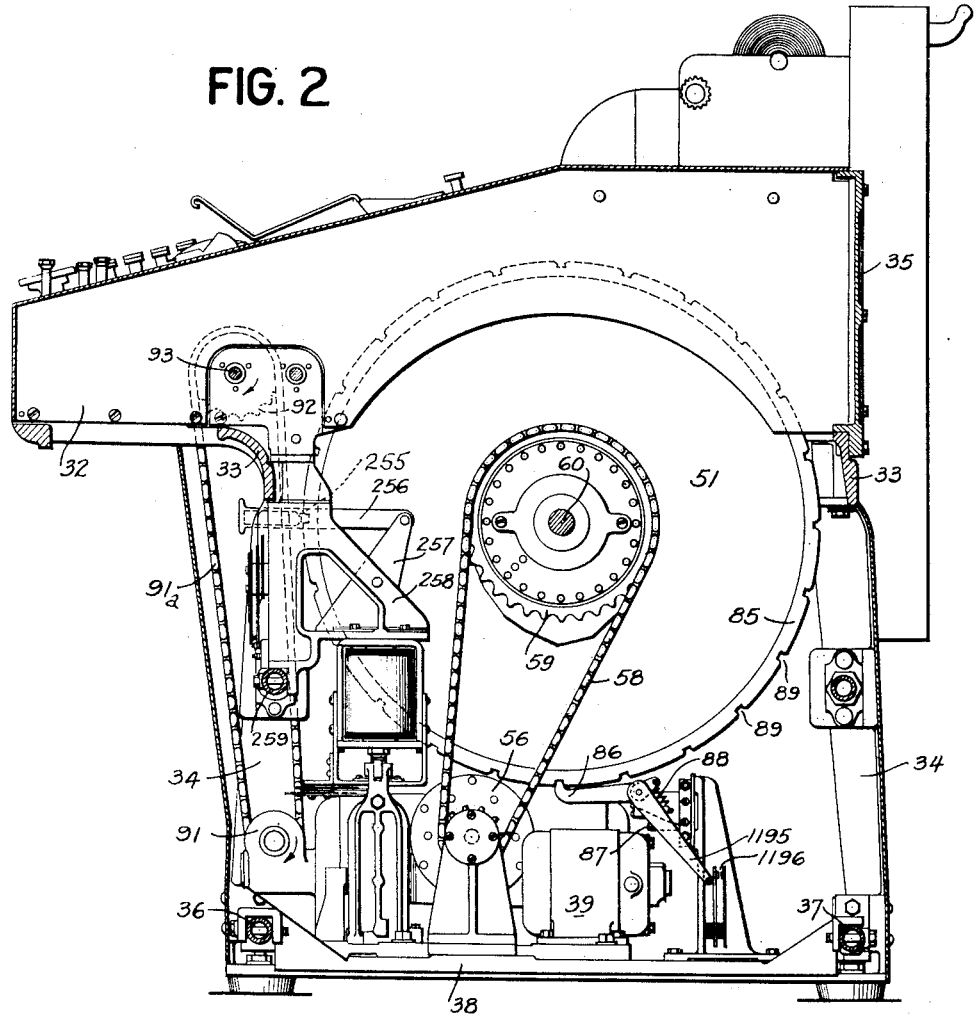
Fig. 2 is a view in right elevation of the machine with the casing removed.

Referring now to the circuit diagram (Fig. 17) current to operate the sorting machine is supplied from lines 158 through a switch 159 which, when closed, energizes the motor 40. This motor runs continually driving the generator 41 and the drive shaft 93 (Fig. 2). Closing the switch 159 also provides current for the motor 39 by means of wires 160 and 161 but this motor does not start until a selector key 98 is depressed due to control relays now to be described. The current for operating the several relays is supplied by the direct current generator 41, the positive lead from said generator being indicated at 162 and the negative lead at 163.

As was set forth previously there are twenty-four compartments in the sorting drum 51 and an equal number of selector keys 98 are provided to select the compartments. The blades of each inner pair of blades 106 (Fig. 12) of the switches operated by these keys are connected by a common wire 164 to the positive side 162 of the generator 41. Each of the left blades carrying one of the points of the contacts 107 is connected by a wire 165 to corresponding brushes 166. These brushes are stationary and are mounted in a suitable, insulating support 167 secured to the sub-base 33 by a pair of brackets 168 (see Fig. 9). The brushes 166 are constantly in contact with a split commutator comprising separate segments 169 and 170 (Fig. 17) mounted in an insulating disc 176 (Fig. 12) secured to the sprocket 59 which, in turn, is fast on the compartment drum shaft 60. The segment 169 is electrically connected to a ring 177 and the segment 170 is electrically connected to a ring 178 both of which rings are mounted in and rotate with the disc 176. The commutator segments 169 and 170 have a fixed relationship with the compartment drum and rotate therewith, but rotate with respect to the brushes 166 consequently the spaces between the segments 169 and 170 may be between any adjacent pair of diametrically opposed brushes 166. For the illustrative embodiment it may be noted (see Fig. 17) that one of the spaces separating these segments lies between the brushes corresponding to the No. 1 compartment and the No. 24 compartment, while the space separating the opposite ends of the segments lies between the brushes corresponding to the No. 12 and No. 13 compartments.

Depression of a key 98, for instance the "5" key, closes contacts 107 and completes a circuit from the positive side of the generator line 162 through line 164, contacts 107, the corresponding line 165, brush 166, commutator segment 169, the common ring 177, a brush 179, a wire 180, contacts 181, through the coil of a relay 182, wire 183, contacts 184, wire 185 to the negative generator lead 163. At the same time a circuit is completed through one coil 186 of a two coil relay, contacts 187, wire 185 to line 163 energizing the relay 186 which attracts its armature 188 comprising the center blade of a three blade time delay switch. This closes one set of contacts 189 completing a circuit from the positive line 162, a wire 190, closed contacts 189, a relay 191 to the negative line 163. Energization of the relay 191 closes its contacts 192 (lower left of Fig. 17) completing a circuit from the line 162, contacts 192, wire 193, normally closed contacts 249, through the brake magnet 78 (see also Fig. 6) the coil of a relay 195 and the clutch magnet 62 (see also Fig. 7). The circuits through the clutch magnet 62 and the relay 195 are completed by wire 196, 197 and 198 directly to the negative line side 163. The brake magnet (78)

circuit is completed through a wire 199, contacts 200, wires 206, 207, 197 and 198 to the negative side 163.

The operation of the brake magnet 78 (Figs. 6, 8 and 17) draws its armature including the member 79 upwardly spreading the brake shoes 71 and 72 thus releasing the brake. Energization of the relay 195 closes contacts 208 (lower right of Fig. 17), closing a circuit from the negative lead 163, contacts 208, contacts 209 closed upon energization of relay 191, to the negative side of motor control relays 210, 211, 212 and 213. The energization of the clutch magnet 62 engages the clutch 48—50 (Fig. 7) between the sorting drum motor 39 and the sprocket drive 57—58—59.

The energization of the relay 182 closes contacts 214 and 215, and opens contacts 216 completing a circuit from the positive generator lead 162, contacts 192, wire 217, contacts 218 normally closed, wire 219, contacts 215 now closed by relay 182, wire 220, normally closed contacts 221, wire 222, relay 182, wire 183, contacts 184, wire 185 to the negative lead 163, thus setting up a holding circuit through the relay 182. Another circuit is completed through contacts 192, wires 193 and 217, contacts 214 closed by relay 182, wire 223, relay coil 224, contacts 225, 226 and 184, wire 185 to line side 163. Energization of the relay 224 opens the contacts 181 thus opening the circuit from the commutator to the relay 182 to prevent any cross circuits when the commutator is in motion.

The closing of contacts 214 also completes a circuit through the magnet 87 which energizes this magnet to disengage the arm 86 (Fig. 2) from the notch 89 on the ring 85 thus freeing the drum 51 for rotation.

A circuit is completed at the same time through the contacts 215, a wire 227, normally closed contacts 228 to motor control relays 211 and 212, contacts 209 and 208 to the negative line 163. Energization of motor control relays 211 and 212 closes double sets of contacts 229 and 230 respectively completing a circuit through the motor 39 extending as follows: positive side of the main supply line through line 160, normally closed contacts 236, contacts 230, armature of motor 39, contacts 229, wire 161 to the negative side of the main supply line 158 through switch 159.

The clutch is now effective and the motor is running to rotate the selector drum to bring the selected compartments to position which, it will be remembered, is the "5" compartment for this particular example. The drum will continue to rotate until it approaches within two compartments of the selected compartment as determined by the depressed selector key 98. A feeler or extended brush 237 (Fig. 17) carried on the end of an arm 238 and extending equal distances on each side thereof is in contact with a selected contact point 241. The arm 238 is fast on the shaft 60 (see Fig. 9) and carries the feeler 237, also a shorter feeler 239. A brush 240 carried by the arm 238 is adapted to successively wipe the contacts 241 mounted in an insulating disc 242 suitably secured to the base 33. There are 24 contacts 241 each electrically connected to the contact 108 associated with a corresponding selector key 98. The arm 238 also carries a brush 243 in constant contact with a common ring 244 and electrically connected to the feeler 237 and 239 and to the brush 240.

When the "5" key was depressed the contacts 108 corresponding thereto were closed setting up a circuit from the positive lead 162, wire 164, contacts 108, wire 245 to the "5" contact 241. Now as the feelers 237 on the arm 238 which is rotating with the drum 51, contact with the "5" contact 241 the circuit is extended through the feelers 237, brush 243, ring 244, wire 246, through a relay coil 247, wires 206, 207, 197 and 198 to the negative generator lead 163. Energization of the relay 247 closes contacts 248 completing a circuit from the positive lead 162, contacts 192, normally closed contacts 249, contacts 248, through a relay coil 250, wires 251, 206, 207, 197, 198 to the negative lead 163. This energizes the relay 250 closing contacts 252 thus setting up a holding circuit through said relay 250, and opens the contacts 200 to deenergize the brake magnet 78 which allows the springs 75 (Fig. 8) to apply the brake.

Energization of the magnet 250 also opens contacts 236 throwing a resistance 253 in series with the motor 39 thus reducing the speed of the motor.

At the time the feeler brush 237 completed the above described circuit, a circuit was also completed through the "5" contact point 241, as set forth above, through wire 246, a pair of locking bolt magnets 254 (see also Fig. 18), wires 207, 197 and 198 to the negative lead 163. At the time the feeler brush 237 wipes across the "5" contact however, the drum 51 is in a position between compartments and a bolt 255 (Fig. 18) which is adapted to be operated by magnet 254 strikes the inter-notch periphery of the ring 85 (Fig. 2) and is thus prevented from entering a notch 89 to arrest the movement of the drum and align said drum. The magnets 254 are energized only as long as the feeler brush 237 is in contact with the "5" contact 241.

The bolt 255 (Fig. 18) is slidably mounted on an arm 256 pivotally supported on a plate 257 which in turn is secured to a bracket 258 supported on a cross rod 259 extending between the left hand legs 34 (Fig. 2) of the machine. A pin 260 projecting from the bolt 255 is embraced by the bifurcated upper end of an arm 266 fast on a shaft 267 to which is also fast the armature 268 of the magnets 254 and an arm 269 which operates the sets of contacts 288 and 249. The arm 256 has two opposed ears 270 bent outwardly therefrom in which ears are loosely mounted studs 271 between the inner ends of which is compressed a strong spring 272.

In axial alinement with the outer ends of the studs 271 are two stop screws 272a fast in supporting blocks 273 suitably secured the upper one to machine sub-base 33 and the lower one on the bracket 258. The bolt 255 may enter a notch 89 only when the drum has arrived at the selected position as will be described later.

When the relay 247 operated to close the contacts 248 a circuit was extended from line 162, contacts 192, contacts 249, contacts 248, a relay coil 274, wire 275, contacts 276, wires 277, 207, 197 and 198 to line 163. Energization of the relay 274 opens contacts 228 and 278 and closes contacts 279 and 280. Opening the contact 228 deenergizes motor control magnets 211 and 212 dropping contacts 229 and 230, at the same time closing of contacts 280 extends a circuit as follows: positive lead 162, contacts 192, wires 193 and 217, contacts 218, wire 219, contacts 215 closed by energization of magnet 182, wire 227, contacts 280, through motor control magnets 210 and 213, contacts 209 and 208 to negative lead 163. The magnets 210 and 213 now being energized, close their respective contacts 281 and 282 causing a momentary reversal of the direction of flow of the electrical current through the motor 39 for the purpose of dynamic braking.

When the brake magnet 78 is deenergized and its armature drops, it closes contacts 283 (see also Figs. 6 and 8) setting up a circuit from line 162, contacts 192, wire 193, contacts 249, contacts 283, a relay coil 284, wires 207, 197 and 198 to line 163. Energization of relay 284 closes contacts 285 setting up a holding circuit for itself extending as follows: line 162, contacts 192, wires 193 and 217, contacts 214, wire 286, contacts 285, coil 284, wires 207, 197 and 198 to line 163.

The energization of relay coil 284 also closes contacts 287 again energizing the brake magnet 78 to release the brake shoes 71 and 72 (Fig. 8) and the energization of the relay coil 284 causes the opening of the contacts 276 deenergizing relay coil 274 which allows contacts 228 and 278 to close thus restoring the flow of current through the motor 39 to its former direction. The motor continues to run at reduced speed until the drum is in the selected position.

When the drum arrives in the selected position, which in the instant example is the "5" position, the brush 240 on the arm 238 contacts the "5" point contact 241 and it again completes a circuit through the relay 247 but this relay 247 does not at this time affect the circuit of relay 250 because the relay 250 was previously energized and set up a holding circuit for itself. However the magnets 254 are again energized and since a notch 89 is now opposite the bolt 255 (see Figs. 2 and 18) the magnets 254 rock the armature 268, shaft 267 and arm 266 to slide the bolt 255 into the notch 89. As the drum 51 at this time still has some momentum the bolt 255 and consequently the arm 256 will be carried therewith in the direction of rotation of the drum 51 compressing the spring 272 (Fig. 18) which absorbs the shock and centers the drum accurately in the selected position by retracting the drum to a predetermined position.

The magnets 254 are energized as long as a key 98 is depressed and the drum is standing in the position corresponding to the depressed key. However as soon as another key 98 is depressed the circuit is opened and the magnets 254 are deenergized and a spring 265 withdraws the bolt 255 to permit rotation of the drum to the new position.

Again referring to Fig. 18, the movement of the armature 268 also rocks the arm 269 which opens the contacts 249 and closes contacts 288 (Fig. 17) setting up a circuit extending from line 162, contacts 192, contacts 288, wire 289, relay coil 290, wire 185 to the negative line 163. Energization of relay 290 closes contacts 296 and opens the contacts 184, 226 and 225. Closing contacts 296 sets up a circuit through a coil 297 from the line 162, contacts 192, wire 217, contacts 296, coil 297 to line 163. The coil 297 thus is energized to open the contacts 221 and opens the holding circuit through the relay 182.

The opening of contacts 184, 226, and 225 opens the circuits and allows the relays 182, 224 to assume the normal original position and also prevents back circuits through coils 182, 224 and 186.

Opening the contacts 249 opens the circuit through the brake magnet 78 allowing the brake again to become effective. Also opening the contacts 249 deenergizes magnet 195 which allows the contacts 208 to open thus deenergizing the motor control magnets which in turn drop their armatures to open the motor circuit thus stopping the motor 39. Further opening the contacts 249 deenergizes the clutch magnet 62 to render the clutch 48—50 (Fig. 7) ineffective.

When the magnet 182 is deenergized dropping its armature and opening the contacts 214 the magnet 87 is deenergized (see also Fig. 2) allowing the spring 88 to engage the nose of arm 86 in a notch 89 to aline the drum in the selected position.

With the drum 51, split commutator and the rotor arm 238 standing at the "5" position let it be assumed, as a further example, that the "23" key is depressed.

Depression of the "23" key completes a circuit to the "23" brush 166 which, it will be observed by reference to Fig. 17, is in contact with the segment 170. This sets up a circuit through the "23" brush 166, segment 170, common ring 178, brush 295, a wire 298, a relay coil 299 serving the same purpose as the previously described magnet 186 and has a common outlet through contacts 187 and wire 185 to the line 163. At the same time a circuit is completed from wire 298, through contacts 300, wire 301, magnet 302, wire 303, contacts 226 and 184, wire 185 to the negative lead 163. Energization of the magnet 302 opens contacts 218 and closes contacts 304 and 305, completing a circuit from the positive lead 162, contacts 192 closed upon energization of magnet 299, wires 193 and 217, contacts 216, wire 219, contacts 304, contacts 306, magnet 302, wire 303, contacts 226 and 184, wire 185 to line 163 thus setting up a holding circuit for magnet 302.

Another circuit is completed through contacts 305, wire 223, magnet 224, contacts 225, 226 and 184 to the line 163. The relay magnet 224 opens its contacts 300 thus opening the circuit from the commutator segment 170 to the relay 302 to prevent cross circuits.

The closing of contacts 305 also energizes magnet 87 to remove the arm 86 from engagement with the ring 85 freeing the drum for rotation.

At the same time a circuit is completed through contacts 304, a wire 307, contacts 278 through the motor control magnets 210 and 213, contacts 209 now closed, contacts 208 also closed at this time, to the line 163. The magnets 210 and 213 close their respective contacts 281 and 282 energizing the motor to run in reverse direction. This rotates the drum by the shorter direction directly to the "23" pocket where it is brought to rest in the manner described above.

During the course of this rotation the space between the segments 169 and 170 passes the "23" brush 166 at which time the magnet 299 will be deenergized dropping the armature 188. At this time the armature is shifted to close the left hand (Fig. 17) contacts 189 in order to maintain the relay 191 energized and hold the circuits through contacts 192. This is only for a very brief time after which the segment 169 comes into contact with the live brush energizing magnet 186 which immediately picks up the armature 188 closing the right hand pair of contacts 189 holding the magnet 191 energized. The magnet 186 is energized as long as a key 98 is depressed. However, the motor 39 does not operate because a circuit is also maintained through the magnets 254 to hold the bolt 255 (Fig. 18) in engagement with the drum this holding the contacts 249 open and the contacts 288 closed. This maintains the magnet 290 (Fig. 17) energized holding the control circuits open.

As soon as another key 98 is depressed the circuit through the magnets 254 is opened which allows the bolt 255 to come out, and closes contacts 249 opening contacts 288. This deenergizes magnet 290 and the machine operates through the above described selecting cycle.

Release bar

Immediately after depressing the selector key 98 the sorting drum rotates to the selected position. After the item set up operation, the operator depresses the release bar 97 rendering a one revolution clutch (Fig. 11) effective to impart one complete counterclockwise rotation to the cam shaft 94 in the following described manner:

It was set forth above that closure of the switch 159 (Fig. 17) energizes the motor 40 (Figs. 2, 5, and 7) which runs continuously as long as the machine is in operation and which drives the generator 41 to supply low voltage current to operate the machine. The motor 40 drives the shaft 93 (Figs. 2, 11 and 16) continuously but this shaft rotates idly until operation of the clutch mechanism illustrated in Fig. 11 is effected by depression of the release bar 97.

The bar 97 is mounted on a stem 308 which is slidably supported by a pair of headed screws 309 projecting from the frame 31. The stem 308 carries a stud 310 which is embraced by the bifurcated end of one arm of a bell crank 311 having its other arm connected by a link 312 to a lever 313 pivotally supported on the frame 31. Depression of the release bar 97 rocks the bell crank 311 clockwise drawing the link 312 leftward (Fig. 11) thus rocking the lever 313 also clockwise. This raises a link 314 depending from one arm of the lever 313. The link 314 has a shouldered notch in one edge thereof normally held by a spring 315 in cooperative relation with a stud 316 projecting from a retaining pawl 317 pivoted concentrically with the lever 313.

The pawl 317 cooperates with the tail of a drive pawl 318, pivotally carried on a disk 319 secured to the cam shaft 94, to hold said pawl 318 out of engagement with a drive ratchet 320 secured to the gear 96 and constantly rotated thereby in a counterclockwise direction (Fig. 11).

The clockwise movement of the lever 313, imparted thereto by depression of the release bar 97, as above stated, raised the link 314 which, due to the stud 316, rocks the retaining pawl 317 clockwise against the tension of its spring 326, freeing the drive pawl 318 to the action of its spring 327 which immediately rocks the pawl 318 into engagement with the ratchet 320. The disc 319 is now rotated counterclockwise one complete rotation. Shortly after the disc commences its rotation a block 328 secured to the side thereof strikes the lower end of the link 314 and rocks the link clockwise to free the pawl 317 to its spring 326 which rocks said pawl counterclockwise against a stop stud 329. Near the end of the rotation of the disc 319 and of the shaft 94 to which it is fast, the tail of the drive pawl 318 strikes the pawl 317, rocking the drive pawl 318 out of engagement with the ratchet 320 to stop rotation of the shaft 94. A spring pressed pawl 330 cooperates with a notch in the periphery of the disc 319 to prevent retrograde movement of the shaft 94.

Means is provided to hold the release bar 97 in its depressed position until the disc 319 has completed its revolution. This device includes a link 331 slidably mounted at its left hand end (Figs. 11 and 11a) on a stud 332 projecting from the frame 31. The right hand end of the link 331 is pivoted to an arm 333 pivotally supported on the frame 31 and normally pressed against a block 334 on the disc 319 by a spring 335.

A slide 336 is slidably mounted on the stud 332 and on a stud 337 projecting from the link 331. A spring 338 urges the slide 336 toward the right (Figs. 11 and 11a) but is prevented from shifting the slide due to a stud 339 projecting from the stem 308 of the key 97 abutting against a projection 340 on the slide 336. Upon depression of the key 97 the stud 339 is carried below the projection 340 whereupon the spring 335 draws the slide 336 toward the right until it is stopped by the studs 332 and 337 in which position the projection 340 rests immediately above the stud 339 to prevent restoration of the key 97 by its spring 341.

The upper side of the slide 336 is recessed as at 342 while a recess 343 is provided in the link 331. An ear 344 is bent at right angles from the link 331 and projects into the right hand end of the recess 342 in the slide 336. A coupling pawl 345 carried on studs 346 and 347 projecting from the stem 308 is located in the same plane as slide 336 and said pawl 345 urged toward the right and counterclockwise about the stud 346 by a spring 348, is carried downwardly upon depression of the release bar 97. At this downward movement the left hand end of the pawl 345 receives its full movement but a face 349 comes into contact with and is held in partially elevated position by the ear 344 since the link 331 has not yet been shifted toward the right. The stud 347 has moved downwardly in its triangular slot in the coupling pawl 345. As above stated, depression of the release bar effects a coupling between the disc 319 and the ratchet 320 so that these parts are rotated in unison for one rotation. As soon as the block 334 clears the arm 333 the spring 335 draws the link 331 toward the right carrying the ear 344 from beneath the face 349 and allows the pawl 345, urged by its spring 348, to drop into the recess 342.

Near the end of the rotation of the disc 319 the block 334 engages and rocks the arm 333 clockwise thrusting the link 331 toward the left and, since the coupling pawl 345 is now in the recess 342, the ear 344 on its leftward movement carries the pawl 345 and consequently the slide 336 therewith the pawl 345 sliding over its studs 346 and 347 until the projection 340 clears the stud 339 at which time the release bar is shifted by its spring 341 to its upper position carrying the pawl 345 therewith out of the recess 342. The parts are now in this normal position.

Check feed

It was stated above that, after the drum 51 has been positioned according to the selector key 98 depressed and the amount represented on the check had been entered on the amount keys, the check is inserted into the aperture 135 (Fig. 1) and is fed into the selected compartment. The checks are fed into the compartments by means of a plurality of pairs of feed rollers 350 and pairs of smaller rollers 351 (Figs. 13 and 16). These feed rollers normally occupy the position with relation to the sorting drum, in which they appear in Fig. 16, but upon operation of the check feed mechanism to feed a check into a selected compartment, the rollers are rocked to the positions disclosed in Fig. 13. The rollers 350 are secured to the shafts 357 and 358 (Fig. 13), the shaft 357 being carried between a pair of frames 359 (see also Figs. 9 and 13a) secured to a shaft 360 journaled in the frames 30 and 31. The shaft 358 is carried between upwardly extending brackets 361 one secured to each of the frames 359. The rollers 351 are carried on shafts 362 and 363 the latter shaft being supported between the frames 359 and the shaft 362 being supported between adjustable brackets 364 pivoted on the shaft 357 and adjustably secured to the frames 359 by screws 365 (see Fig. 13a).

Also secured on the shaft 360 is a cam arm 366 carrying rollers cooperating with a pair of cams 367 secured on the shaft 94 (Figs. 13a and 16) which, it will be remembered receives one complete counterclockwise rotation at each operation of the machine. At the proper time the cams 367 rock the shaft 360 and the frames 359 clockwise to bring the rollers 351 into close proximity to the selected compartment and at the same time a gear 368 (Fig. 16) fast on the shaft 94 rotates the rollers 350 and 351 in the directions indicated by the arrows through the following described train of gears: The gear 368 drives an intermediate gear 369 mounted on a stud 370 in the frame 30. The gear 369 meshes with a gear 371 loose on the shaft 360, which gear 371 meshes with a gear 372 (Fig. 13a) fast on the shaft 357 back of the frame 359. A gear 373 (Fig. 13) fast to the shaft 357 on the opposite side of the frame 359 from gear 372 meshes with a gear 374 fast on the shaft 358. The counterclockwise rotation of the gear 368 through the train of gears just described rotates the gear 372, the shaft 357 and the rollers 350 fast thereon in a clockwise direction, and the gear 374, shaft 358 and the feed rollers 350 on this shaft counterclockwise. The gear 374 (Fig. 13) meshes with an intermediate gear 375 which in turn meshes with a gear 376 secured on the shaft 363, and the gear 376 meshes with a gear 377 fast on the shaft 362. This causes the feed rollers 351 on the shaft 363 to rotate counterclockwise and the rollers 351 on shaft 362 to rotate in a clockwise direction. The rollers 350 are notched substantially as shown at 378 (Fig. 13) so that when the check is dropped into the aperture on chute 135 (Fig. 16) the lower edge thereof rests on the shoulders of the notch 378 substantially between the sets of rollers 350. The rotation of rollers 350 and 351 in the direction of the arrows feeds the checks into the selected compartment.

When the selected compartment comes into position an arm 379 integral with the arm 152 comes to rest adjacent a roller 380 (Figs. 13, 13a and 16) on the frame 359. When this frame is rocked by the cams 367, the roller 380 rocks the arms 379 and 152 counterclockwise carrying the retainer plate 154 from the position in which it appears in Fig. 16 to the position in which it is shown in Fig. 13 so that the incoming check may be fed onto the stack 385 in the proper order.

As the checks or other record materials are fed into the compartment they are held close against the retainer plate 154 by a series of fingers 385 (Figs. 13 and 16) pivotally carried on a rod 387 carried between a pair of arms 388. The arms 388 are secured to a shaft 389 pivotally supported on brackets 390 (only one of which is shown) secured to the sub-base 33. Springs 391 normally urge the arms 388 clockwise pressing rollers 392 one carried by each arm 388, against cams 393 fast on the shaft 94.

When the shaft 94, and consequently the cams 393 are rotated counterclockwise the cams 393 permit the springs 391 to rock the arms 388 quickly clockwise from the Fig. 16 position to the position in which they appear in Fig. 13. As the fingers 386 are carried into the compartment they are guided by tails 394 thereon cooperating with grooves in a rod 395 under the influence of springs 396. After the card is fed in between the tops of the fingers 386 and the retainer plate 154 the cams 393 restore the arms 388 to their original position withdrawing the fingers 386 from the compartment. The cams 367 now rock the frames 359 counterclockwise carrying the feed rollers outwardly to their normal positions and this allows the springs 155 to carry the retainer plate 154 against the stack 385 to hold the checks in position.

*Full compartment signal*

Means is provided to stop the machine when a compartment is full of checks. This means includes contacts 397 (Figs. 17 and 19a) adapted to be operated by a cam 398 fast on the shaft 94 and under the control of the arms 152 carrying the retainer plate 154. Cooperating with the cam 398 (Fig. 19) is a roller 399 on the free end of an arm 400 of a lever pivoted on the shaft 360. The other arm 401 of the lever, which arm 401 is bent back on itself as at 402 in order to clear other mechanism, pivotally carries at 403 a curved lever 404 having one of its arms 405 provided with a block 406 in the plane of a projecting surface 407 on the arm 152. The other arm 408 of the lever 404 is connected to a link 409 which at its opposite end is connected to a lever 410. A pin 416 on the lever 410 projects into a bifurcated floating member 418 and a spring 419 compressed between the pin 416 on a shoulder on the member 418 presses a roller 420 against a curved insulating retainer 421. This switch is mounted in a casing 422 secured to an arm 423 of the lever 400—401.

When the link 409 is moved toward the left (Fig. 19a) it rocks the lever 410 counterclockwise and the pin 416 rocks the member 418 clockwise about the roller 420 as a pivot until just as the pin 416 passes the center line through the pivot point of the lever 410 and the center of roller 420, whereupon the roller shifts quickly into contact with the contacts 397 of which there are two. One of the contacts 397 does not appear in Fig. 19a since it lies directly behind but insulated from the one shown. The link 409 is operated in the following described manner:

When the cams 367 (Fig. 13a) operate to rock the frames 359 counterclockwise withdrawing the feed rollers 350 and 351 from the position in which they appear in Fig. 13 to their normal position (Fig. 16) and the roller 380 frees the arm 152 to the action of its spring 155 so that the latter immediately rocks said arm clockwise until it is arrested by the plate 154 striking the stack of checks 385. Shortly thereafter the cam 398 (Fig. 19) rocks the lever 400—401 clockwise carrying the lever 404 therewith, the lever 404 maintaining the same relation to the arm 401 and with the switch box 422 shown in Fig. 19. On its clockwise travel the block 406 will strike the face 407, if a sufficient number of checks have previously been sorted into the particular compartment selected, and rock the lever 404 slightly counterclockwise about its pivot 403 on the arm 401. As the number of checks in the compartment increases the lever 404 will be rocked farther and farther in a counterclockwise direction until eventually the capacity of the compartment is reached at which point the movement of the lever 404 is sufficient to rock the lever 410 (Fig. 19a) past center, whereupon the spring 419 acts to snap the roller 420 toward the left to bridge the contacts 397.

Referring now to the circuit diagram (Fig. 17) closing the contacts 397 completes a circuit from the line 162, a wire 424, magnet 425, contacts 397, wires 426, 196, 197 and 198 to line 163. Energization of the magnet 425 closes its contacts 427 and 428 and opens the previously described contacts 187 (top of Fig. 17 just under Fig. No.). Closing contacts 427 lights a signal light 429 to indicate to the operator the nature of the trouble. Closing contacts 428 sets up a circuit from line 162, wire 424, contacts 428, wire 430, coils 431, wires 207, 197 and 198 to line 163.

Referring now to Fig. 11, energization of the magnets 431 attracts the armature 432 rocking counterclockwise a pawl 433 to position the end of said pawl in the downward path of a block 434 secured to the release bar stem 308 to thus prevent depression of the release bar 97 until the checks have been cleared from the compartment.

The opening of contacts 187 deenergizes the energized magnet 186 or 299 opening contacts 189 to deenergize magnet 191 which opens its contacts 192 and 209 preventing a selecting operation of the sorting drum until the checks are removed from the full compartment.

Before the operator can proceed with an item entering operation, however, it is necessary to depress a key 435 (Figs. 1, 4 and 19). When the cam 398 operated the lever 400—401 an ear 438 on the arm 408 of lever 404 was carried to the position indicated by dotted lines at 438a to the right of a stud 439 on the key lever 436. The counterclockwise movement of the lever 404 carried the ear 438 counterclockwise almost into contact with the stud 439. Now when the cam 398 releases the lever 400—401 and the spring 440 rocks said lever counterclockwise, the ear 438 rocks the key lever 436 clockwise positioning a hook 441 in the path of an ear 442 bent at right angles to the arm 423, latching the lever 400—401 against restoring movement thus preventing operation of the link 409 to open the contacts 397.

After the operator has cleared the checks from the full compartment he depresses the key 435 rocking the lever 436 counterclockwise to free the lever 400—401 to its spring 440 which restores said lever to its normal position. As the lever 400—401 rocks counterclockwise the arm 405 of lever 404 strikes a stud 448 causing this lever to rock clockwise about its pivot 403 thus drawing the link 409 toward the right to open the contacts 397.

Referring now to Fig. 17, when the contacts 397 are opened the magnet 425 is deenergized opening contacts 427 and 428 and closing contacts 187. The machine may now be operated in a normal manner.

Check counter

A step by step counter is provided to count each check sorted and a similar counter is provided to count groups of checks. These counters indicated at 449 and 450 (Figs. 16 and 16a) are of the veeder type and the detail construction need not be disclosed. They are mounted on a bracket 451 secured to the frame 30. Arms 452 secured to the shafts 453 of the counters have their free ends operatively connected by a link 454. Another link 455 connects the arm 452 of the counter 449 to a lever 456 pivoted on the shaft 360, said lever 456 being urged clockwise against a stud 457 projecting from the cam arm 366 by a spring 458. As described above, the cam arm 366 is rocked clockwise and then counterclockwise at each check entering operation by the cams 367 (Fig. 13a), the spring 458 causing the lever 456 to follow clockwise drawing the links 455 and 454 therewith. This movement rocks the arms 452 counterclockwise to add "one" onto each of the counters 449 and 450 as each check is entered. On the counterclockwise movement of the arm 366 the stud 457 picks up the lever 456 and restores the parts 455, 454 and 452 to normal.

If the machine should be operated without first having placed a check in the aperture of chute 135, a plurality of feeler fingers 459 (Figs. 16 and 16a) secured to and spaced apart on a shaft 460 are permitted to rock counterclockwise to interpose an arm 461 also secured on the shaft 460 into the path of the link 455. Now when the cam arm 366 operates the lever 456 is prevented from operating and the counters 449 and 450 are not actuated.

The shaft 460 and the fingers 459 are rocked by a spring 462 (Fig. 13a) having one of its ends attached to a lever 463 secured to the shaft 460. A stud 464 projecting from the side of the gear 372 (Fig. 13a) normally holds the lever 463, fingers 459 and arm 461 in this retracted position, but as soon as the gear 372 starts to rotate clockwise, the stud 464 frees the lever 463 to its spring 462 which immediately rocks the shaft 460 counterclockwise to feel for the check. If a check is in position in the chute 135 the fingers 459 do not receive their full counterclockwise travel and the arm 461 is held above the path of the link 455 consequently the counters 449 and 450 receive one step of movement. The stud 464 near the end of its rotation restores the parts to their normal positions.

Amount set up mechanism

After the operator depresses the desired selector key 98 and while the sorter drum is rotating to the selected position as set forth above, the operator sets up the amount represented by the check on the ten-key amount setup mechanism which includes the keys 110 (Figs. 4, 14, and 15). Depression of any of these keys operates mechanism now to be described, in identically the same manner, and effects a differential rotation of a master wheel to set amounts corresponding in digital value to the particular key depressed on corresponding set up wheels, which amounts are later transferred to a rack system to operate the totalizers and set up printing elements. Since the operation of each of the keys is exactly the same, a description will be given of the operation of the set up mechanism upon depression of only one of the said keys, for example, the "6" key.

As previously described, the bifurcated lower ends of the key stems 111 of the keys 110 each embrace a stud 120 on a pivoted arm 121, there being an arm 121 associated with each key 110. The arms 121 are urged upwardly against a stop rod 465 by individual springs 466 set in a cross bar 467 which bar is also slotted to guide the arms 121. Pivoted on the stud 120 is a latch 468 having a cam slot 469 therein embracing a rod 470 supported on projections of the cross bar 467.

The first downward movement of the depressed key cams the latch 468 counterclockwise to engage the shoulder end thereon beneath an angular bail 476 underlying all the arms 121 and carried by arms 477 and 478 (see also Fig. 3) pivoted on the shaft 122. The arm 478 (Fig. 15) extends upwardly and a spring 479 stretched between a stud 480 on said arm and an arm 481 pivoted on the shaft 122 normally holds a shoulder 480a of the arm 481 against the stud 480. When the arm 121 moves downwardly under the influence of the depressed key it rocks the bail 476 and arms 477 and 478 counterclockwise, and, through the spring 479, rocks the arm 481 in the same direction, thrusting upwardly a link 482 held by a spring 483 against an arm 484 secured to a shaft 485 which arm 484 is held against a stop stud 486 by a spring 487. The upper end of the link 482 abuts against an insulating block 488 supported on the lower one of a pair of switch blades carrying contacts 489 (see also Fig. 17 right side of the sheet near the center) closing said contacts. Closing contacts 489 energizes a bail magnet 490 (Figs. 14, 15 and 17) which operates another bail including arms 491 and 492 (Fig. 3) pivoted on the shaft 122 and connected at their left hand ends (Figs. 14 and 15) by a bail 493. Between them the arms 491 and 492 also carry an armature 494 adapted to be operated by the magnets 490.

Examination of Figs. 14 and 15 discloses that the bail 493 rests first above and in contact with the angular or flanged part of the bail 476. When a key 110 is depressed and arm 121 rocked the bail 476 moves downwardly away from the bail 493, but energization of magnets 490 rocks the bail 493 downwardly into contact with the now lowered bail 476 to prevent restoration of the latter until magnets 490 are deenergized.

The arm 492 (Fig. 15) is integral with an upwardly extending arm 495 and a spring 496 holds this arm and the bail 493 in retracted position until the magnets 490 are energized whereupon the bail 493 and the arm 495 are rocked counterclockwise. At this movement a link 497 pivotally connected to the free end of the arm 495 is drawn toward the left for the purpose of operating an escapement device which permits an amount corresponding in value to the particular key 110 depressed to be set on one of a group of set-up wheels 498 (Figs. 3, 20 and 21).

These wheels are mounted on a shaft 499 supported in the frame 32 and in a bracket 500 secured to the frame 31 (Fig. 3), and are slidable as a group longitudinally on the shaft 499 toward the left from the position in which they appear in Fig. 3 by means to be described later. In this position (Figs. 3 and 21) the wheel 498 on the extreme left is in mesh with a master set-up wheel 506 secured to a shaft 507 mounted in the frames 31 and 32. Hubbed to the gear 506 is a friction disk 508 which cooperates through the medium of a facing 509 of leather, or other suitable material, with a disc 510 fast to a constantly rotating gear 511. A spring 512 compressed between a hub 513 of an arm 514 on the shaft 507 and a disc 515 provides a constant pressure between the discs 508 and 510 whereby the gear 511 drives the gear 506 when the latter is freed by the above mentioned escapement device.

The gear 511 meshes with a gear 516 secured to the shaft 93 which, it will be remembered rotates constantly when the machine is in operation (see Fig. 2).

Fast on the left hand end of the shaft 507 (Fig. 21) is a gear 517 meshing with a gear 518 on a shaft 519 (see also Fig. 3) on which is also mounted a pin drum 520. The drum 520 has slidably mounted therein a plurality of pins 521 (Figs. 3, 14 and 21) adapted, when thrust toward the right (Fig. 21) to cooperate with an escapement pawl 522 fast on a shaft 523. The upper end of an arm 524 also fast on the shaft 523 (Fig. 15) rests in the path of the lower end of a lever 525, the upper end of which lever 525 rests normally in the left hand end of a recess 526 in the lower side of the link 497.

Depression of a key 110, for instance, the "6" key, first closes the corresponding contacts 125 and then, as the depressed key nears the limit of its downward travel, the link 482 closes the contacts 489 completing a circuit from the line 162 (Fig. 17), wire 190, contacts 125 corresponding to the particular key depressed, a pin magnet 527, contacts 528, contacts 489 to line 163. A circuit is also completed from wire 190 through a magnet 529, contacts 528, contacts 489 to line 163. The magnet 529 closes contacts 530 setting up a holding circuit through contacts 528, contacts 530 to line 163. At the same time a circuit is established through the bail magnets 490, contacts 489 or 530 to line 163.

Energization of the pin magnet 527 (Fig. 21), in this example the "6" magnet, attracted its armature 536 which acts to thrust the particular pin 521 in line with said armature toward the right (Fig. 21) into the plane of a nose 537 on the escapement pawl 522. The pin drum 520 is normally prevented from rotating due to the pin 521 previously set up resting against the nose 537 of the escapement pawl 522.

When the bail magnet 490 is energized it rocks the bails 476 and 493 counterclockwise as set forth above and near the end of this stroke the link 497 (Fig. 15) rocks the lever 525 counterclockwise, said lever at the same time rocking the arm 524, shaft 523 and the escapement pawl 522 clockwise removing the nose 537 from the path of the pin 521 then pressing against said nose thus freeing the pin drum 520 and the shaft 519 for rotation.

The armatures 536 of the several digital pin magnets 527 are spaced differentially away from the nose 537 of the escapement pawl 522 in a counterclockwise direction so that when the pawl 522 is rocked to free the drum 520 said drum and the shaft 519 will rotate a distance a number of steps proportional to the particular key 110 depressed, which in this case is the "6" key when it is again arrested by the projected pin 521 striking the pawl 522. This pawl was returned to its former position (Fig. 14) by one of a series of teeth 538 on the drum 520 wiping an ear 539 on the opposite end of the pawl 522 thus rocking said pawl counterclockwise.

As the projected pin 521 approaches the nose 537 of the escapement pawl 522 it strikes an arm 540 (Fig. 14) fast on the previously described shaft 485 rocking this shaft and the arm 484 (Fig. 15) counterclockwise. It will be remembered that the spring 483 normally presses the link 482 against the arm 484. The counterclockwise movement of the arm 484 rocks the link 482 also counterclockwise carrying the upper end of said link clear of the block 488 whereupon the contacts 489 immediately open. The several circuits described just above, however, are maintained through the contacts 528.

The pin 521 last set up remains effective to hold the drum 520 against rotation until another key is depressed operating the pawl 522. The pin primarily set up is restored just after it passes the nose 537 by a cam face on the end of a bracket 535 (Fig. 21) projecting from the frame 118.

As the bail 493 (Fig. 15) and the arm 495 near the end of their counterclockwise excursion the link 497 rides onto a stud 541 which rocks said link upwardly clear of the lever 525 which is then permitted to be restored to its normal position as the tooth 539 (Fig. 14) wipes the ear 538 rocking the pawl 522, shaft 523 and arm 524 (Fig. 15) counterclockwise. The link 497 is restored to its normal position when the arm 495 moves clockwise to its normal position.

Just as the arm 495 reaches the limit of its counterclockwise movement it strikes an insulating block 542 opening the contacts 528. This deenergizes the bail magnet 490, the holding relay 529 and the pin magnet 527 allowing the arms 121 and the bails 476 and 493 to restore to normal positions, allowing the circuits to return to normal for the next succeeding operation.

Obviously the operation of the above described mechanism upon depression of a key 110 effects a partial rotation of the shaft 519 corresponding in degree of rotation to the value of the particular key depressed plus one. Thus if the "0" key is depressed the shaft 519 is rotated one step, the "1" key causes a two step rotation, etc.

The differential rotation of the shaft 519 is effected by the continuously rotating gear 511 through the friction drive 508–510 as set forth above thus imparting through the master gear 506 (Figs. 21 and 23) and consequently to the particular set-up gear 498 in mesh with the master gear a rotation sufficient to set the gear 498 to a position corresponding to the value of the depressed key 110. Thus, if the "6" key 110 was depressed the wheel 498 then in mesh with the master gear 506 will be rotated seven steps to bring the "6" position on the wheel 498 under a sight opening 543 (Figs. 4 and 23) where it is visible to the operator.

Set-up wheels

In setting up a number comprising a plurality of denominational orders on the set-up wheels 498 the operator sets up the highest denominational order first, and then sets up the remaining denominational orders in succession from the highest to the lowest order. Assuming then that the "6" key 110 was depressed to set up the highest denominational order of a number, the set-up wheels 498 (Figs. 3 and 21) are all the way to the right with the left hand one of the wheels 498 in mesh with the master gear 506. As each number is set up the group of wheels 498 are shifted in two movements, one space to the left to bring the left hand wheel in line with the right hand one of a series of racks 575 and to bring the second wheel 498 into mesh with the master gear in readiness to set the next denominational order digit thereon. The mechanism for shifting the wheels 498 will now be described.

As mentioned above the set up wheels 498 are slidably mounted on the shaft 499. The group of wheels 498 is embraced by a pair of arms 545 (see Fig. 3) projecting from a sleeve 546 slidably mounted on a shaft 547 supported in the bracket 500 and in the frame 32.

A roller 548 (Fig. 3a) carried on the sleeve 546 projects into a spiral cam groove 549 formed about a cylindrical member 550 secured on a shaft 551 rotatably supported in the frame 32 and in a bracket 552 secured to said frame.

In order to rotate the cam 550 a gear 553 secured on the shaft 551 near the frame 32 (Figs. 3 and 3a) meshes with a segmental gear 554 pivoted on the shaft 507. Also meshing with the segment 554 is a gear 555 secured to an escapement ratchet 556 mounted to rotate on a stud 557 projecting from the frame 32. A spring 558 having one of its ends secured to the arm 514 mounted on the shaft 507 and secured to the segment 554 normally urges the segment 554 counterclockwise and the gear 555 and ratchet 556 clockwise (Fig. 3a) but these parts are prevented from rotating due to the cooperation of an escapement pawl 560 loosely mounted on a shaft 566 supported between the frames 31 and 32. The pawl 560 is normally urged clockwise to the position in which it appears in Fig. 3a by a spring 567. Secured to the shaft 566 adjacent the pawl 560 is an arm 568 carrying a stud 569 projecting into a slot 570 in the pawl 560. The bifurcated end of an arm 571 secured on the shaft 566 between the frames 31 and 118 (Figs. 3 and 20) embraces a stud 572 projecting from the bail arm 491 through a clearance opening in the frame 118.

It will be recalled that the bail arm 491 is rocked counterclockwise (see Fig. 15) upon energization of the bail magnets 490. This movement is transmitted through the stud 572 (Fig. 20) arm 571 and shaft 566 to rock the arm 568 (Figs. 3a and 23) counterclockwise. Near the extreme of this movement of the arm 568 the stud 569 strikes the left hand end of the slot 570 and rocks the pawl 560 slightly counterclockwise to disengage a hook 573 from the ratchet 556, and, at the same time, moving a nose 574 into the path of the next ratchet tooth.

As soon as the nose 573 is clear of the ratchet the spring 558 acting through the segment 554 rotates the gear 555 and the ratchet 556 one half tooth space. This movement is transmitted by the segment 554 to the gear 553 and the cam 550 (see Fig. 3) rotating the cam sufficiently to displace the sleeve 546 and the group of wheels 498 one half step toward the left. This movement is not sufficient to carry the particular wheel 498 then in mesh with the master wheel 506 out of engagement therewith.

At this point in the operation the master wheel 506 receives its increment of rotation under the control of the depressed key 110, which in the present example is the "6" key, and the pin drum 520, as set forth above, to correspondingly rotate the particular set-up wheel 498 in mesh therewith seven spaces to the "6" position after which the magnets 490 are deenergized by opening of the contacts 528 and the bail arm 491 is restored clockwise to normal. This rocks the arm 571 (Fig. 20) shaft 566 and arm 568 (Figs. 3a and 23) clockwise to free the escapement pawl 560 to the spring 567, which immediately rocks the pawl in the same direction disengaging the nose 574 from the ratchet 556, and engaging the hook 573 therewith. At this time, and under the influence of spring 558 the segment 554, receives its second movement advancing the ratchet 556 one half step to complete a full step of movement. Likewise, the frame 545 and spiral cam 550 receive their second clockwise rotation (Fig. 3a) to shift the set-up wheel the second half step toward the left. This carries the highest denominational order set-up wheel out of mesh with the master wheel 506, and positions that wheel just above and in a vertical plane with, but not in mesh with the right hand, or lowest denominational order rack of the series of racks 575 (Figs. 3, 20 and 21).

The same operation is repeated as each key 110 representing a denominational order of a number being set up is depressed. The set-up wheels 498 being shifted one full step toward the left and the next succeeding wheel being differentially set according to the particular key 110 depressed.

Set up wheel aligner

In their normal right hand position (Fig. 3) the set up wheels 498, with the exception of the highest order wheel, that is, the left hand wheel, are in engagement with a fixed aligner 561, secured to, and projecting inwardly from the frame 32. This lock is not effective for the highest order wheel 498 as it is in mesh with the master gear 506 ready for a rotation. As the wheels are shifted toward the left (Fig. 3) they are moved successively out of engagement with aligner 561 and into engagement with the master gear 506 to receive their adjustment then out of engagement with the master gear 506 and into engagement with an aligner 562 carried by one arm of a bell crank 563 (Fig. 20) pivoted on the shaft 507. The other arm of the bell crank 563 carries a roller 564 cooperating by means of a spring 591 with the cam profile of a box cam 565 fast on the cam shaft 94.

At the proper time, after the amount is set on the wheels 498 and after the racks 575 are lifted into mesh with the wheels 498, the cam 565 operates to permit the spring 591 to rock the bell crank 563 clockwise to remove the aligner 562 from engagement with the set-up wheel 498. The racks 575 then move toward the right until the end of a concentric slot 596 in the wheel 498 strikes a stop rod 597 (Fig. 3a) carried between the arms 545 and extending through the slots 596 in all of the wheels 498. Thus, the racks 575 receive their differential movement under control of the previously adjusted set-up wheels 498.

After the racks 575 are set they are disengaged from the wheels 498, and at the same time the aligner 562 is brought into engagement with the said wheels.

Rack engaging mechanism

After the complete number or amount has been set on the wheels 498 the operator depresses the release bar 97, which, as above described, operates the one revolution clutch (Fig. 11), to impart one complete counterclockwise rotation to the cam shaft 94. Mechanism is operated by the cam shaft to raise the racks 575 into mesh with the set-up wheels, and then restore said wheels to zero or normal thereby differentially setting the racks 575 a distance corresponding to the setting of the individual wheels 498. The movement of the racks 575 is utilized to actuate the totalizers and to set printing elements as will be fully described later.

The racks 575 are slidably mounted in a frame including plates 576 (Figs. 20 and 23) having their right hand ends pivoted on a stud 577, the racks being slotted at the right to embrace the stud 577. The left hand ends of the plates 576 are joined by a bar 578 (Figs. 3, 20 and 23). This end of the rack frame is adapted to be raised and lowered to bring the racks 575 into and out of mesh with the set-up wheels 498. The frame is guided in its movement by projections 579 (Fig. 3) on a cross bar 580, supported between frames 31 and 32. The racks 575 are slotted near the left hand ends and are slidably mounted on rod 581 (Fig. 20) extending between the side plates 576 of the rack frame. In its normal position the bar 578 rests on a plate 582 secured to the bottom of the bar 580, and extending beneath the bar 578 (see Fig. 20).

The mechanism for raising the racks into mesh with the set-up wheels includes a groove 583 in the box cam 565 (Figs. 20 and 24), fastened on the cam shaft 94. This cam is adapted to rock a lever 584 pivoted on a stud 585 projecting from the frame 31. A flattened stud 586 on the left hand end of the lever 584 rests beneath an arm 587 pivoted to one arm 588 of a bell crank 589, mounted on a rod 590. Formed on the end of the arm 587 is a slotted ear 596 surrounding an angular projection 597 on the plate 516 nearest the frame 31. The purpose of this construction will be explained later.

Referring to Fig. 24, it is obvious that rotation of the cam 565 through the groove 583 will rock the lever 584 first clockwise and then counter-clockwise to normal. On its clockwise movement the lever 584 by means of stud 586 rocks the arm 587 counterclockwise to raise the rack frame, thus carrying the racks 575 into mesh with the set-up wheel 498.

Set up wheel restoring

As soon as the aligner 562 is re-engaged with the set up wheels 498, these wheels are shifted toward the right (Fig. 3) to their normal position by one continuous movement. This is accomplished by rotating the cam 550 and consequently by the cam groove 549 moving the frame 545 backwardly the same distance it was moved to shift the wheels 498 step by step as the numbers are set up. As the escapement pawl 560 (Figs. 3a and 23) is operated to permit the spring 558 to rotate the segment 554 in the setting up of numbers, another segment 598 pivoted on the shaft 93, and meshing with a segment 599 integral with the segment 554 is correspondingly rocked to carry a roller 600 on an arm 601 integral with the segment 598, into the path of a profile cam 602 fastened on the shaft 94.

Near the end of the rotation of the shaft, the cam 602 rocks the arm 601 and the segment 598 counter-clockwise to normal, rocking the segment 554 clockwise to its normal position. This movement of the segment 554 rotates the gear 553 and the cam 550 counterclockwise sliding the sleeve 546 and its group of set-up wheels 498 toward the right to the position in which they appear in Fig. 3.

At this clockwise rotation of the segment 54 the gear 555 and the ratchet 556 are also rotated counter-clockwise. This rotation, however, is idle since the escapement pawl 560 vibrates idly, the slot 570 being of sufficient length to permit the pawl to vibrate without displacing the stud 569.

Error key mechanism

Means is also provided to rotate the set-up wheels 498 backwardly to zero in case an erroneous set up is made thereon. This means includes a restoring rod 603 (Fig. 3a), carried between a pair of arms 604 secured on the shaft 499. The rod 603 extends through all of the slots 596 in the wheels 498, and is of sufficient length to permit the longitudinal movement of the group of wheels 498 as they escape to the left (Fig. 3) when being set up. A gear 605 (Fig. 23) secured to the shaft 499 meshes with a segment carried on an arm 606 pivoted on the shaft 93 and forming one arm of a lever. The other arm 607 of the lever carries a roller 608 projected into a cam groove 609 in a cam 610 secured to the cam shaft 94.

The cam 610 operates to rock the lever 606—607 clockwise, which rotates the gear 605, shaft 499, and the restoring rod 603 counterclockwise to restore the wheels 498 to normal. On normal operation the wheels 498 are restored as the racks 575 advance toward the right, the restoring rod 603 following this movement, to insure that all of the set up wheels 498 are fully restored in case of failure.

However, on operations wherein an erroneous number has been set up on the wheels, the operator presses the error key 128 which will be described later, renders the rack engaging mechanism ineffective, so that the set-up wheels 498 will not be restored by the racks 575 as they move toward the right. In this case, operation of the restoring rod 603 (Fig. 3a) effects the complete restoration of the set-up wheels 498, to their normal position.

A number to be set on the set-up wheels 498 may vary in the number of denominational orders from one to nine, the numbers being limited in denominational order to the numbers of the set-up wheels 498 provided in the machine. In the illustrated embodiment, nine of these wheels are provided, however, when a number is set on these wheels utilizing less than the nine wheels, certain of the racks 575 will not cooperate with the wheels 498, in which case it is necessary to provide means to prevent such racks as do not mesh with the set-up wheels 498 from movement toward the right. This means includes a series of pawls 611 (Figs. 3 and 20) there being a pawl 611 cooperating with each rack 575. The pawls 611 are pivoted on a rod 612, mounted in a bracket 613 carried on ears 614 bent inwardly from the upper edge of the side plates 576 of the rack frame, (see also Fig. 23a). Referring to Fig. 20, it can be seen that the pawls 611 rest in the paths of projections 615 on the left hand ends of the racks 575. As the group of set-up wheels 498 escape toward the left (Fig. 21) a projection 616 on the sleeve 546 positions itself over tails 617 projecting from pawls 611. When the rack frame 576 is brought upwardly to mesh the racks 575 with the set-up wheels 498, the tails 617 of the pawls 611 move upward therewith, and the projection 616 rocks the pawls clockwise about pivot 612 to remove the pawls from cooperative relationship with the projections 615 on the racks 575.

Obviously only those pawls 611 will be rocked which lie beneath the projection 616. Thus, if a number comprising four denominational orders is set on the wheels 498, the left hand four of these wheels (Fig. 3) will engage the right hand four of the rack 575. Likewise the projection 616 will move left over the four pawls 611 to the right. Now when the rack frame 576 is rocked upwardly (Fig. 20) the four pawls to the right will be rocked out of engagement with their respective racks, whereas the remaining pawls 611 cooperating with higher denominational order racks 575 will remain in their position wherein they are effective to restrain the racks 575 from moving toward the right (see Fig. 20) to set the adding rack and the type elements to be described later.

It was stated above that after an amount was set on a set-up wheel 498, and before the release bar 97 is pressed to operate the machine, the operator may observe the amount set on the wheels 498 through the sight opening 543 (Figs. 4 and 23). If the amount set thereon does not correspond to the amount represented by the particular check being sorted, the operator may, by pressing the error key 128, (Figs. 4 and 20) erase the setup from the wheels 498 without entering the amount into the totalizer or printing the amount on the record materials. This is accomplished by preventing the engagement of the racks 575 with the set-up wheels 498, and operating the machine through the regular cycle. This error correcting operation is effected by the depressing of the error key 128 (Fig. 20) which is mounted on a lever 618. The lever 618 is bent, as illustrated at 619, and is pivoted on a stud 620 supported in a projection 621 (Fig. 3) on the cross bar 580.

A link 622 (Fig. 20) connects the lever 618 to the arm 588 of the bell crank 589 so that when the error key 128 is depressed rocking the lever 618 counterclockwise, the link 622 rocks the bell crank 589 likewise counterclockwise. This thrusts the link 587 toward the right, moving the end of the link out of cooperation with the stud 586 in the lever 584. Now when the cam groove 583 (Fig. 24) rocks the lever 584 clockwise the stud 586 carried by the arm 584 rocks idly without moving the link 587, or transmitting the movement to the rack frame. The other arm 627 of the bell crank 589 carries an ear 628 which cooperates with a shoulder on a detent 629 to hold the key depressed during the operation.

Depression of the error key 128 also operates the release bar 97 in the following described manner: An arm 623 rigidly connected to the bell crank 589 (Fig. 20) but spaced apart therefrom on the shaft 590 rests immediately above the stud 310 on the release bar (see also Fig. 11) so that when the bell crank 589 is rocked counterclockwise by depression of the error key 128, the arm 623 acting on the stud 310 moves the release bar 97 downwardly to release the machine for an adding cycle. As just explained, the racks 575 are not raised into engagement with the set up wheels 498 on this operation, also these racks are not shifted toward the right, due to the pawls 611 remaining in engagement with the projection 616. However, the segment 554 (Figs. 3a and 23) is given its restoring movement to rotate the cam 550, thus restoring the wheels 498 in one stroke to their normal right hand position, as viewed in Fig. 3. Likewise the cam groove 609 (Fig. 23) operates the arm 606 to rotate the gear 605, which in turn operates the restoring rod 603 (Fig. 3a) to rotate the set-up wheels 498 counterclockwise to their normal positions.

Rack operating mechanism

Referring to Fig. 23 each of the racks 575 carries a stud 624 at its right hand end which stud is embraced by the bifurcated end of an arm 625 of a bell crank 631 pivoted on a shaft 632. The other arm 633 (Fig. 26) of the bell crank 631 is also bifurcated and straddles a stud 634 carried by a vertically disposed slide 635. There is a bell crank 631 and vertical slide 635 for each denominational order rack 575. At its upper end the vertical slide 635 carries type elements 636 slidably mounted therein, and spaced vertically along the slide 635 are totalizer actuators 637 (Figs. 26 and 26a), 638 and 639 (Fig. 26a). The purpose of the bell crank 631 is to transmit the movement of the rack 575 to the vertical slide 635, for the purpose of positioning the type element 636 differentially, and for actuating the several totalizers to be described later, to enter the amount set up on the keys 110.

The arms 625 of the bell crank are normally pressed against a bail 640 carried between a pair of arms 641 (Figs. 23, 32 and 32A) secured to the shaft 632 by a spring 642 stretched between a projection 643 on the lower side of the rack 575 and one of the rods 644 carried between the arms 641.

After the racks 575 have been rocked into engagement with the previously set set-up wheels 498, the bail 640 (Fig. 23) receives an invariable excursion, first counterclockwise and then clockwise to normal. On its counterclockwise travel, the rod 644 acting through the spring 642 draws the racks 575 which were engaged with the set-up wheels toward the right therewith, each rack 575 being differentially stopped by its corresponding set-up wheel 498, engaging the stop rod 597 (Fig. 3a). The bail 644 continues its invariable excursion after the racks 575 are arrested merely stretching the springs 642.

After the racks 575 are disengaged from the set-up wheel 498, as described above, the bail 640 receives its clockwise or restoring movement to shift the racks 575 leftward to their normal position.

The means for operating the bail 640 is illustrated in Fig. 28, and includes a pair of complementary cams 645 fast on the shaft 94 cooperating with rollers carried on a curved arm 646 pivotally supported on a rod 630. A link 647 connects the curved arm 646 with an arm 648 secured to the shaft 632. At each adding cycle the cams 645 (Fig. 28) rock the arm 646 first clockwise and through the link 647 rock the arm 648, shaft 632, and the bail 640 counterclockwise. The cams 645 then reverse this movement rocking the arm 646 counterclockwise and through the link 647 rock the arm 648, the shaft 632 and the bail 640 clockwise to restore the racks 575 to their normal position.

*Totalizers*

It was stated above that each of the slides 635 are shifted vertically a distance commensurate with the movement of the rack 575 under the control of the related set-up wheel 498. This movement positions the corresponding type element 636 opposite a platen 649. Mechanism is then operated to force the type element 636 against the record material in order to take the impression therefrom. This printing mechanism will be described later.

When the slides 635 (Figs. 26 and 26a) are in their differentially raised positions, two of the totalizers are moved into mesh with the racks 637 and 638 but the racks 639 are moved into engagement with a selected one of a plurality of totalizers 650, there being a totalizer 650 corresponding to each of the compartments in the sorting drum and selectable by positioning the drum as a compartment is selected.

The totalizers 650 are mounted on rods 651 supported between discs 652 (Figs. 26a and 32a) secured to the shaft 60 upon which the sorting drum is mounted. Obviously when the sorting drum is rotated under control of the sorting key 98 the corresponding totalizer 650 is brought into cooperative relation with the racks 639. The totalizer shafts 651 are mounted in the side plates 652 concentrically with the shaft 60 and bear a fixed relationship with each other and with said shaft. Each totalizer 650 is provided with an aligner 653 mounted in radial slots 654 in the discs 652 and the aligner 653 for the selected totalizer is adapted to be withdrawn radially toward the shaft 60 simultaneously with the engagement of the racks 639 with the selected totalizer.

These racks 639 (Fig. 26a) are slidably mounted on short slides 655 which at the upper ends carry studs 656 projecting through substantially horizontal slots 657 in the lower ends of the vertically disposed slides 635, so that the racks 639 may be shifted vertically with the slides 635.

Referring now to Fig. 26a the slides 655 are slidably mounted in frames comprising side plates 658 pivotally supported on a rod 659, and which are tied together by a rod 660. The framework for the actuator racks 639 which comprises the frame 658 also carries the associated carrying mechanism and the zero elimination mechanism to be described later. The stud 659 which supports this framework is carried in a frame comprising side plates 666 (Fig. 32A) and 667 (Fig. 26A) jointed together by a plurality of shoulder studs 668 and 669.

The studs 669 extend through and beyond the frames 666 and 667 into the adjoining frames 31 and 32 of the machine, thus supporting the framework comprising the frames 666 and 667, which, in turn, supports the totalizer actuating mechanism, together with the transfer and total taking structure, all of which will be described later.

The vertical slides 635 are guided near their upper end by combs 670 (Fig. 26) secured to and extending between the frames 666 and 667. At their lower end the slides 635 are guided by combs 671 (Fig. 26a) also secured to and extending between the frames 666 and 667. The short slides 655 which carry the racks 639 are guided by a comb 672 (Fig. 26a) near the upper end of the racks and by a comb 673 (see also Fig. 33) secured to the frames 658. A bracket 674 also secured to the frames 659, assists in guiding the rack 655 in their vertical movement.

In addition to the compartment totalizers 650 carried in the frame comprising the discs 652, there are also provided a totalizer 675 (Fig. 26a) herein known as the "group totalizer", and a totalizer 676 (Fig. 26) known herein as the "grand totalizer". The totalizer 675 is mounted on a rod 677 supported between downwardly extending arms 678 pivoted on the rod 679 extending between frames 666 and 667. The grand totalizer 676 is mounted on a rod 680 supported between upwardly extending arms 681 and also pivoted on rod 679. Aligners 682 and 683 are provided to prevent accidental displacement of the totalizer wheels 675 and 676 when the respective totalizers are out of mesh with their actuator 637, or 638.

The grand totalizer 676 and the group totalizer 675 are engaged with their respective actuator racks 637 and 638, and the racks 639 are engaged with a selected one of the totalizers 650 at each item entering operation. As will be described later, the grand totalizer, the group totalizer, or a selected one of the compartment totalizers 650 may be selectively operated to take a total therefrom on total taking operation under control of the total keys 132, 133, or 134 (Fig. 4). The means for engaging the grand totalizer 676, the group totalizer 675 with their respective racks, and for engaging the racks 639 with the selected totalizer 650 on item entering operation will now be described.

An adding engaging slide 684 (Figs. 32 and 32a) is mounted to slide vertically on studs 685 projecting from the frame 666. The slide 684 is provided with recesses 687 in its right hand edge, there being a recess 687 associated with each, the grand and group totalizer, and with the compartment totalizers 650. Studs 688 carried on the left hand ends of links 689 normally project into the recesses 687. The other ends of the link 689 are pivotally connected to arms 690 of the bell cranks pivotally mounted on studs 691, projecting from the frame 666. The other arms 692 of the bell cranks carry studs 693 projecting through slots 694 in totalizer engaging and controlling racks or slides 695, slidable vertically on studs 696 in the frame 666. Another engaging slide 697 slidable vertically on studs 698, and having recesses 699, there being a recess opposite each of the totalizer engaging mechanisms is provided to engage the selected totalizer with the racks on total taking operations. A bar 700 fixed on the studs 695 has notched ears 706 located in line with the recesses 687 in the slide 684 and the recesses 699 in the slide 697, to provide neutral positions for the engagement studs 688.

These studs 688 are adapted to be selectively shifted to one of these three positions, that is, to the adding recess 687 in slide 684; neutral recess in the ear 706, or a total recess 699 in the slide 697. The adding position is that in which the studs 688 are shown (Figs. 32 and 32a), a neutral position wherein the studs 688 rest in the notched ears 706 in the bar 700, and the total taking engaging position wherein one of the studs 688 rest in the related recess 699, in the bar 697. It is pointed out that when a total is taken only one totalizer is engaged with the total engaging control slide 697, the studs 688 for the other totalizers being shifted to neutral position.

Links 707 (Figs. 32 and 32a) connect the engaging studs 688 with engaging cam arms 708 pivoted on studs 709, projecting from the frame 678 for the group totalizer 675 and from the frame 681 for the grand totalizer, and the stud 711 (Fig. 32) projecting from the rack frame 658 carrying the compartment totalizer actuator racks 639. Springs 712 normally hold the bell cranks 690—692 in the positions in which they appear in Figs. 32 and 32a holding the engaging studs 688 in their recesses in the adding engaging slide 684.

The mechanism for actuating the slide 684 is best shown in Fig. 35 and includes a cam 713 fast on the cam shaft 94. A groove 714 in the cam 713 embraces a stud 715 on a cam arm 716 pivoted on the rod 630 and having a pin and slot connection with one arm 717 of a lever 718 pivoted on a stud 719. The right end of the other arm 720 of the lever 718 projects into a recess in the left hand edge of the adding engaging slide 684.

At the proper time, following the differential positioning of the slides 575, and the vertical slides 635, which carry the actuator racks 637, 638 and the slides 655 carrying the actuator racks 639, the cam 713 (Fig. 35) rocks the cam arm 716 clockwise which in turn rocks the lever 718 counterclockwise to raise the adding engaging slide 684. Referring now to Figs. 32 and 32a, it is clear that the upward movement of the slide 684 carries the studs 688 and the links 707 upwardly therewith, and due to the connection of the links 707 with the cam arms 708, these arms are rocked clockwise. At this movement cam slots in the arms 708 acting on the studs 710 and 711 rock the grand totalizer and the group totalizer into engagement with the respective racks 637 and 638, and the stud 711 rocks the compartment totalizer actuator racks 639 into engagement with the selected compartment totalizer. Now when the slides 635 (Figs. 26 and 26a) are restored downwardly, as the racks 575 are restored toward the left to their normal position (Fig. 23), an amount commensurate with the amount previously set on the set-up wheel 498 (Figs. 3, 3a, and 20) will be added into the grand totalizer, the group totalizer, and the selected compartment totalizer.

Shortly after the vertical slides 635 are restored downwardly to effect the item entering operation the cam 713 (Fig. 35) reverses the operation of its cam arm 716 and the lever 718 to lower the adding engaging slide 684. This downward movement of the slide 684 (Figs. 32 and 32a) rocks the cam arms 708 counterclockwise, to disengage the grand totalizer and the group totalizer from their respective racks 637 and 638, and to disengage the compartment totalizer actuator racks 639 from the selected compartment totalizer 650.

Compartment totalizer aligner

As was stated above, the aligners 653 (Figs. 26a and 32a) are held in cooperative relation with their respective totalizers 650 by springs 661. Inasmuch as totalizers 650 are fixedly mounted on shafts 651 with relation to the shaft 60 it is necessary to provide means to move the aligner 695 out of cooperating relationship with the selected totalizer, in order that the totalizer elements may be freely rotated through the action of the racks 639. To accomplish the disengagement of the aligner 653 for the selected totalizer 650, the ends of each of the aligners projects through slots 654 beyond one of the discs 652 carrying the totalizers 650. When the selected totalizer is moved into position so that the racks 639 can be moved into mesh therewith, the projecting ends of the aligner 653 enters the notched upper ends 701 (Fig. 32a) of arms 702, pivoted on a rod 703 projecting between the frames 666 and 667, there being an arm 702 on each side of the totalizer racks. Cam plates 704 pivotally connected to the rack engaging arms 708 are bifurcated at their lower ends, and straddle the rod 703. Each of the cam plates 704 also has a cam slot 705 therein, embracing a stud 721 projecting from the aligner arm 702.

As previously described, the rack engaging arms 708 are rocked clockwise to move the racks 639 into engagement with the selected totalizer 650. During the clockwise movement of the cam arms 708 the cam plates 704 are raised. Near the end of its upward movement the cam slots 705 rock the arms 702 counterclockwise (Fig. 32a), to move the aligner for the selected totalizer wheels radially toward shaft 60. It is to be understood that there are provided two engaging arms 708, one appearing in Fig. 32a, the other not being illustrated herein, but which is exactly like the arm 708 (Fig. 32a) and is located behind frame 667 (Fig. 26a).

Likewise, a cam 704 and an aligner operating arm 702 are provided to operate on the opposite end of the aligner 653.

When the cam arm 708 is rocked counterclockwise, disengaging the racks 639 from engagement with the selected totalizer 650, the cam plates 704 are lowered, at which time cam slots 705 rock the arms 702 clockwise, and permits the springs 661 to re-engage the aligner 653 with the totalizer wheels 650 of the selected totalizer.

Transfer mechanism

Means is provided to add "one" to totalizer wheel when the wheel of the next lower order passes from 9 to 0. This means includes the racks 637, 638 and 639, which are permitted to make an additional step of movement when the slides 635 (Figs. 26 and 26a) are moved downwardly to enter an amount into the totalizer. The racks 637, 638, and 639 are normally prevented from making this additional step of movement by ears 722 on transfer pawls 723 pivoted on rods 724. Arms 725 integral with the pawls 723 extend forwardly into the path of the usual transfer teeth provided on the totalizer wheels. As the racks are carried downwardly to effect addition of the amount set up by the keys 110 into the totalizer, a totalizer wheel may pass from 9 to 0 so that the transfer tooth strikes the arm 725 rocking the transfer pawl 723 counterclockwise to remove the ear 722 from the path of the downwardly moving rack 638 of the next higher denominational order. The rack 638, for example, may then continue its downward movement one additional step to add one into the totalizer wheel of the next higher denominational order. When the pawl 723 is rocked counterclockwise (Fig. 26a) it is held in its retracted position by a spring urged detent 727 loosely pivoted on a rod 728 engaging a tail 726 on the pawl 723.

Those transfer pawls 723 which are knocked down or rocked counterclockwise during an adding operation are retained in their operated positions until released in the next following adding operation when the detents 727 are rocked clockwise to free the transfer pawls 723 to the action of their springs 729. The mechanism for restoring the transfer pawls 723 includes shafts 728, having secured thereon adjacent to the detents 727 arms 730 carrying a rod 731 projecting across the plane of the detents 727. Secured to the shafts 728 for the grand totalizer and the group totalizer are arms 732, to each of which is pivotally connected a link 733. The lower end of one of the links 733 is pivotally connected to an arm 734 (Fig. 26b) pivoted on stud 735a projecting from the frame 667. The arm 734 is provided with a slot 736 embracing a stud 735 on an arm 737 (Fig. 26c) secured to a shaft 728 for the compartment totalizer. A rod 739 mounted between the arm 737 and an arm 740 secured to the opposite end of the shaft 728 cooperates with the tails of the detents 727 (Fig. 26a) for the compartment totalizer unit.

In order to operate the rods 731 and 739 to restore the tripped transfer devices a lever 747 (Fig. 26a) secured to a shaft 748 is pivotally connected to the link 733. Also fastened on the shaft 748 is an arm 749 (Fig. 29) connected by a link to a cam arm 751, pivoted on the rod 630 and carrying a stud 752 projecting into a cam groove 753 in a cam 754 secured to the shaft 94. Early in the adding operation the cam groove 753 rocks the cam arm 751 clockwise which movement is transmitted by the link 750 to rock the arm 749, shaft 748 and lever 747 (Fig. 26a) also clockwise. This movement of the link 733 rocks the arm 732, shaft 728 and rods 731 for the grand and group totalizer clockwise for the purpose of rocking the detents 727 out of engagement with the transfer pawls 723, to permit the springs 729 to restore these pawls to their normal position in the path of the racks 637 and 638.

The downward movement of the link 733 also rocks the ram 734 clockwise, which through the coupling 735 and 736 rocks the arm 737, the shaft 728, and the rod 739 also clockwise to operate the detents 727 for the compartment totalizer.

Means is also provided to raise the racks 637, 638 and 639 to their normal position after they have been advanced an additional step for the purpose of transferring from a lower to a higher denominational order. This means includes a frame comprising side members 755 (see Fig. 37) joined by cross bars 756 extending just beneath the groups of racks 637, 638, and 639. The side members 755 carry studs 757 projecting into slots in frames 666 and 667 (Figs. 26, 26a, 32 and 32a). One of the upper pair of studs 757 is embraced by the other arm 758 (Fig. 26a) of the lever 747, and when the lever 747 is rocked clockwise to release the transfer pawls 723 the frame comprising the cross bars 756 and the side members 755 is raised bringing the cross bars 756 into contact with the lower ends of the racks, restoring these racks to their normal position. At this time the pawls 723 are released by the detents 727, and the ears 722 by springs 729 resume their position in the paths of the racks 737, 738 and 739 to maintain the racks in their normal position until a transfer again occurs.

*Vertical slide aligner*

Means is provided to align the vertical slides 635 in their adjusted positions during the time the type elements 636 (Fig. 26) are being operated to take the impression on the record material of the control tape printer. This means includes an aligner 747 (Figs. 26a and 38) slidably mounted on studs 759 projecting inwardly from the frame 666 and 667.

The aligner 745 is also pivotally supported on arms 760 secured to a shaft 761, mounted in the frames 666 and 667. Secured to the shaft 761 outside of the frame 667 is an arm 762 connected by a spring 763 to an arm 764 loosely mounted on the shaft 761. The spring 763 normally retains an ear 765 of the arm 764 against the upper edge of the arm 762. A link 766 connects the arm 764 with a cam arm 767 pivotally mounted on rod 768. The cam arm 767 carries a roller 769 projecting into a cam groove 770 in the side of a cam 771 secured to the cam shaft 94. After the vertical slides 635 (Figs. 26 and 26a) have been adjusted, under control of the set up wheels 498, the cam 771 (Fig. 38) rocks the cam arm 767 counterclockwise, and through the link 766 transmits this movement to the arm 764, rocking this arm clockwise about this pivot 761 and stretching spring 763. The spring 763 transmits the movement of the arm 764 to the arm 762, and the shaft 761 rocking the arms 760 clockwise to draw the aligner 745 toward the left, (as viewed in Figs. 26a and 38) to enter the aligner into the proper one of a plurality of notches 789 formed in the right edges of the slides 635. The spring 763 is provided to prevent breaking or mutilation of parts, in the event the aligner 745 meets with resistance during its operation.

After the impression is taken from the type wheels, the cam 771 reverses the movement of the mechanism rocking the arm 764 counterclockwise, and through the ear 765 rocks the arm 762, shaft 761 and the arms 760 positively counterclockwise, withdrawing the aligner 745 from the slides 635. It is immediately after the withdrawal of the aligner 745 from the slides that the slides 635 are restored downwardly to their normal position, to effect the adding operation.

*Control printer*

It was stated above that means is provided to take an impression from the type element 636 when the slides 635 are in their adjusted positions. The printing mechanism for accomplishing the impression is known herein as "Control printer". This printing mechanism is supported by a frame 773 (Fig. 32) and a frame 774 (Fig. 26) mounted on rods 775, projecting between the frames 31 and 32. At the proper time, after the slides 635 are adjusted, hammers 776 pivoted on a shaft 777 extending between the frames 773 and 774 are released and springs 778, there being a spring for each hammer 776, throw the hammers against the selected type element 636 pressing each element against the record material 772 to make the impression thereon. The springs 778 normally urge the hammers 776 clockwise but a bail 779 secured to the shaft 777 normally restrains the hammers in their retracted positions. The operating mechanism for the bail 779 includes an arm 780 (Figs. 32 and 34), fast on the shaft 777 and connected by a link 781 to an arm 782 (Fig. 34) on the shaft 632. Another arm 783 is mounted on the shaft 632 and is hubbed to the arm 782 the arm 783 being connected by a link 784 to a cam arm 785 loosely pivoted on the rod 630. A stud 786 on the arm 785 projects into a cam groove 787 in the side of a cam 788 fast on the shaft 94. At the proper time, the cam groove 787 rocks the cam arm 785 clockwise thrusting the link 784 toward the right (Fig. 34) rocking the arms 783 and 782 counterclockwise. This movement through the link 781 rocks the arm 780 and the shaft 777 clockwise to rock the bail 779 (Fig. 26) also clockwise to free the hammers 776. At this time the springs 778 endeavor to rock the hammers 776 clockwise but tails 791 on said hammers come into contact with shoulders on individual trippings arms 792 pivoted on a shaft 793 extended between the frame 773 (Fig. 32) and 774 (Fig. 26) to prevent operation of the hammers unless the slides 635 are adjusted.

Each of the tripping arms 792 has pivotally connected thereto a bar 794 urged by a spring 795 against the under side of a stud 796 in the corresponding slide 635. The stud 796 normally holds a shoulder 797 on the bar 794 below the path of movement of a bail 798, integral with bail 779, and adapted to be operated therewith.

When the slide 635 is adjusted upwardly the stud 796 moving upwardly therewith permits the spring 795 to rock the bar 794 counterclockwise bringing the shoulder 797 into the path of the tripping bail 798. Now when the bail 798 rocks clockwise, it picks up the bars 794 thrusting them toward the left, to rock the tripping arms 792 clockwise, thus freeing the tails 791 of the hammers to their springs 778 whereupon these springs throw the hammers clockwise to take the impression.

Immediately after the impression is taken, the cam 788 acts to rock the shaft 777 and the bail 779 counterclockwise, restoring the hammers 776 to their normal retracted positions. As the tail 791 passes the shoulder of the tripping arm 792, the springs 795 draw these arms into position in the path of tail 791.

The stud 796 on the slide 635 holds the bars 794 two spaces below their respective tripping positions, so that when the bars move upwardly to position the zero type elements in printing position, these bars will still be ineffective to trip the hammers. The purpose of this arrangement is to prevent the printing of zeros to the left of the highest denominational order wherein is set a significant digit. Each of the tripping arms 792 is provided with a cross-over 799 to the next lower bar 792, so that if the zero is set on a slide 635, to the right of the highest order significant digit, the cross-over 799 of the next higher denominational order tripping arm will rock the tripping arm 792 of the denominational order having the zero set thereon to permit the hammer 796 associated therewith to print the zero.

The record material upon which the impressions are made by the control printer is unwound from a roll 801 (Figs. 1, 26 and 32) and passes between the platen 649 and a guide plate 802. A tension roll 803 mounted on a shaft 804 is spring pressed against the platen 649 in order that the rotation of said platen may feed the control tape.

The platen 649 is mounted on a shaft 805 supported in the printer frames 773 and 774. Secured to the shaft 805 outside the frame 773 (Fig. 32) is a ratchet 806 with which yieldingly cooperates an aligner 807 pivotally mounted on the frame 773. A projection 808 on a reciprocating feed slide 809 having its left hand end (Fig. 32) operatively connected to an arm 810 fast on the shaft 777 also cooperates with the ratchet 806.

In its normal position the projection 808 is held in engagement with the ratchet 806 by a spring 811 attached to the right hand end of the slide 809. At the proper time during an operation the slide 809 is shifted toward the right removing the projection 808 from engagement with the ratchet, which is held against retrograde movement by the aligner 807. As soon as the projection 808 clears the ratchet tooth the spring 811 draws the slide 809 upwardly against a stud 812 carried on one arm 813 of a bell crank 814.

After the impression is made the shaft 777 rocks counterclockwise for the purpose of restoring or retracting the discharged hammers 776 as described above. This movement of the shaft 777 through the arm 810 (Fig. 32) draws the slide 809 toward the left. Near the end of its leftward travel the projection 808 engages the next higher ratchet tooth and advances the platen one step to feed the control tape or web one space in readiness to receive the next impression.

On total taking operations the bell crank 814 is rocked clockwise, by mechanism to be described later, to raise the stud 812. This permits the slide 809 to move upwardly an additional step in order to advance the platen two spaces.

An ink ribbon 815 (Figs. 26 and 32) adapted to be wound and unwound from spools 816 and 817 and which is adapted to be interposed between the types 636 and the control tape provides a convenient medium for rendering the impression legible. Conventional means is provided to feed and reverse the direction of feed of the ribbon.

Compartment indicators

Means is provided to select and print on the control tape a character indicating the particular compartment into which a check is sorted. This mechanism also sets a visible indicator which the operator may read before he depresses the motor release bar 97 to release the machine for a check entering and item entering operation thus being able to check the selected compartment and compartment totalizers before releasing the machine for operation.

This mechanism is illustrated in Figs. 39 and 40 and includes type elements 818 slidably mounted in a vertical slide 819. This slide is guided by the combs 670 (Fig. 26) and 671 (Fig. 26a) which guide the slides 635. An arm 820 secured to the lower end of the slide 819 carries a roller cooperating with a heart-shaped cam 826 fast on the sorting drum shaft 60 (see Fig. 9). When the sorting drum is rotated to the selected position the cam 826 is rotated therewith shifting the slide 819 upwardly if necessary to bring the proper one of the type elements 818 to the printing position. The sorting drum remains in the last selected position and is rotated, as previously set forth, in either direction to bring the next selected compartment to position, consequently the slide 819 may be moved upwardly or drop by gravity to correspondingly position the type.

There is also provided an indicator wheel 827 (Figs. 21 and 40) rotatably mounted on a stud projecting from the frame 31. Characters indicating the compartments are engraved or otherwise suitably marked on the periphery of the wheel 827 which is visible through a sight opening 828 adjacent to the opening 543 (Fig. 4). Teeth 829 formed in the left hand edge of the slide 819 mesh with a gear 830 mounted on a stud 831 and connected by a hub to a gear 832 which meshes with a rack 833 on the right hand end of a horizontal slide 834 mounted on studs 835 (Fig. 40) only one of which is shown. A rack 836 (Fig. 40) on the left hand end of the slide 834 meshes with a gear 837 fast to the indicator wheel 827.

The vertical adjustment of the slide 819 is transmitted through the gears 830 and 832 to the horizontal slide 834 correspondingly adjusting the latter, which, in turn, rotates the indicator 827 to position the identifying character corresponding to the selected compartment under the sight opening 828. Thus both the amount set up on the wheels 498 (Fig. 21) and the identification of the selected compartment may be observed and checked before the release bar 97 (Fig. 4) is depressed to enter the check in the compartment and the amount into the accumulators.

If the wrong amount has been set up the operator may depress the error key 128 (Fig. 4) to control the machine to wipe out the amount set up and by depressing the proper key 98 the correct compartment may be selected before the check is entered.

Compartment printers

As each check is entered into a selected compartment and the amount of the check is entered into a corresponding accumulator 651 (Fig. 26a) the amount of the check, in addition to being printed on the control tape as set forth above, is also printed on one of twenty four compartment tapes located at the rear of the machine. These twenty four individual printers correspond to the twenty four compartments in the sorting drum and to the twenty four compartment accumulators. Each time a selector key 98 (Fig. 4) is depressed to select a compartment the corresponding compartment accumulator and the corresponding compartment printer are selected.

These compartment printers are arranged in three vertical rows across the back of the machine and each of the printers is provided with a group of type segments 833 (Figs. 26, 26a and 30) comprising a plurality of denominational orders. These segments are mounted on a series of shafts 834 mounted in a plurality of vertical frames 835 secured to the rear of the machine. The segments 833 of each denominational order in each vertical group are provided with arms 836 each of which arms is operatively connected to a common link 837 so that when one of said segments 833 is selectively adjusted all segments of that particular order and in the particular vertical group are correspondingly adjusted.

The segments 833 of one group are provided with segmental gears 838 which mesh with segments 839 on the ends of arms 840 of levers 841 pivoted on a shaft 842. These segment gears 838 are connected to the links 837. Springs 843 (Fig. 26a) urge the links 837 downwardly tending to rock the segments 833 counterclockwise and the lever 841 clockwise pressing the other arms 844 of the levers 841 upwardly against studs 845 projecting from the vertical slides 635. When these slides are adjusted upwardly by the mechanism and for the purpose set forth above, the levers 841 follow under the tension of the springs 843 thus correspondingly adjusting the type segments 833 for the right hand group of printers looking at the front of the machine and which are illustrated in Figs. 26 and 26a.

It may be noted here that the springs 843 (Fig. 26a) and the springs 642 (Fig. 23) previously described operate at different times and are tensioned at different times in order to distribute the work done by the machine and also to distribute the action by the springs. Suppose, for instance, that one denominational order is to be set to "5" under the control of its set up wheel 498 (Fig. 23). As the bail 640 moves counterclockwise the particular rack 575 moves therewith without placing additional tension on the spring 642 associated therewith until said rack is stopped in the "5" position by the stop rod 597 (Fig. 3a). Until this occurs the springs 843 (Fig. 26a) which were previously tensioned exert their tension downwardly on the links 837 thus assisting to adjust these links and through the levers 840 assist in adjusting the vertical slides 635. After the rack 575 is stopped the bail 640 continues its invariable excursion tensioning the spring 642.

At the restoring movement, the springs 642 now being under greater tension than they were previously, assist in restoring the bail 640 until said bail picks up the rack. From there on to the home position the bail 640 positively restores the slide 575, vertical slide 635 and the links 837 together with all of the type segments 833 of that particular denominational order, tensioning the springs 843 as the links 837 involved are raised.

In order to adjust the type segments 833 of the remaining two vertical groups of printers one segment of each denominational order for each group is secured to one of the shafts 834. For example the units segment 833 in the lowermost group is fast on the shaft 834u (Fig. 26a) upon which it is mounted. Likewise the units segments 833 for the two other groups mounted on this particular shaft are also fast on said shaft 834u. Now movement of the units link 837 in the vertical group shown in Figs. 26 and 26a by the springs 843 and under control of the units slide 635 sets all of the units segments 833 for this vertical group of printers. This movement is transmitted by the lower shaft 834u to the units segments 833 for the lowermost printers of the two other vertical groups, and, these latter segments being operatively connected to units link 837, set all of the units segments 833 in their respective vertical groups.

It can thus be seen that all of the 24 units type segments 833 are simultaneously and correspondingly adjusted under the control of the previously described set-up mechanism.

This applies also to all of the denominational order segments 833, however, since there are ten denominational order segments 833 in each of the 24 groups and eight shafts 834, it is necessary to provide two additional or auxiliary shafts 846 (Fig. 26) and 847 (Fig. 26a) to transmit the movement of these two denominational orders to the two other vertical groups of segments.

The printing mechanism are all alike and the eight printers of each group are mounted in a removable common frame comprising side plates 848 (Figs. 32 and 32a) and 849 (Figs. 26 and 26a). Referring to Fig. 30, a platen 850 is mounted in a channel bar 851 supported by a pair of arms 852 (only one of which is shown) secured to a shaft 853. This shaft is journaled in the plates 848 and 849, and has secured to one end thereof an arm 854 (Fig. 30a). A stud 855 carried by the arm 854 extends across the plane of an arm 856 loosely mounted on the shaft 853, the arm 856 having a strong spring 857 attached thereto which normally holds the arm 856 against a stop block 858 secured to the plate 849.

An arm 859 (Fig. 31) is fast on the other end of the shaft 853 adjacent a lever 860 rotatably mounted on the shaft 853. One arm of the lever 860 pivotally carries a tripping pawl 866 having an ear 867 adapted to be held normally against a shoulder on the lever 860 by a spring 861.

At the proper time during the operation of the machine the lever 860 is rocked clockwise, and, after having travelled a short distance, a projection 868 on the tripping pawl 866 engages the arm 859 and rocks the arm, the shaft 853, arm 854 (Fig. 30a), and through the stud 855, the arm 856 clockwise against the tension of the spring 857, until a tail 869 on the tripping pawl 866 (Fig. 31) strikes a stud 870 projecting from the frame 848. When this occurs the lever 860 continues its travel rocking the pawl 866 counterclockwise past the arm 859.

As soon as the arm 859 is free of the projection 868 the spring 857 (Fig. 30a) throws the arms 856, 854, shaft 853 and the platen 850 (Fig. 30) sharply counter-clockwise. The arm 856 strikes and is arrested by the stop block 858 but the momentum of the hammer carries the platen against the types on the segments 833 to take the impressions therefrom. A spring 871 (Fig. 30a) restores and holds the stud 855 against the arm 856 in which position the platen is clear of the type segments.

On the return stroke of the lever 860 the projection 868 on the pawl 866 (Fig. 31) wipes by the end of the arm 859 whereupon the spring 861 restores it to normal position.

The impressions are taken on a tape or web 873 (Fig. 31) which is unwound from a supply roll 874 supported between the plates 848 and 849. The tape passes around the shaft 853 and then between a feed roller 875 and a tension roller 876. After leaving these rollers the tape passes rearwardly over a plate 877 the rear edge of which is serrated so that the tape may be torn off to accompany the group of checks taken from the corresponding compartment.

The feed roller 875 is mounted on a shaft 878 journaled in the plates 848 and 849, and has secured thereto a ratchet 879 (Fig. 30b) which cooperates with a feed pawl 880 pivotally carried by an arm 881 pivoted on the shaft 853. A stud 882 on the arm 881 is embraced by a bifurcated arm 883 fast on a shaft 884 mounted in the plates 848 and 849. A link 885 (Fig. 31) connects an arm 886 fast on the shaft 884, to the other arm 939 of the lever 860.

Now when the lever 860 is rocked clockwise to retract and then to trip the hammer, through the connection 885 it rocks the arm 886, shaft 884 and arm 883 (Fig. 30b) also clockwise. This movement rocks the arm 881 counterclockwise to advance the feed roll 875 (Fig. 31) one step. A spring 887 (Fig. 30b) maintains the feed pawl 880 in cooperative relationship with the ratchet 879.

The restoring movement of the lever 860 (Fig. 31) under the influence of a spring 888, reverses the movement of the arm 881 to retract the pawl 880. A retaining pawl 889 (Fig. 30b) under spring tension cooperates with the ratchet 879 to prevent retrograde movement thereof.

It was stated above that there are three printer frames each comprising plates 848 and 849. Each of these frames is joined near its upper end by a rod 890 (Fig. 26) and near its lower end by a rod 891 (Fig. 26a) and each of these frames is removably supported in the machine in the following described manner.

A rod 892 (Fig. 26a) joins the lower ends of the frames 835 and open slots 893 in the frames 848 and 849 are adapted to be seated over the rod 892 thus supporting the printing frame. Pivotally mounted on a rod 894 joining the upper ends of the frames 835 is a latch comprising a pair of arms 895 and 896 joined by a rod 897 and urged clockwise into engagement with the rod 890 by a spring 898. When it is desired to remove one of the printer frames the operator first rocks the latch 895—896 free of the rod 890 and by grasping the latter may rock the entire printer frame clockwise about the rod 892 (Fig. 26a) whereupon the frame may be lifted from the machine.

An ink ribbon 899 (Figs. 26 and 26a) is provided for each group of eight compartment printers. This ribbon is adapted to be wound and unwound on spools 900 and 901 (Figs. 26 and 26a respectively). The ribbon 899 passes around guide rollers 906 and 907 and thence between the groups of type segments 833 of the corresponding printing mechanisms.

The spools 900 and 901 are mounted on shafts 908 and 909 supported in the frames 835, each of said shafts having three ribbon spools mounted thereon, one for each group of printers. As the shafts 908 and 909 are rotated all three ribbons are fed simultaneously past their respective groups of type segments.

In order to rotate the shafts 908 and 909 and their corresponding ribbon spools the shafts are provided with ratchet feed pawls 910 and 911 respectively with which ratchet feed pawls 912 and 913 (Figs. 32 and 32a) carried at opposite ends of a vertical feed bar 914 cooperate. The bifurcated end of a slide 915 (Fig. 32a) embraces a stud 915a projecting from the bar 914 and the opposite end of said slide is bifurcated to straddle a shaft 916. A stud 917 on an arm 918 pivoted on the shaft 916 projects into an opening 919 in the slide 915 the left hand wall of said opening being pressed against the stud 917 by a spring 920. A stud 921 carried by the arm 918 projects into a cam slot 922 in a cam arm 923 fast on a shaft 924.

During an operation of the machine the cam arm 923 receives an oscillatory movement first clockwise (Fig. 32a) and then counterclockwise to normal. At this movement the cam slot 922 rocks the arm 918, and through the stud 917, the slide 815 counterclockwise first raising the ribbon feed link 814 and then lowering said link to normal position. At the upward movement of the bar 814 the feed pawl 812 rotates the ratchet 810, the shaft 808 and the ribbon spools 811 to unwind the three ink ribbons 899 from the spools 901 and wind said ribbons on the spools 900. When the ribbons are unwound from the spools 901 the pawl 812 is unable to operate the ratchet 810 thus restraining the bar 814 against upward movement. When this condition obtains the stud 917, upon counterclockwise movement of the arm 818 shifts the slide 815 leftward against the tension of the spring 820, which spring restores the slide 815 as soon as the stud 917 has passed the hump in the left wall of the opening 819. Now when the cam arm 823 rocks counterclockwise to normal rocking the arm 818 clockwise, the slide 815 is rocked clockwise to lower the bar 814. At this movement of the bar 814 the pawl 813 cooperates with the ratchet 811 to wind the ink ribbons on the lower spools.

*Compartment printer selection*

Only one of the twenty-four compartment printers is operated during an operation of the machine. The particular printer to be operated is selected under the control of the compartment selecting and compartment totalizer selecting mechanism. This mechanism includes three selector bars 925, 926 and 927 (Fig. 40) slidable vertically alongside each bank of printers. Each of the selector bars has two elongated slots 928 and 929 therein (see also Figs. 32 and 32a), the slot 928 surrounding a stud 930 carried on the upper end of a lever 931 pivotally supported on the frame 835. The slot 929 (Fig. 32a) embraces a stud 932 on the lower end of a lever 933 also pivotally supported on the frame 835. A stud 934 carried by the upper arm of the lever 933 projects through a cam slot 935 in a cam arm 936 fast on the shaft 824 and also extends through a hole in the lower end of the lever 931.

In order to effect a selection of one of the compartment printers it is necessary that the selector bars 925, 926 and 927 be shifted vertically to bring the proper one of a series of ears 937 (Figs. 31 and 40) bent at right angles to the bars into cooperative relation with a flattened stud 938 connecting the link 885 to the arms 939 of the lever 860 (Fig. 31) of the selected printer. The arrangement of the selector bars 925, 926 and 927 is such that bar 925 completes its selecting movement before bar 926 commences its movement. Bar 926 then completes its selecting movement and following this the bar 927 is adjusted.

The bars 925, 926 and 927 are adjusted under the control of the selector keys 98 (Fig. 4) which it will be recalled control the selection of the sorting compartments and the compartment totalizers.

Referring to Fig. 40 it will be remembered that the heart-shaped cam 826 is secured to the shaft 60 and rotates therewith to a position corresponding to the selected compartment, adjusting the slide 819 correspondingly to set an indicator 827 and type elements 818 to indicate and print character designating the particular compartment and totalizer selected. The cam 826 does not make a complete rotation at each selecting operation but is adjusted from the last selected position to the newly selected position. This movement is transmitted through the slide 819 to correspondingly adjust the bars 925, 926 and 927 by the following described mechanism.

Secured to the side of the slide 819 is a slotted plate or block 940 embracing a stud 946 projecting from the free end of an arm 947 fast on a shaft 948 suitably supported in the machine. Also secured to the shaft 948 is a finger 949 (see also Fig. 32) upon the upwardly turned tip of which rests an angular bracket 950 secured to the side of the selector bar 925. A spring 951 urges the finger 949, shaft 948 and arm 947 counterclockwise pressing the slide 819 downwardly to maintain the roller on the arm 820 in contact with the cam 826.

The bars 926 and 927 are provided with brackets 952 and 953 respectively which rest on the ends of fingers 954 and 955 free on the shaft 948 and which fingers are held in this uppermost position by springs 956 and 957. An arm 958 fast on the shaft 948 adjacent to the finger 954 carries at its free end an ear bent at right angles to the arm 958, said ear projecting across the plane of the fingers 954. Likewise an arm 959 also fast on the shaft 948 has an ear at its free end extending across the plane of the fingers 955.

Reference to Fig. 40 discloses that the arm 958 is spaced radially from the finger 954 a given distance and that the arm 959 is spaced radially a greater distance from its associated finger 955.

When the sorting drum is rotated in either direction from the position in which the shaft 60 and cam 826 are shown in Fig. 40, the slide 819 travels upwardly rocking the arm 947, shaft 948 and the finger 949 clockwise to lower the bar 925. Assuming that the cam 826 turns 180°, the slide 819 will be raised to its extreme uppermost position rocking the arm 947, shaft 948, finger 949 and the arms 958 and 959 clockwise to their extreme positions. As the finger 949 rotates clockwise it lowers the bar 925 until said bar comes to rest on its guide studs 930 and 932 (Figs. 32 and 32a respectively). At this time the arm 958 contacts with the fingers 954 rocking this finger clockwise and lowering the bar 926 until the latter rests on its guide studs. At this time in the movement of the shaft 948 the arm 959 picks up the finger 955 and rocks it clockwise to position the proper one of the ears 937 on the bar 927 opposite the stud 938 (Fig. 31) of the printer to be operated.

Obviously if the sorting drum is rotated to any point or position intermediate to the position in which the cam 826 appears in Fig. 40, and the position just described, that is 180° in either direction from the position illustrated in Fig. 40, the shaft 948 will receive a corresponding movement and will position an ear 934 on any one of the bars 925, 926 or 927 but on one of said bars only, opposite the stud 938 associated with the printer which corresponds to the selected compartment and the selected totalizer.

After the selector bars 925, 926 and 927 have been adjusted, as set forth above, all three bars are simultaneously moved toward the right (Figs. 32, 32a and 40) for the purpose of operating the selected printer. This movement is effected by rocking the cam arm 936 (Fig. 32a) clockwise at which movement the cam slot 935 in said arm acting on the stud 934 rocks the lever 931 clockwise and the lever 933 for each bank of printers counterclockwise. Thus the selected bars are shifted in a parallel movement toward the printers and the particular ear 937 which was positioned opposite a stud 938 moves this stud toward the right (Fig. 31), rocking the lever 860 clockwise to effect the printing and paper feeding operations in the manner previously described.

As soon as the printing has occurred the cam arm 936 is restored counterclockwise to normal retracting the selector bars 925, 926 and 927 permitting the spring 888 (Fig. 31) to restore the hammers actuating mechanism to normal.

The mechanism for operating the cam arm 936 (Fig. 32a) is best shown in Figs. 27 and 32a. An arm 960 secured to the shaft 924, to which the cam arm 936 is secured, is pivotally connected to a link 961 carrying a stud 962 at its opposite end (Fig. 27) projecting into a slot 963 in an arm 964 pivoted on a stud 965. Another arm 966 also pivoted on the stud 965 and secured to the arm 964 has an open slot in its free end embracing a stud carried by an arm 967 pivotally mounted on the stud 630. An anti-friction roller 968 carried by the arm 967 projects into a cam groove 969 in the cam 754 fast on the cam shaft 94.

After the proper compartment, compartment totalizer and compartment printer have been selected under the control of the selector keys 98 (Fig. 4) and the amount to be entered has been set on the set up wheels 498 (Figs. 3, 3a, 20 and 21) under the control of the amount keys 110 (Fig. 4) the release bar 97 is depressed, whereupon the cam shaft 94, as fully described above, is caused to make one complete counterclockwise rotation (Fig. 11) during which rotation the cam 970 (Fig. 27) rocks the arm 967 first clockwise and then counterclockwise to normal. This rocks the arms 966—964 first counterclockwise to draw the link 961 toward the left and then clockwise to return the link toward the right to normal position. The movement of the link 961 (referring now to Fig. 32a) effects the oscillation of arm 960, shaft 924, the ribbon feed cam arm 923 and the printer operating cam arm 936 to operate the selected printer hammer, feed the selected record material and to feed the ribbon.

The cam 970 (Fig. 27) during the latter part of its rotation reverses the movements of the parts just described to restore said parts to their normal positions.

*Total taking mechanism—compartment totals*

The machine may be controlled to take a total from the compartment totalizers 650 (Figs. 26a and 32a), the group totalizer 675 and the grand totalizer 676 (Fig. 26). In order to take a total from a compartment totalizer the operator first depresses the selector key 98 (Fig. 4) corresponding to the particular totalizer from which it is desired to print the total, and then depresses the compartment total key 132 (Fig. 4 and 24) and the release bar 97 to effect printing of the total from the corresponding totalizer.

A description will first be given of the compartment total taking mechanism. The compartment total key 132 (Fig. 24) is mounted on an arm 941 of a three-armed lever pivotally mounted on a shaft 942 supported in the frames 31 and 32. A rearwardly extending arm 943 of the compartment total key lever is provided with a slot 944 which embraces a stud 970 carried by the control printer operating link 781 (see also Fig. 34). Depression of the compartment total key 132 rocks the arm 943 (Fig. 24) counterclockwise at which movement a notch in the lower right hand end of the slot 944 seats over the stud 970 and rocks the link 781 clockwise about its pivot on the arm 780. The link 781 is coupled to the arm 782 (Fig. 34) by a stud 971 on the link projecting into the notched end of a concentric slot 972 in the upper end of the arm 782. The clockwise movement of the link 781 raises the stud 971 out of the notch and into the concentric slot 972 so that when the arm 782 is rocked counterclockwise as set forth previously for the purpose of operating the control printer, the slot 972 moves idly over the stud 971, the link 781 being held against longitudinal movement by the notch in the arm 968. This disables operation of the control tape printer (Fig. 32) when taking a total from a selected compartment totalizer.

Depression of the compartment total key 132 also determines that only the selected compartment totalizer will be operated on such total taking operations. This is effected by raising the proper one of the engaging control slides 695 (Figs. 32 and 32a) previously mentioned. There are five of these control slides. One 695a (Fig. 42) operated by the non-add key 129, 695b (Fig. 24) operated by the compartment total key 132, 695c (Fig. 25) operated by the group total key 133, 695d (Fig. 41) operated by the grand total key 134, and 695e (Fig. 22) operated by the adding machine key 130.

Pivotally mounted on the shaft 942 (Fig. 24) and rigidly connected to the compartment total key lever by a hub is an arm 973 the free end of which projects into a recess formed in the left hand edge and near the upper end of the engaging control slide 695b.

Referring now to Figs. 32 and 32a it will be remembered that the slots 694 in the slides 695 are of different lengths relative to the stud 693 on bell crank 690—692. With particular reference to control slide 695b operated by the compartment totalizer key 132 it is desired to engage the adding racks 639 (Fig. 26a) with the selected compartment totalizer at total taking time, that is, before the slides 635 move upwardly. To accomplish this the flattened stud 688 (Fig. 32a) is drawn all the way to the right into the notch 699 in the total engaging slide 697. At the same time it is necessary to prevent engagement of the group and grand totalizers with their respective adding racks 637 and 638 for which reason the studs 688 for these totalizers are shifted into the neutral recesses in the ears 706 on the stationary bar 700. To effect this movement the slots 694 in the control slide 695b for controlling the engagement of the group and grand totalizers are such that the bell cranks 690—692 for these totalizers receive lesser movements, just sufficient to shift the studs 688 from the adding engaging slide 684 to neutral.

Depression of the compartment total key 132 rocks the arm 973 counterclockwise raising the control slide 695b a predetermined distance to effect this selection. When the machine is subsequently operated the racks 639 (Fig. 26a) will be engaged with the selected compartment totalizer, the total taken therefrom and printed on the corresponding compartment printer.

Depression of the compartment total key 132 also raises the rack restraining pawls 611 (Figs. 20 and 24) to permit the racks 575 to move toward the right under the control of the selected totalizer. A bail 974 (Figs. 24 and 25) carried by arms 975 and 976 pivotally mounted on the shaft 942 extends under all of the total keys 132, 133 and 134 and is pressed upwardly against said keys by a spring 977 having an end fast on a rearwardly extending arm 978 integral with the bail arm 975. An arm 979 (Fig. 24a) pivoted on the shaft 942 and secured to the ball arm 976 by a hub carries an ear 980 at its free end. The ear 980 is adapted to cooperate with a surface 981 on a forked arm 982 pivoted on a shaft 983 supported in the frames 31 and 32. Fast on the shaft 983 adjacent the forked arm 982 is an arm 984 having a projection 985 between which projection and the arm 982 is tensioned a spring 986 which normally presses an ear 987 on the arm 984 against the arm 982. Also fast on the shaft 983 is an arm 988 connected to one end of a link 989 having its other end connected to an arm 990 secured to a shaft 991 (Fig. 24).

Depression of the compartment total key 132 (Fig. 24) rocks the bail 974, arms 975 and 976 and the arm 979 (Fig. 24a) counterclockwise at which movement the ear 980 cams the arm 982 clockwise. The spring 986 draws the arm 984 therewith rocking the shaft 983 and arm 988 clockwise. The arm 988 thrusts the link 989 toward the left (Fig. 24) and through a slot in the upper edge of the link embracing a stud 992 carried on an arm 993 pivoted on the shaft 612 and secured to a bail 994 also pivoted on the shaft 612 rocks this bail clockwise. The bail 994 extends beneath all of the pawls 611 and consequently clockwise movement of said bail raises all of the pawls out of engagement with their racks 575 which are now free to be shifted toward the right by the previously described means and under the control of the selected totalizers.

Depression of the compartment total key 132 also sets a device to effect printing of a character on the selected compartment tape indicating the particular totalizer from which the total was taken and the particular compartment in which the checks listed on the compartment tape are sorted. A link 995 (Fig. 24) connects an arm 996 of the compartment total key lever to an arm 997 fast on a shaft 998. Also fast on the shaft 998 are three arms 999 (Fig. 26 only one of which is shown) one associated with each bank of compartment printers. The free end of the arms 999 are shouldered and each one normally rests below a stud 1000 carried by a particular one of the links 837. The segments 833 connected to this link are provided each with a single character corresponding to its associated sorting compartment and totalizer, said character or type being normally held below the printing position due to the stud 1000 on the link 837 resting on the shouldered arm 999.

When the compartment total key 132 is depressed it rocks the arm 996 counterclockwise (Fig. 24) and through the link connection 995 rocks the arm 997, shaft 998 and arms 999 clockwise to free the stud 1000, and consequently the link 837 associated therewith, to its springs 843 (Fig. 26a) which tends to lower the link 837 but at this time the springs are prevented from so doing due to an arm 1006 fast on the printer operating shaft 924 resting in the path of a stud 1007 also carried by this particular link 837. At the proper time the shaft 924 is rocked clockwise to operate the selected compartment printer and other mechanisms as set forth above, at which time the arm 1006 is removed from the path of the stud 1007 permitting the link 837 to drop down one step. This rocks all of the compartment indicating type segments 833 one step to bring all of said characters to the printing line of their respective printers.

After the impression is made the shaft 924 is rocked counterclockwise, the arm 1006 engaging the stud 1007, raising the link 837 to restore all of the segments 833 to normal. Upon release of the depressed compartment total key 132 (in a manner to be described) the arms 999 (Fig. 26) are restored to their positions in the paths of their respective studs 1000 where they prevent setting of the character types until the compartment total key again is depressed.

When printing a total from a compartment totalizer the racks 639 (Figs. 26a and 33) are rocked into engagement with the selected totalizer 650 before the slides 635 are moved upwardly. It was described above how depression of the compartment total key shifts the studs 688 (Figs. 32 and 32a) for the grand and group totalizers to neutral position and the stud 688 for the compartment totalizers all the way to the right into the notch 699 in the total engaging slide 697. This slide is operated by a cam 1008 (Fig. 36) fast on the shaft 94. A groove 1009 in the side of the cam 1008 embraces a roller 1010 carried by a cam arm 1011 pivoted on the rod 630 and having its free end bifurcated to straddle a stud carried by an arm 1012 of a lever 1013 pivoted on the shaft 719. The other arm 1014 of the lever is bifurcated and embraces a stud projecting from the totalizers engaging bar on slide 695.

The configuration of the cam groove 1009 is such that shortly after the beginning of the operation it rocks the cam arm 1011 clockwise, rocking the lever 1013 counterclockwise to raise the slide 697.

At this movement each of the engaging cams 708 (Fig. 32a), there being a cam adjacent each of the frames 666 and 667, for the compartment totalizers actuating racks, is rocked clockwise due to the link 707 camming the studs 711 counterclockwise one of said studs being carried by each of the rack frames 658 and projecting outwardly beyond the frames 666 and 667 and into the cam slots in the engaging cams 708. This carries the racks 639 (Fig. 26a) into engagement with the selected totalizer. Now, when the slides 635 are moved upwardly by the mechanism illustrated in Fig. 28 and previously described, the totalizer wheels 650 of the selected compartment totalizer will be rotated backwardly to zero where they are arrested by the usual transfer teeth thereon striking the end of the transfer pawls 725. When the slides 635 are arrested, the bail 640 (Fig. 23) continues its invariable movement stretching the springs 642.

The upward movement of the slides 635 is commensurate with the amount standing on the totalizer wheels and is transmitted to the segments 833 (Fig. 26) by the segmental levers 841 to set all of the segments correspondingly. After the impression is taken by the selected platen 850 (Fig. 30) the bail 640 (Fig. 23) is restored, lowering the vertical slides to their normal positions. As set forth above, the control printer is disabled at this time consequently the total taken from the compartment totalizer is printed on the selected compartment tape only.

When the vertical slides 635 (Figs. 26 and 26a) have reached the limit of their upward travel under the influence of the bail 640 (Fig. 23) and springs 642, and under the control of the selected totalizer, the racks 639 are disengaged from the totalizers. At this time the slides 635 would be snapped upwardly to their extreme position by the springs 642 were it not for the provision of means to prevent their so doing. This means which becomes effective just before the racks 639 are disengaged from the totalizer wheels, includes a series of pawls 741 (Fig. 26a) pivoted on a shaft 742 and urged to rock clockwise by springs 743. A rod 744 carried by arms 787 fast on the shaft 742 normally prevents such movement. At the proper time, just before the racks 639 are disengaged, the shaft 642 is rocked clockwise, the pawls 741 following under the influence of their springs 743 until the ends of the pawls rest either in notches 788 or in the teeth 789 on the right hand edges of the slides 635 depending upon the position of the slides. The shaft 742 is rocked by the following described mechanism.

Referring to Fig. 35 wherein is illustrated the mechanism for operating the totalizer adding engaging slide 684, it may be seen that a link 821 connects the lever 720 to one end of a lever 822 having its opposite end connected by a link 823 to the free end of an arm 824 fast on the shaft 742.

It will be remembered that the cam groove 714 (Fig. 35) rocks the lever 720 counterclockwise on adding operations after the slides 635 have been differentially adjusted in order to shift the engaging slide 684 to engage the totalizers.

This movement of the lever 720 coincides with the disengagement on total taking operations and advantage is taken of this movement to operate the pawls 741 (Fig. 26a). The counterclockwise movement of lever 720 (Fig. 35) raises the link 821, rocks the lever 822 clockwise and through the link 823 rocks the arm 824, shaft 742 and the rod 744 (Fig. 26a) also clockwise to permit springs 743 to engage the pawls 741.

The pawls 741 are so engaged on grand, group and all compartment total taking operations. They are also engaged on adding operations but at the time of their engagement the totalizers are engaged and as the slides 635 are moved downwardly to enter the amount into the totalizers the pawls 741 ratchet over the teeth 789.

*Zero elimination for compartment printers*

When items are entered in the machine and the amounts thereof printed on the control tape and on the selected compartment tape the zeros to the left of the highest order wherein a significant digit is set are not printed because the racks 575 (Figs. 3 and 20) to the left of said digit are held in their home or blank positions by the pawls 611. The type bars 636 (Fig. 26) and the type segments 833 are normally held below their respective printing lines and only those slides 635 and segments 833 of denominational orders in which digits are set under the control of the keys 110 (Fig. 4) move out of their blank positions consequently the zeros are not printed unless set under the control of the zero key.

On total taking operations, however, the pawls 611 (Figs. 3 and 20) are all raised, as set forth above, to permit the entire rack system to be set under the control of the selected totalizer. Obviously, if means were not provided to prevent the higher racks from so doing these racks would move to their zero positions under the control of the zero or transfer teeth on their respective totalizer wheels. To overcome this a zero elimination device is adapted to become operative on compartment total taking operations only. This device is necessary only when printing totals on the compartment printers since there has already been described a zero elimination mechanism functioning in connection with the control printer.

This zero elimination mechanism includes a part of the transfer or carry mechanism associated with the compartment totalizers. Referring to Figs. 26a and 33, the transfer arm 725 is separate from the pawl 723. The arm 725 is slidable horizontally on the rod 724 and on a stud 1016 projecting from a rearwardly extending arm 1017 integral with the pawl 723. A spring 1018 tensioned between a projection on the arm 725 and a projection on the arm 1017 urges the arm 725 toward the right (Fig. 33) said arm 725, however, being normally prevented from such movement by a hooked lever 1019 fast on a shaft 1020 mounted in the frames 658 normally resting to the left of a stud 1021 in the arm 725; at the same time the hook permits counterclockwise movement of the arm 725 for the purpose of rocking the pawl 723 to effect a transfer on item entering operations.

Depression of the compartment total key conditions mechanism, to be described later, to rock the shaft 1020 clockwise removing the hook 1019 from the path of the stud 1021 whereupon the arm 725 is free to move leftward under the influence of spring 1018 into the path of the transfer tooth on the totalizer wheel.

If the transfer tooth is standing at zero, however, the arm 725 will be shifted toward the right with relation to the rod 724 when the racks 639 are rocked into engagement with the totalizer wheel. With the totalizer wheel standing in any position other than zero the arm 725 will remain in its leftward position so that as the racks are moved upwardly and the wheels 650 are rotated backwardly they will be stopped by the transfer teeth striking the ends of the arms 725.

After the arms 725 are released by the lever 1019 (Fig. 33) the racks 639 are rocked into engagement with the totalizers and then, before the racks are moved upwardly, the arms 725 are sensed to determine which of them are in their leftward position and which have been restored by contacting the transfer teeth in the zero position.

This sensing is accomplished by a plurality of fingers 1022 pivoted on a shaft 1023 supported in the rack frames 658. Stop arms 1024 integral with the fingers 1022 extend downwardly from the shaft 1023 and are guided at their lower ends by a comb 1025 supported by the frames 658. Springs 1026 compressed between the arms 1024 and an angular portion of the comb 1025, urge the arms 1024 and fingers 1022 clockwise but are normally restrained by a bail 1027 carried by arms 1028 fast on the shaft 1023, (see Fig. 33b).

After the racks 639 are engaged with the selected totalizer and before the racks are shifted upwardly the shaft 1023 is rocked clockwise, the arms 1024 and fingers 1022 following under the influence of their springs 1026.

Those arms 725 which have been shifted toward the right (Fig. 33) by the transfer teeth present no interference to the fingers 1022 consequently these fingers and the corresponding stop arms 1024 are permitted to rock clockwise far enough to engage the lower ends of the arms 1024 in notches 1029 in the slides 655 thus restraining these slides and the vertical slides 635 from upward movement. However, those arms 725 which are permitted to assume their left hand positions under the influence of their springs 1018 present faces 1030 to the corresponding fingers 1022 thus limiting the clockwise movement of their stop arms 1024. Under this condition the arms 1024 do not receive sufficient movement to engage their free ends with the notches in the slides 655 which slides and the corresponding slides 635 are permitted to move upwardly under the control of the totalizer wheels.

Each of the stop arms 1024 is provided with an ear 1031 projecting to one side of the arm and a stud 1032 projecting to the opposite side of the arm. The ear 1031 is adapted to cooperate with the stud 1032 on the next lower order arm 1024. Thus, if an amount, for instance, 400.00 is standing on the selected totalizer only the arm 725 for the hundreds of dollars order will be permitted to move toward the left to present its face 1030 to the finger 1022 for this order whereas all the arms 725 of lower and upper will be held in their right hand positions. Now, when the bail 1027 permits the springs 1026 to operate the stop arms 1024 and fingers 1022, only the hundreds of dollars order finger 1022 will be restrained by the face 1030, holding its arm 1024 out of engagement for the corresponding slide 655.

The arms 1024 of the orders above the hundreds of dollars order will move into engagement with notches 1029 of their respective slides 655 thus preventing these slides from moving out of their normal positions. However, the arms 1024 of the orders below the hundreds of dollars order will be held in their restrained positions due to the ears 1031 and studs 1032 thus permitting the lower order slides 655 on which a zero is set to advance one step to zero position.

After the slides 635 have been adjusted to positions corresponding to the amount set on the totalizers, setting the type segments 833 (Fig. 26 and 26a) through the levers 841 and links 837, and the impression has been made on the selected compartment tape in the manner hereinbefore described, the shaft 1020 (Fig. 33) is rocked counterclockwise, the levers 1019 camming the arms 725 toward the right. A little later in the operation the shaft 1023 is rocked counterclockwise at which movement the bail 1027 picks up and restores the zero stop arms 1024 to their retracted positions.

When the shaft 1020 rocks clockwise at the beginning of a compartment total taking operation, an arm 1033 (Fig. 33) integral with and extending downwardly from the lever 1019 is positioned in the path of a stud 1034 on a projection 1035 of the arm 1017 extending rearwardly from the transfer pawl 723 to prevent knocking down the transfer mechanism during totaling operation.

The mechanisms will now be described for operating the shafts 1020 and 1023. Since these shafts are mounted in the rockable slide frame 658 it is necessary to provide slidable connections between them and their operating mechanisms.

An arm 1036 (Figs. 33 and 33c) fast on the shaft 1020 carries a stud 1037 projecting into an open slot in an arm 1038 fast on a short shaft 1039 journaled in the frame 666 (Fig. 32a). An arm 1040 fast on the shaft 1039 on the outside of frame 666 is pivotally connected to a link 1046 having a slot at its upper end embracing a stud 1047 (Fig. 33a) projecting from one arm of a lever 1048. The other end of the lever 1048 projects into a recess in the control slide 695b. When the slide 695b is raised by depression of the compartment total key 132 (see also Fig. 24) the lever 1048 is rocked clockwise the stud 1047 camming the link 1046 clockwise about its pivot on the arm 1040. A stud 1050 on one arm of a bell crank 1051 projects through an angular slot 1052 in the link 1046 and the other arm of the bell crank 1051 is connected by a link 1053 (see also Fig. 10) to a cam arm 1054 pivoted on the rod 630. The arm 1054 carries a roller 1055 extending into a cam groove 1056 in a cam 1057 fast on the shaft 94.

The shaft 94 and consequently the cam 1057 make one rotation at each adding and totaling operation rocking the cam arm 1054 and through the link 1053, the bell crank 1051 (Fig. 33a) first clockwise and then later in the operation counterclockwise to normal. On adding operations and totaling operations which do not involve the slide 695b, that is, grand total and group total operations, the stud 1050 rocks idly in the vertical portion of the slot 1052. However, when the slide 695b (Fig. 33a) is raised by depression of the compartment total key the lever 1048 cams the link 1046 toward the right engaging the offset portion of the slot 1052 over the stud 1050. Now when the bell crank 1051 is rocked, as described above, the link 1046 is raised rocking the arm 1040, shaft 1039, arms 1038 and 1036 and the shaft 1020 (Fig. 33) clockwise for the purpose set forth above.

The bail 1027 is controlled in a similar manner. An arm 1058 (Figs. 33a and 33b) integral with one of the bail arms 1028, carries a stud 1059 which projects into a slot in an arm 1060 fast on a short shaft 1061 journaled in the frame 666. An arm 1062 fast on the shaft 1061 outside of the frame 666 is pivotally connected to a link 1063 which at its upper end is slotted to embrace the stud 1047 on the lever 1048. A stud 1064 on one arm of a bell crank 1065 projects through a slot 1066 in the link 1063. The other arm of the bell crank 1065 is connected by a link 1067 to an arm 1068 pivoted on the shaft 719 (Fig. 32) which arm 1068 is connected by a hub to an arm 1069 having a stud 1070 embraced by an arm 1071 pivoted on the rod 630. A roller 1072 on the arm 1071 projects into a cam groove 1073 in a cam 1074 fast on the cam shaft 94.

The stud 1064 (Fig. 33a) normally occupies a position in the vertical position of the slot 1066 so that the operation of the bell crank 1065 by the cam 1074, which occurs at each adding and totaling operation, is idle. However, when the compartment total key 132 (Fig. 24) is depressed raising the control slide 695b, the lever 1048 (Fig. 33a) is rocked clockwise to cam the upper end of the link 1063 toward the right engaging a notch in the upper end of the slot 1066 over the stud 1064. Now, when the cam 1074 rotates it rocks the arm 1071 counterclockwise, rocking the arms 1069 and 1068 clockwise and through the link 1067, rocks the bell crank 1065 (see also Fig. 33a) counterclockwise to lower the link 1063. This rocks the arm 1062, shaft 1061 and arm 1060 clockwise which movement is transmitted by the slide 1059 to the arm 1058 to rock the bail 1027 clockwise before the adding racks are advanced and for the purpose set forth above.

Near the end of the operation the cam groove 1073 reverses the movement of the arm 1071 and, through the linkage described, raises the link 1063 thus restoring all of the zero stop arms 1024 to their normal ineffective positions.

*Total key release*

Latches 1075 (Figs. 24, 25 and 41) are provided to hold the total keys 132, 133 and 134 in their depressed positions during total taking operations. The total keys, with the exception of the compartment total key 132 are released near the end of the operation. The latter remains depressed until it is released by depression of the key release key 131 (Fig. 4). By this arrangement, when the compartment total key is once depressed, all of the compartment totalizers may be cleared and the totals printed on the corresponding compartment tapes by merely depressing the selector keys 98 and the motor bar 97. When all of the compartment totalizers have been cleared the compartment total key may be released by depressing the key release key 131.

The latches 1075 (Figs. 24, 25 and 41) are pivoted on the shaft 983 and are pulled toward latching position by springs 1076. When one of the keys 132, 133 or 134 is depressed an ear 1077 is carried downwardly until it passes a shoulder 1078 on the associated latch 1075 whereupon the spring 1076 engages the shoulder 1078 over the ear 1077 thus holding the key in depressed position until it is released near the end of an operation or until the key release key is depressed.

The mechanism for releasing the depressed total key automatically near the end of the operation includes the link 989 (Fig. 24), arm 988 and shaft 983. Secured to this shaft is a pair of arms 1079 (Fig. 41) supporting a bail 1080, which bail is slotted to receive the latches 1075. As described above depression of the key 132 rocks the shaft 983 clockwise thrusting the link 989 toward the left. This rocks the bail 1080 to permit the latch 1075 to move over the ear 1077.

A slotted arm 1086 (Fig. 24) pivoted on the shaft 585 embraces a stud 1087 in the link 989. An arm 1088 also pivoted on the shaft 585 and connected by a hub to the arm 1086 lies in the plane of a stud 1089 projecting from the side of the cam 565. When the link 989 is shifted leftward by depression of one of the total keys, as previously described, the arms 1086 and 1088 are rocked counterclockwise projecting the free end of arm 1088 into the path of the stud 1089 of cam 565. Near the end of the rotation of the cam 565 the stud 1089 strikes the arm 1088 rocking it clockwise slightly past normal, thrusting the link 989 toward the right and rocking the shaft 983 and bail 1080 counterclockwise. This rocks the latch 1075 for the depressed total key counterclockwise slightly past normal to release the key. As the stud 1089 passes the end of the arm 1088 the springs 1076 restore the mechanism to their normal positions.

The slot in the bail 1080 which receives the latch 1075 for the compartment total key is cut deeper than those for the grand total and group total keys consequently the counterclockwise movement of the bail, by the stud 1089, does not rock the latch 1075 far enough to release the compartment total key.

*Total taking—group total*

After a group or block of checks have been sorted into one or more of the sorting compartments, their amounts added onto the corresponding compartment totalizers, the group totalizers, grand totalizers and the amounts printed on the control tape and compartment tape, it is desired to print the total of the group on the control tape and to clear the group totalizer to receive the amounts of the next succeeding group. This is effected by depressing the group total key 133 (Fig. 25). This key is mounted on one arm of a lever 1090 pivoted on the shaft 942, the other arm of which lever projects into a recess in the upper left hand edge of the control slide 695c. Depression of the group total key, therefore, raises this slide to determine that the group totalizer 675 (Fig. 26a) only is to be engaged with its racks 638. This is accomplished in a manner similar to that described above for the selection of the compartment totalizer engaging. The bottoms of the slots 694 in the slide 695c are so arranged with reference to the studs 693 that when the slide 695c is raised by depression of the group total key the bell cranks 690 (Fig. 32 and 32a) for the compartment totalizer racks and the grand totalizer rack to their neutral positions whereas the bell crank 690 for the group totalizer is rocked clockwise a distance sufficient to carry the stud 688 associated therewith into the recess 699 in the total engaging bar 697.

It is desired to print the group total on the control tape only for which reason mechanism is operated by the group total key to disable the compartment printer operating mechanism.

Referring to Figs. 25 and 41, the group total key lever 1090 operates a bail 1091 secured to the shaft 492 to which shaft is also secured an arm 1092 connected by a link 1093 to a lever 1094 pivoted on a stud 1095 in the frame 31. A link 1096 connects the lever 1094 to a lever 1097 pivoted on a stud 1098 and having secured thereto an arm 1099. The arm 1099 has a slot 1100 therein normally concentric to the stud 965 and which slot embraces the stud 962 connecting the link 961 to its operating arm 964.

Depression of the group total key 133 (Fig. 25) rocks the key lever 1090 counterclockwise raising the link 1093 and rocking the lever 1094 clockwise. This thrusts the link 1096 toward the left rocking the lever 1097 clockwise which movement carries the stud 96 into the concentric portion of the slot 963 in the arm 964. Also at this movement the left hand end of link 961 is lowered to engage an offset in a slot 1101 (see also Fig. 27) in said link with a stud 1102 projecting from the frame 31 to hold the link 961 against longitudinal movement while it is disconnected from the operating arm 964. Now when the cam groove 969 (Fig. 27) rocks the arm 967 and lever comprising arms 964 and 966, the concentric slot 963 moves idly over the stud 962 and does not operate the compartment printer mechanism.

When the group total key is released near the end of the operation as described above, the bail 1091 is restored by a spring 1103 which restores the stud 962 (Figs. 27 and 41) to the upper end of the slot 963 in arm 964 and re-alines the slot 1101 with the stud 1102.

It is also desired to prevent printing from the compartment indicating types 818 (Figs. 39 and 40) when a group total is printed. This is accomplished by disabling the particular hammer 776 (Fig. 26) which take the impressions from these types, in the following manner: Depression of the group total key rocks an arm 1104 (Fig. 25) secured to shaft 942 counterclockwise. The slotted end of arm 1104 embraces a stud 1105 on an arm 1106 pivoted on the rod 793 (see also Fig. 26) and rocks this arm clockwise at which movement an ear 1107 on the end of the arm 1106 engages the upper edge of the bar 794 associated with the compartment number hammer and rocks said bar out of the path of the bail 798 to prevent operation of this particular hammer. The stud 796 is omitted from the compartment number type bar 819 (see Fig. 39) consequently the bar 794 (Fig. 26) remains in its upper position excepting when the arm 1106 is operated by depression of the group total key, and, as will be brought out later, by depression of the grand total key.

After a group total is printed on the control tape it is desirable to space the next impression an additional step below said total print. For this reason the feed mechanism is controlled to impart two steps of movement to the ratchet 806 (Fig. 32) and to the feed rollers 649 (Fig. 26) two steps. This is accomplished by rocking the bell crank 814 (Fig. 32) clockwise to permit the spring 811 to raise the feed slide 809 a distance sufficient to engage the nose 808 with the ratchet 806 one tooth in advance thus providing for a two step rotation of the ratchet and of the feed roller.

The bell crank 814 is rocked by depression of the group total key in the following described manner: Referring to Fig. 25 it may be seen that the rearwardly extending arm 978 integral with the ball arm 975 is connected by a link 1109 to an arm 1110 free on the shaft 777 and hubbed to an arm 1111 also free on the shaft 777. A link 1112 connects the arm 1111 with the other arm 1113 of the bell crank 814 (see Figs. 24 and 32).

Depression of the compartment total key 132 (Fig. 24) the group total key 133 (Fig. 25) or the grand total key 134 (Fig. 41) rocks the ball 974 and consequently the ball arm 975 and the arm 978 counterclockwise, which movement by the link 1109 rocks the arms 1110 and 1111 also counterclockwise drawing the link 1112 toward the left (Fig. 24) and rocks the bell crank 814 clockwise for the purpose set forth above. Upon release of the depressed total key the bell crank 814 and the members connecting it with the arm 978 are restored to their normal positions, wherein the bell crank 814 controls the feed mechanism to feed the control tape one space.

In order to take a group total it is necessary to depress the group total key 133 (Fig. 25) only. Depression of this key automatically operates the release bar 97 (Figs. 4 and 11) and immediately starts the machine on a group total taking operation. The mechanism whereby depression of the group total key operates the release bar will now be described.

An arm 1114 (Fig. 25) secured on a shaft 1115 carries a stud 1116 projecting beneath the group total key lever 1090. A link 1117 connects an arm 1118 also secured to the shaft 1115 to a bell crank 1119 pivoted on a stud 1120.

Depression of the group total key rocks the arm 1114, shaft 1115 and arm 1118 clockwise which movement through the link 1117 rocks the bell crank 1119 counterclockwise. The bell crank 1119 contacts a stud 1121 (see also Fig. 11) projecting from the stem 308 of the release bar shifting this bar downwardly to release the machine for operation. Near the end of the operation the release bar is restored to its upper position by its spring 341 (Fig. 11) the stud 1121 rocking the bell crank 1119 clockwise to restore the arms 1114 and 1118 and the shaft 1115 to their normal positions.

Total taking—grand total

The machine is controlled to take a total from the grand totalizer in a manner similar to that for taking the group total. In the case of the grand total, however, it is necessary to depress the release bar after the grand total key is depressed in order to initiate an operation of the machine.

The grand total key 134 is mounted on a lever 1122 (Fig. 41) pivoted on the shaft 942. The other arm 1123 of this lever projects into a recess in the upper left hand edge of the totalizer engaging control slide 695d so that depression of the grand total key rocks the lever 1122 counterclockwise raising the slide 695d. The bottoms of the slots 694 in this slide are so located with respect to the studs 693 in the bell crank 690—692 (Figs. 32 and 32a) that upward movement of the slide 695d shifts the slides 688 for the compartment totalizer engaging mechanism and group totalizer engaging mechanism to neutral positions and shifts the stud 688 for the grand totalizer engaging mechanism into the recess 699 in the total engaging slide 697.

Operation of this slide by mechanisms previously described (see Fig. 36) rocks the grand totalizer 676 (Fig. 26) into engagement with the racks 637 before said racks receive their upward travel. The vertical slides 635 are then shifted upwardly, by mechanism previously described, said slides being stopped under the control of the grand totalizer to position the types 636 according to the amount standing on the totalizer gears of corresponding denominational order.

While the slides 635 are so positioned the control printer is operated to print the grand total on the control tape. The grand totalizer which now stands at zero is then disengaged from the racks 637 and the slides 635 are lowered to their normal positions.

Depression of the grand total key 134 operates the arm 1106 (Fig. 26) to disable the compartment number printing hammer as was described above for the group total printing operation. Likewise the bell crank 814 (Fig. 32) is operated by depression of the grand total key to provide for feeding the control tape two steps following the printing of the grand total.

The grand total is to be printed on the control tape only for which reason operation of the grand total key also operates the arm 1099 (Fig. 41) to disable the compartment printers in the manner set forth above.

Special keys—error key

The error key 128 (Figs. 4 and 41) is provided for the purpose of erasing an erroneous amount set up on the set up wheels 498 (Figs. 3, 20 and 21).

It will be remembered that amounts are set on these wheels under the control of the amount keys 110 (Fig. 4) before the release bar 97 is depressed thus giving the operator an opportunity to check the amount before the machine is operated to enter it into the accumulators. It was described above how depression of the error key 128 (Fig. 20) prevented engagement of the racks 575 with the set up wheels 498 and it was stated that the mechanism for restoring these wheels is operated during the operation initiated by depression of the error key which also, as set forth above, releases the machine for operation of operating the release bar 97.

In addition to the functions above set forth depression of the error key disables the compartment printing mechanism and the control printing mechanism. In order to disable the compartment printers a link 1131 (Fig. 41) is provided. This link connects the lever 1097 to an arm 1126 (Fig. 20) pivoted on the shaft 590, which arm is integral with an arm 1127 supporting one end of a bail 1128 the other end of said bail being supported by an arm 1129 (Fig.

22). The arm 627 (Fig. 20) of the bell crank 589 and the arm 623 rigidly connected thereto extend over the bail 1128 consequently the counterclockwise movement of the arms 627 and 623 occasioned by depression of the error key rocks the bail 1128 and the arm 1126 also counterclockwise. This movement is transmitted by the link 1131 to the lever 1097 rocking this lever and the arm 1099 clockwise carrying the stud 962 in the compartment printer operating link 961 into the concentric portion of the slot 963 thus rendering the arm 964 ineffective to operate the compartment tape printers.

Referring now to Fig. 34, the control printer operating cam arm 785 is connected to the link 784 by a pin and slot connection 1132—1133, the pin 1132 being carried by the link 784 and normally projecting through an offset in the slot 1133 in the arm 785. The pin 1132 also projects into a slot 1134 in an arm 1135 pivoted on a stud 1136 (see also Fig. 41). The slot 1134 is normally concentric with the rod 630 and maintains the pin 1132 in the offset of the slot 1133. However, depression of the error key rocks the arm 1135 clockwise carrying the pin 1132 into the concentric portion of the slot 1133 thus rendering ineffective the control printer operating mechanism. A link 1137 connects the arm 1135 with an arm 1138 (Fig. 41) pivoted on the shaft 566, the arm 1138 being rigidly connected by a sleeve 1139 (Fig. 20) to an arm 1140 having its upper end bifurcated to straddle a stud 1141 projecting from the link 587.

Depression of the error key thrusts the link 587 toward the right (Fig. 20) for the purpose of rendering the rack engaging mechanism ineffective in a manner fully set forth above. The movement of the link 587 toward the right, by means of the stud 1141, rocks the arm 1140, sleeve 1139 and the arm 1138 clockwise, which movement, through the link 1137 rocks the arm 1135 (Figs. 34 and 41) clockwise for the purpose set forth above.

Since depression of the error key 128 prevents operation of the compartment printers, the control printer and the engagement of the racks with the set up wheels, the operation of the machine under the control of this key effects only the operation of the restoring means for the set up wheels 498 which restoring mechanism is fully described above.

Non-add key

The machine may be utilized as a listing machine and when so operated it prints a list of items on the control tape. In order to condition the machine for listing the "non-add" key 129 (Figs. 4 and 42) is depressed which disables the compartment printers and prevents the engagement of the accumulators with their respective adding racks.

The "non-add" key 129 is mounted on a stem projecting upwardly from one arm 1142 (Fig. 42) of a bell crank pivoted on the shaft 590. The arm 1142 extends just above the bail 1128 so that depression of the key 129 rocks the bail counterclockwise thrusting the link 1131, which has its left hand end connected to the arm 1126 of the bail 1128, toward the right. This movement of the link 1131 rocks the lever 1097 (Fig. 41) and the arm 1099 clockwise to disable the compartment printer operating means in the manner fully set forth above.

The clockwise movement of the lever 1097, through the link 1096, lever 1094 and link 1093 rocks the bail 1091 counterclockwise. Since the bail 1091 is secured to the shaft 942, this shaft together with the arm 1104 (Figs. 25, 26 and 41) are also rocked counterclockwise. This rocks the arm 1106 clockwise for the purpose of disabling the compartment number printing hammer.

In order to throw off or disable the accumulators, depression of the non-add key 129 operates the totalizer engaging control slide 695a (Fig. 42). The other arm 1143 of the non-add key bell crank carries a stud 1144 embraced by the notched end of an arm 1145 fast on a shaft 1146 on which shaft is also fast an arm 1147 connected by a link 1148 to an arm 1149 fast on a shaft 1150. An arm 1151 also fast on the shaft 1150 is slotted to embrace a stud 1152 projecting from the control slide 695a.

Depression of the key 129, through the stud 1144 rocks the lever 1145—1147 clockwise and through the connecting link 1148 rocks the arm 1149, shaft 1150 and the arm 1151 also clockwise to raise the slide 695a only a fragment of which is shown in Fig. 42. The three slots 694 (only two of which are shown) in the slide 695a are so located with respect to the studs 693 in the bell cranks 690—692 (Figs. 32 and 32a) that the upward movement of the slide shifts all of the engaging studs 688 to their neutral positions so that when the engaging slides 684 and 697 are operated none of the accumulators are moved into engagement with their adding racks.

Adding machine key

Another special key 130, known herein as the "adding machine key" is provided for the purpose of controlling the machine to list a series of items and accumulate the amounts of the items on one or more totalizers. This key, when depressed, throws off the compartment printers and prevents engagement of the compartment totalizer adding racks with the compartment totalizer wheels. This key also disables the compartment designating number printing hammer.

The adding machine key 130 (Fig. 22) is mounted on a stem projecting upwardly from one arm 1153 of a bell crank pivoted on the shaft 590, the arm 1153 extending above the bail 1128. Depression of the key 130, therefore, rocks the bail 1128 counterclockwise which, by means of the link 1131 (Fig. 41) connected to the arm 1126 of the bail, operates the arm 1099 to disable the compartment printing mechanism, and operates the arm 1106 (see also Fig. 26) to disable the compartment number printing hammers in the manner fully set forth above.

Depression of the adding machine key 130 also operates the totalizer engaging control slide 695e (Fig. 22) to control the engaging of the proper one of the totalizers. In order to operate the slide 695e the other arm 1154 of the adding machine key bell crank carries a stud 1155 projecting through the slotted upper end of an arm 1156 on the shaft 1146, which arm 1156 is rigidly connected to an arm 1157. A link 1158 connects the arm 1156 to an arm 1159 pivoted on the shaft 1150 and integral with an arm 1160. The slotted end of arm 1160 embraces a stud 1161 in the slide 695e.

Upon depression of the adding machine key 130, the stud 1155 rocks the arm 1156 and 1151 clockwise which movement is transmitted by the link 1158 to rock the arms 1159 and 1160 also clockwise raising the slide 695e. The openings 694, of which three are provided, are so arranged with reference to the totalizer engaging studs 688 for the compartment totalizers and the grand totalizers are shifted to the neutral position upon operation of the slide 695e, whereas the stud 688 associated with the group totalizer remains in operative relation with the adding engaging slide 684. Thus the amounts entered into the machine under the control of the adding machine key will be printed only on the control printer and accumulated only on the group totalizer.

After all of the items have been listed it is only necessary to depress the group total key 133 (Figs. 4 and 25) in order to clear the group totalizers and print the total of the items listed. The slide 695e (Fig. 22) may be arranged to control the machine to engage both the grand and group totalizers under which arrangement a plurality of groups of items may be listed and the total of each group printed. The grand total of all groups may then be printed.

*Interlocks*

An interlock is provided to prevent depression of any of the special keys and the total keys while the sorting drum is rotating. This interlock is operated by the drum locking bar 255 (Figs. 18 and 24). It will be remembered that this bar is engaged with one of the notches 89 (Fig. 2) in the ring 85 attached to the drum 51 so long as the drum is in a position of rest and a selector key 98 is depressed. Referring to Fig. 17 the magnets 254 (see also Fig. 18) are energized so long as a key 98 is depressed and the contact 240 on the arm 238 is in contact with the corresponding contact point 241 by the following circuit. Line 162, wire 164, contacts 108 associated with the depressed key, wire 245, contact 240, arm 238, brush 243, ring 244, wire 246, coils of magnets 254, wires 207, 197 and 198 to line 163.

Secured to the arm 266 (Fig. 18) is a projection 1171 with which cooperates a stud 1172 carried by an arm 1173 pivoted on the shaft 630 (Fig. 24). An arm 1174 also pivoted on the shaft 630 and rigidly connected to the arm 1173 is connected by a link 1175 to an arm 1176 fast on the shaft 983.

When the bar 255 is in engagement with a notch 89 the parts are in the position in which they appear in Fig. 24, but, when another key 98 is depressed the circuit through the magnets 254 is broken and these magnets become deenergized whereupon the spring 265 (Fig. 18) rocks the armature 268 and arm 266 counterclockwise to withdraw the bar 255. At this time the projection 1171 carries the stud 1172 toward the left rocking the arm 1173 clockwise. This rocks the arm 1174, and through the link 1175, the arm 1176 and shaft 983 also clockwise.

The arm 984 (Fig. 24a) being fast on the shaft 983 is also rocked clockwise, carrying with it the arm 982 positioning the end of the left hand fork under the ear 980 on the arm 979 thus locking the total keys 132, 133, 134 against depression.

The clockwise movement of the shaft 983 is transmitted to the shaft 991 (Fig. 24) by the arm 988, link 989 and arm 990 to rock the shaft 991 counterclockwise to lock up the special keys 128, 129, 130 while the bar 255 is out of engagement with the sorting drum.

Secured to the shaft 991 is a series of arms 1177 (Figs. 22, 41 and 42) there being an arm 1177 associated with each of the special keys 128, 129 and 130. When the shaft 991 is rocked counterclockwise the ends of the arms 1177 are positioned beneath ears 1178 on their respective key arms to prevent depression of these keys while the sorting drum is rotating.

Depression of any one of the total keys, as set forth above, also rocks the shaft 983 clockwise, and through the link 989 rocks the shaft 991 and the arms 1177 counterclockwise to lock out the special keys.

Another interlock is provided to lock out the total keys after an amount has been entered on the set up wheels 498 (Figs. 3, 3a and 23). It was described previously how the set up wheels are shifted toward the left (Fig. 3) as each denominational order digit is entered. This is effected by the escapement device illustrated in Fig. 3.

At each escapement of the ratchet 556 the gear 555 permits the segment 554 to rotate one step counterclockwise, which segment 554 operates the cam 550 (see also Fig. 3a) to shift the set up wheels. As soon as the segment 554 moves one step counterclockwise out of normal position it renders effective the following described interlock.

Referring to Fig. 24 it can be seen that an arm 1179 pivoted on the shaft 983 is notched at 1180 to cooperate with an ear 1181 on an arm 1182 fast on the shaft 942 to which is fast the arms 975 and 976 of the bail 974. Also pivoted on the shaft 983 and rigidly connected with the arm 1179 is an arm 1183 to the free end of which is pivoted one end of a link 1184. An elongated slot 1185 in the opposite end of the link 1184 embraces a stud 1186 projecting from the segmental gear 554 (Fig. 23).

As long as the segment 554 is in its normal position the stud 1186 holds the link 1184 and the arm 1179 in the position in which they appear in Fig. 24 with the notch or shoulder 1180 clear of the ear 1181. As soon as the segment 554 is rotated one step counterclockwise by the spring 558 and under the control of its escapement mechanism the link 1184 follows under the influence of a spring 1187 rocking the arm 1179 counterclockwise into the path of the ear 1181 which now prevents depression of any of the total keys. This condition obtains until the segment 554 is restored near the end of an item entering operation by the cam 602, at which time the stud 1186 picks up the link 1184 and shifts the notch 1180 out from under the ear 1181.

It will be remembered that the shaft 991 to which are secured the arms 1177 (Figs. 22, 41 and 42) is also rocked counterclockwise upon depression of one of the total keys by the arm 982 (Fig. 24a), shaft 983, arm 988 and link 989. This acts as an interlock between the total key and the special keys since such movement of the shaft 991 carries the ends of the arms 1177 under the ears 1178. Also when a special key 128, 129 or 130 is depressed the ear 1178 associated therewith strikes the left side of the corresponding arm 1177 rocking said arm and the shaft 991 slightly clockwise. This movement is transmitted by the link 989 (Fig. 24) to rock the bifurcated arm 982 (Fig. 24a) slightly counterclockwise to bring the right hand prong beneath the ear 980 thus preventing depression of any total key when any special key is depressed.

Means is provided to release the depressed special key 128, 129 and 130 automatically near the end of an operation. This means includes a bail 1188 (see Fig. 20) carried by a pair of arms 1189 (only one of which is shown) pivoted on the shaft 991. An ear 1190 bent upwardly from the bail 1188 is connected to an arm 1191 (Figs. 22, 41 and 42) pivoted on the rod 1136 by a link 1192. A stud 1193 on the cam 1074 is adapted to cooperate with a face 1194 on the arm 1191 near the end of an operation to rock the arm 1191 counterclockwise to rock the latches 629 for the purpose of releasing the depressed key 128, 129 and 130.

Means is provided to lock the release bar 97 while the sorting drum is rotating. This lock is controlled by the locking finger 86 (Fig. 2) which is operated by the magnet 87 (see also Fig. 17).

It was explained above how depressing a selector key 98 effected energization of magnet 182 which closes contacts 214 energizing the magnet 87 through the circuit extending from line 162, contacts 192 now closed, lines 193 and 217, contacts 214, magnet 87 to line 163. Energization of magnet 87 rocks the finger 86 counterclockwise and also rocks an arm 1195 rigidly connected to finger 86 counterclockwise closing contacts 1196. Upon closing of contacts 1196 a circuit is set up from the line 162 (see Fig. 17) over wire 424, contacts 1196, release bar magnet 431, wires 197 and 198 to line 163 thus energizing the release bar magnets. Referring now to Fig. 11 it will be remembered that energization of magnets 431 through armature 432 rocks bell crank 433 counterclockwise to interpose the end of said bell crank in the path of the block 434 thus preventing depression of the release bar until the drum is stopped in the selected position. As this time, however, as was fully explained above, the relay 182 (Fig. 17) is deenergized dropping its armature and opening contacts 214 which opens the circuit through magnet 87. The spring 88 (Fig. 2) now reengages the finger 86 with a notch 89, at the same time rocking the arm 1195 clockwise allowing contacts 1196 to open. This opens the circuit through magnets 431 (Fig. 17) which upon deenergization drop armature 432 (Fig. 11) rocking the bell crank 433 clockwise to free the release bar for operation.

*Exhausted compartment tape signal*

It is desirable to lock up the machine and to signal the operator when any one of the rolls 874 of compartment tape (see Figs. 26, 26a, 31, 32 and 32a) is exhausted.

This is accomplished by closing contacts 1197 and 1198 (Figs. 17 and 43). Closing of contacts 1197 lights a lamp 1199 by closing a circuit from line 162, wire 424, contacts 1197, lamp 1199, wire 198 to line 163. The lamp will remain lighted until the exhausted roll 874 is replaced by a fresh roll.

Closing of contacts 1198 sets up a circuit from line 163, wire 424, contacts 1198, wire 430, release bar magnets 431, wires 197 and 198 to line 163. This energizes the magnets 431 to lock the release bar against operation as described above.

The mechanism for closing the contacts 1197 and 1198 when any one of the 24 rolls 874 is exhausted will now be described. Referring to Fig. 43 associated with each of the 24 rolls 874 is a follower finger 1200 integral with a yoke 1201 pivoted on a rod 1202 supported by the plate 877. A spring 1203 coiled about the rod 1202, having one end hooked over the yoke 1201 and the other end anchored in a projection of the plate 877 urges the finger 1200 into contact with the circumference of the paper roll 874. An arm 1204 integral with the yoke 1201 is adapted to cooperate with a shoulder 1205 in the edge of a vertically disposed slide 1206 slidably mounted on studs 1207 projecting from the printer frame 848.

As the paper is unwound from the roll 874 the finger 1200 follows in a counterclockwise direction under the influence of spring 1203 bringing the arm 1204 gradually closer to the shoulder 1205, and finally when the paper is nearly exhausted the arm 1204 lowers the slide 1206. As the slide 1206 moves downwardly a stud 1208 on the lower end thereof strikes and rocks clockwise an arm 1209 fast on a shaft 1210.

Also fast on the shaft 1210 is an arm 1211 which is rocked with the shaft to release an arm 1212 to the action of its spring 1213, the arm 1212 being secured to a shaft 1214 to which is also secured an arm 1215. At its lower end the arm 1215 carries a block 1216 of insulating material.

Each of the three banks of printers is provided with a slide 1206 and an arm 1209 fast on shaft 1210 is provided to cooperate with said slides, consequently when any one of the 24 paper rolls 874 is exhausted and its associated arm 1240 lower side 1206 the shaft 1210 is rocked to release arm 1212 whereupon spring 1213 immediately rocks the arms 1212 and 1215 clockwise closing contacts 1197 and 1198.

An arm 1217 integral with the yoke 1201 embraces the end of the roll 874 to hold said roll in place. An arm 1218 integral with the arm 1204 and the yoke 1201 forms a convenient medium for manually rocking the assembly 1200—1217—1204 clockwise to permit restoration of the slide 1206 and to permit insertion of a new roll of paper. In order to replace the exhausted paper roll it is necessary to release the printer frame 848—849 containing the exhausted roll and swing said frame outwardly. This outward or clockwise movement of the frame about the rod 892 effects restoration of the arm 1212. When this arm was tripped and rocked clockwise to close the contacts its movement was limited by an ear 1219 on an arm 1220 fast on the shaft 1214 striking a finger 1221 free on the shaft 1214 and urged counterclockwise against a stud 1222 in the frame 848 by a spring 1223.

Now when the frame 848—849 is rocked clockwise to insert a new roll of paper the stud 1222 travels in an arcuate path, the finger 1221 following under the influence of its spring 1223. The spring 1223 being stronger than spring 1213 rocks the finger 1221, arm 1220, shaft 1214, arms 1212 and 1215 counterclockwise past normal position. A new roll of paper is inserted in place of the exhausted one which permits the slide 1206 to shift upwardly whereupon arm 1209 and 1211 rock counterclockwise under the influence of spring 1213 until arm 1211 rests on the end of the now restored arm 1212. The frame 848—849 is now rocked counterclockwise and latched in its operative position, the stud 1222 rocking the finger 1221 clockwise allowing the spring 1213 to rock the arm 1212 clockwise against the shoulder on arm 1211.

It is to be understood that there are three of the arms 1209 fast on shaft 1210, one associated with each of the three printer banks any one of which may be operated by exhaustion of any roll 874 in its associated bank to trip arm 1212. Likewise three fingers 1221 and three arms 1220 are provided, one for each bank of printers. When the arm 1212 is tripped and rocked clockwise all three of the arms 1220 come into proximity to these fingers 1221 so that any finger operated will restore arm 1212 and arm 1215.

*Key release key mechanism*

The key release key 131 is shown in Fig. 44 and one of its functions is to release the locked down compartment total key 132 as well as the locked down grand total key 134. In view of the fact that the group total key 133 causes an automatic operation of the machine, the key release key 131 cannot restore the depressed group total key 133 if it should be depressed in error.

The key release key 131 (Fig. 44) is loosely pivoted upon the rod 590 and is operated against the tension of a spring 1225. Connected to the key is a link 1226 having a slot 1227 fitting in a pin 1228 carried at the end of a lever 1229 attached to the shaft 991. By rocking shaft 991 clockwise by depression of key 131 it will be observed that link 989 (Fig. 24) is shifted to the right just as if it was moved by the pin 1089 of cam 565. When moved by the release key 131 it is moved to a greater extent so that even though the slot in the bail 1080 which receives the latch 1075 for the compartment total key is cut deeper than those for the grand and group total keys, it can release the depressed compartment total key 132, as well as the grand total key 134.

The key release key 131 has connections also for releasing any of the locked down special keys. To this end the key has pivoted thereto a link 1230 having a slot 1231 receiving a pin 1232 carried by an arm 1233 secured to one arm 1189 of the bail 1188. When the key is depressed link 1230 is elevated raising the free end of arm 1233 and rocking bail 1188 counterclockwise to rock the latches 629 and thus release any of the special keys constituting respectively; the error key (Fig. 41) 128, the non-add key 129 (Fig. 42) and the adding machine key 130 (Fig. 22).

What is claimed is as follows:

1. In a machine of the class described, in combination, a plurality of record sorting compartments, a plurality of totalizers, a carrier for said compartments and said totalizers, a plurality of record strip printing devices carried by means other than said carrier, selecting means, means controlled by said selecting means for positioning said carrier to select for operation a related compartment and related totalizer, and means operated by said carrier for causing the selection of a related record strip printing device.

2. In a machine of the class described, in combination, a plurality of totalizers, a corresponding number of record strip printing devices, each settable under control of one of said totalizers for printing on one of a plurality of record strips, a plurality of special totalizer identifying character printing type, one for each record strip printing device, means for simultaneously setting said plurality of identifying character printing type, and means for selecting a totalizer, related record strip printing device, and for selecting for printing the identifying character printing type related to the selected record strip printing device.

3. In an accounting machine, the combination with a series of totalizers, of a printing mechanism including printing elements for printing totals from any of said totalizers, means for determining if the elements of a totalizer represent zero positions and actuators for said totalizers, means for selecting a totalizer for a total taking and printing operation, a zero eliminating mechanism controlled by the cooperation of the determining means and the elements of the selected totalizer for eliminating the positioning of zero type of printing elements of denominational orders above the order of the left significant figure, means whereby said actuators cause the type elements to be positioned to print all significant figures of the total, and means in said zero eliminating mechanism for filling in zeros in orders below the left significant figure of the total.

4. In a combined sorting and accounting machine, the combination of a series of totalizers, a corresponding number of record sorting compartments, selecting means for selecting a totalizer and a related compartment, means for feeding a record to a selected compartment and means for entering an item corresponding to the record in the selected totalizer, and means operable when any one of said record sorting compartments is filled to capacity for preventing the operation of the feeding means and the item entering means.

5. In a combined record sorting and accounting machine, the combination of a series of totalizers and a corresponding number of record sorting compartments, selecting means for selecting a totalizer and a corresponding sorting compartment, means for feeding a record to a selected compartment and means for entering an item corresponding to the record in the related totalizer, manual means for causing the operation of the item entering means and the record feeding means, and means dependent upon the number of records in a compartment and operable when any compartment is filled to capacity for locking the manual means and for preventing subsequent totalizer and compartment from being selected by said selecting means.

6. In a combined record sorting and accounting machine, the combination of a series of totalizers and a corresponding number of record sorting compartments, selecting means for selecting a totalizer and a corresponding sorting compartment, means for feeding a record to a selected compartment and means for entering an item corresponding to the record in the related totalizer, manual means for causing the operation of the item entering means and the record feeding means, means dependent upon the number of records in a compartment and operable when any compartment is filled to capacity for locking the manual means and for preventing a subsequent totalizer and compartment from being selected by said selecting means, and supplemental manually-operated means effective when the records are withdrawn from the filled compartment for rendering the locking means ineffective and for permitting subsequent compartment and totalizer selecting operations.

7. The combination with item accumulating means, of a pair of correspondingly set printing mechanisms for printing the same item entered in said accumulating means upon two record materials, and a single manipulative means for preventing at will the operation of the accumulating means and for causing the suppression of the operation of one printing mechanism whereby the printing of items by the other printing mechanism is effected.

8. The combination with a plurality of item accumulating means, a plurality of printing mechanisms, means whereby an item may be entered in both accumulating means and printed separately by both of said printing mechanisms, and a single manipulative means for preventing at will the operation of both accumulating means and for causing the printing of items by one of said printing mechanisms by suppressing the operation of the other printing mechanism.

9. In a machine of the class described, in combination, a plurality of totalizers selectable to receive items of different classification, a plurality of record strip printing devices for printing the items in groups of corresponding classification, a common record strip printing device for printing all of said items in the sequence they are entered, means for entering an item in a selected totalizer and for printing the item by the related record strip printing device and by the common record strip printing device, a non-add key, and means whereby the operation of said key prevents the entering of an item by the entering means in a selected totalizer and from being printed by the related record strip printing device and causes the item to be printed solely by the common record strip printing device.

10. In a machine of the class described, in combination, a plurality of item classification totalizers, a corresponding number of record strip printing devices for printing items in classified groups, selecting elements for selecting a totalizer and a corresponding record strip printing device, a common record strip printing device for printing all the items in the sequence they are entered, means for printing an item by said common record strip printing device and by the selected record strip printing device and means for entering the item in a related totalizer, means under control of said selecting elements for printing an identifying designation on record material of the selected record strip printing device, a non-add key, and means whereby said key suppresses the printing of an item by the selected record strip printing device and the printing of the related identifying designation and for preventing the item from being entered in the related totalizer by said entering means, whereby the item is printed solely by the common record strip printing device.

11. In a machine of the class described, the combination with a pair of item accumulating means, of a pair of correspondingly set printing mechanisms for printing on two record materials items entered in both accumulating means, one of said printing mechanisms being adapted to print a total standing on the related accumulating means, a single manipulative means for suppressing at will the operation of one of said accumulating means and one of said printing mechanisms when items are entered in the other accumulating means and printed by one of said printing mechanisms, and a single manipulative means for causing the printing by the other printing mechanism of the total standing on the related accumulating means in which items are entered by the control of the first-named manipulative means.

12. In a machine of the class described, in combination, a plurality of totalizers, a corresponding number of record strip printing devices, a power operated operating mechanism under control of selecting keys for selecting a totalizer for a total printing operation and a related record strip printing device, an operating mechanism including item entering actuators operatively correlated with said totalizers and operable by an independent source of power, a total key detained in set position prior to an operation of the last-named operating mechanism, and means whereby the total key causes said operating mechanism including said actuators to clear the selected totalizer and transfer the total represented thereon to the related record strip printing devices.

13. In a machine of the class described, in combination, a plurality of totalizers, a plurality of sets of printing devices, common totalizer actuators, a carrier for said totalizers, means comprising individual devices, one for each totalizer, for causing a movement of the carrier to select a totalizer for operative relationship with the totalizer actuators for either an item entering operation or a total taking operation and for causing selection of a related set of printing devices, a total key operable when the selected totalizer is in operative relationship with the actuators, and means whereby said total key causes the totalizer actuators to reset the selected totalizer and by the movement of said actuators set a related set of printing devices to take a total print therefrom.

14. In a machine of the class described, a plurality of totalizers, each for receiving items of the same class, a plurality of sets of printing devices, one set for each totalizer, impression taking means for each of said printing devices, means for entering an item in one totalizer and concomitantly setting the plurality of sets of printing devices to represent on a printing line said item, means for taking a total from a totalizer and constructed and arranged for concomitantly setting all of the sets of printing devices to represent the total on said printing line, selecting devices for selecting a totalizer to receive an item or for a total taking operation, and means whereby each selecting device selects for operation the impression taking means of the set of printing devices corresponding to the selected totalizer when entering an item in said selected totalizer or when taking a total therefrom.

15. In a machine of the class described, a total taking operating mechanism, a plurality of totalizers, a plurality of record strip printing devices, means for selecting a record strip printing device and for bringing a corresponding totalizer to a position to be operated upon by said total taking operating mechanism, and a total key controlling said operating mechanism and operable after a totalizer is brought to its operating position for causing a total to be taken from a selected totalizer and a total printed therefrom by a corresponding record strip printing device.

16. In combination, a plurality of totalizers, a corresponding number of sets of printing devices and a corresponding number of impression taking devices therefor, common actuators for said totalizers and said sets of printing devices, said actuators setting all of said sets of printing devices upon taking a total from a selected totalizer, means for selecting a totalizer and the related impression taking device, and means operable automatically after its operation has been initiated for clearing the selected totalizer by said actuators and for causing the operation of the impression taking means of the set of printing devices corresponding to the selected totalizer.

17. In combination, a plurality of totalizers, a total taking operating mechanism for said totalizers, a plurality of keys controlling means for positioning totalizers for selecting said totalizers for total taking operations, manual means operable after a totalizer has been positioned for selection for causing the operation of the total taking mechanism, a total key initially set prior to an operation of the total taking mechanism but adapted to remain set to cause successive total taking operations for the totalizers, and a special key for releasing the total key from its depressed position.

18. In a machine of the class described, in combination, a plurality of classification totalizers and a group totalizer, entering means for entering amounts in selected classification totalizers and each amount in said group totalizer, a plurality of printing devices each settable under control of said entering means to represent an amount or under control of a selected classification totalizer to represent a total when a total is taken therefrom, amount printing devices settable simultaneously with said plurality of printing devices and print effecting means therefor, means for causing the taking of a total from a selected classification totalizer and printing said total from the related printing devices and means for coincidentally preventing the operation of said printing means when said amount printing devices are set in taking a total from a selected classification totalizer, group total taking means for causing said amount printing devices to be set in accordance wth the total on said group totalizer and for causing the operation of said print effective means, and means controlled by the group total taking means for preventing a printing operation from one of said plurality of printing devices.

19. In a machine of the class described, in combination, a plurality of totalizers selectable to receive items of different classification, a plurality of record strip printing devices for printing the items in groups of corresponding classification, a plurality of record strip feeding devices, one for each record strip printing device, a common record strip printing device for printing all of said items in the sequence they are entered, means for entering an item in a selected totalizer and for printing the item by the related record strip printing device, a non-add key, and means whereby the operation of said key prevents the operation of the record strip feeding devices; the entering of an item by the entering means in a selected totalizer and the printing of the item by the related record strip printing device and causes the item to be printed solely by the common record strip printing device.

20. In a machine of the class described, the combination with a power operated mechanism, of a plurality of totalizers, a corresponding number of record strip printing devices, a supplemental power-operated operating mechanism, individual totalizer and record strip printing selection control devices, means for causing the first said operating mechanism under control of each of said selection control devices to select a totalizer and a related record strip printing device for a total taking and total printing operation, respectively, total taking actuating mechanism operated by said supplemental power-operated operating mechanism and operatively correlated with a selected totalizer, a single manipulative means operated after an operation of said operating mechanism has selected a totalizer and record strip printing device, and means whereby said manipulative means causes said supplemental power-operated operating mechanism to effect an operation of the actuating mechanism to take a total from the selected totalizer and causes the operation of means to print the total represented thereon on the related record strip printing device.

21. In a machine of the class described, in combination, an operating mechanism, a plurality of totalizers, a plurality of sets of printing type, settable to print items or totals under control of said totalizers, a plurality of platens, one for each set of printing type, means operated by said operating mechanism and under control of individual devices for bringing a selected totalizer to a common position for either entering an item or for taking a total, and means operated under control of said individual devices to select a corresponding platen for either an item printing or total printing operation from a related set of type.

22. In a machine of the class described, in combination, an operating mechanism operable by a source of power, a plurality of totalizers, a plurality of record strip printing devices, key controlled means for causing said operating mechanism to move all of said totalizers by the shorter of two paths to bring a selected totalizer to a common position for a total taking operation and for selecting a related record strip printing device for a total printing operation, a total key operable after the operation of said operating mechanism has brought a selected totalizer for a total taking operation therefrom, a total taking mechanism including differential actuators, and means whereby said total key causes the operation of the total taking mechanism to clear the selected totalizer by said differential actuators and causes the total represented thereon to be printed upon the related record strip printing devices.

23. In a combined printing and calculating machine, the combination with a series of totalizers, of a plurlity of sets of type carriers for printing the items entered in said totalizers and the totals thereof in separate columns on record material, printing mechanism co-operating with said sets of type carriers comprising platens each movable to contact with said record material and then impress said record material against the related set of said sets of type carriers to take an imprint therefrom, means for taking a total from a selected totalizer and concomitantly setting all of said sets of type carriers, selection control devices for selecting a totalizer to receive an item or for a total taking operation, and means whereby each selecting device also selects for operation a corresponding platen either preliminary to entering an item in a selected totalizer or preliminary to taking a total therefrom, and means for moving the selected platen for effecting the printing operation.

24. In combination, a plurality of sets of type carriers, a plurality of totalizers, selection control devices for selecting a totalizer for a total taking operation, means for taking a total from a selected totalizer and concomitantly setting the sets of type carriers, printing mechanism cooperating with said sets of type carriers comprising impression hammers individually released for actuation to force by a hammer blow record material against related set of type carriers, means whereby each selection control device selects the release means of the impression hammer corresponding to the selected totalizer to thereby effect an impression from the corresponding set of type carriers, and means for actuating the selected impression hammer to cause a hammer blow.

FREDERICK L. FULLER.
SAMUEL BRAND.